United States Patent [19]
Burgess et al.

[11] Patent Number: 5,115,326
[45] Date of Patent: May 19, 1992

[54] METHOD OF ENCODING AN E-MAIL ADDRESS IN A FAX MESSAGE AND ROUTING THE FAX MESSAGE TO A DESTINATION ON A NETWORK

[75] Inventors: Ken L. Burgess; John S. Marvin, both of Fort Collins, Colo.

[73] Assignee: Hewlett Packard Company, Palo Alto, Calif.

[21] Appl. No.: 543,998

[22] Filed: Jun. 26, 1990

[51] Int. Cl.$^5$ .......................................... H04M 11/00
[52] U.S. Cl. ................................................. 358/440
[58] Field of Search ............... 358/440, 467, 402–403; 382/61

[56] References Cited
U.S. PATENT DOCUMENTS

| | | | |
|---|---|---|---|
| 4,352,012 | 9/1982 | Verderber et al. | 358/403 |
| 4,622,592 | 11/1986 | Ikehata et al. | 358/440 |
| 4,654,728 | 3/1987 | Sueyoshi | 358/440 |
| 4,686,704 | 8/1987 | Kamada et al. | 382/61 |
| 4,941,170 | 7/1990 | Herbst | 358/440 |
| 5,001,572 | 3/1991 | Hashimoto et al. | 358/440 |

Primary Examiner—Stephen Brinich
Attorney, Agent, or Firm—Edward L. Miller

[57] ABSTRACT

A fax message transmitted by a facsimile transmitter includes bar coded headers in its first page. At least one of these headers contains the name of an addressee that is also a user on a network. A fax server receiving the incoming fax message inspects the first page of the incoming facsimile to locate the bar coded headers. If a TO: header is found it is used to determine the corresponding E-mail address, and the fax is automatically routed as E-mail on the network to the addressee. Any other headers, such as a FROM: or SUBJECT: header have their bar coded content converted to ASCII and attached as ASII strings to the first page for easy inspection. An asymmetrical nature of the bar code used allows the fax server to determine which of a left-to-right or right-to-left scanning direction produces valid bar code. This in turn indicates whether the headers for the first page are right side up or upside down. By implication, this determines the orientation for the entire fax document. If the document is found to be upside down the fax server erects the document before mailing it to the addressee. The fax server or some other application running on a computer served by the network may be the addressee, and if the incoming fax is a request for information (whether by further bar code or check marks in predefined fields) the information may simply be sent by return fax to the sender, perhaps as part of the same phone call.

9 Claims, 15 Drawing Sheets

To: jsm@hpfcla

Subject: Fax Barcodes, Code 411

From: kb@hpfcla

2"

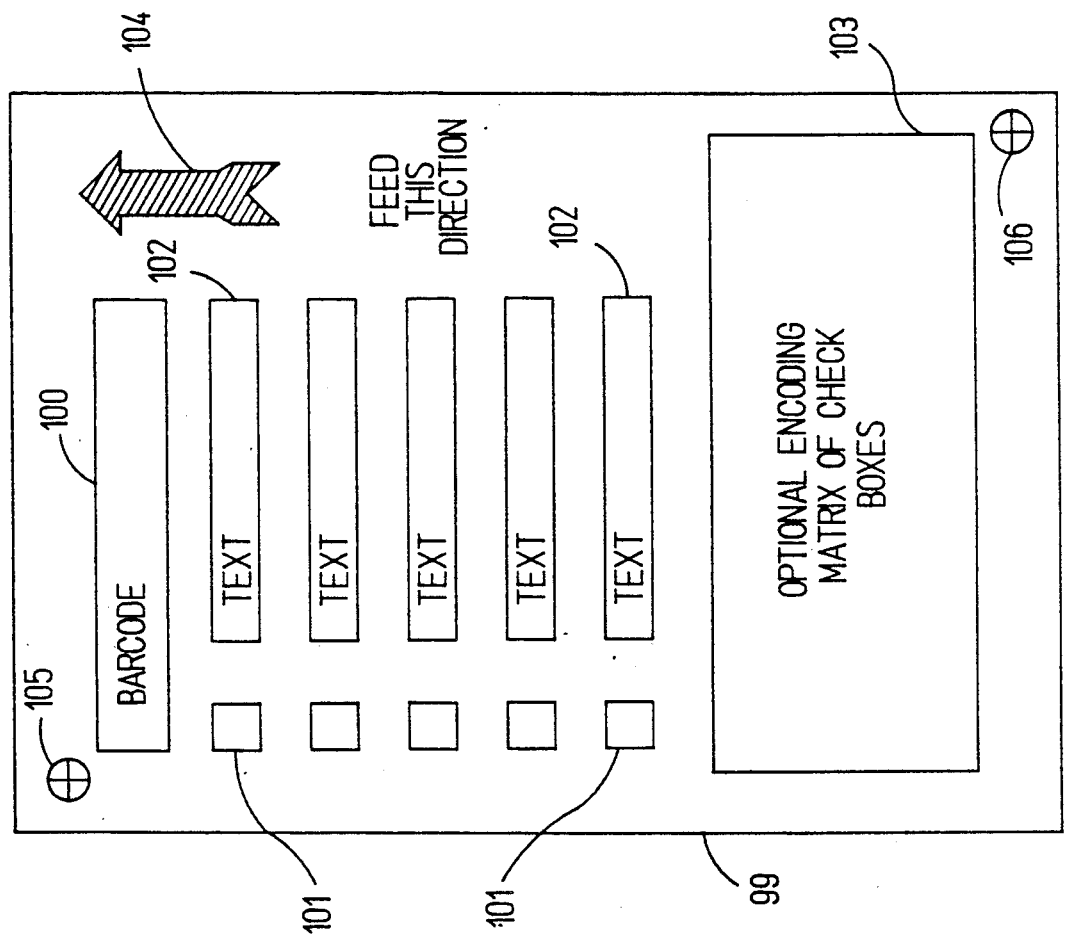

METHOD OF ENCODING AN E-MAIL ADDRESS IN A FAX MESSAGE AND ROUTING THE FAX MESSAGE TO A DESTINATION ON A NETWORK

BACKGROUND OF THE INVENTION

The transmission of messages and documents by facsimile transceivers (fax machines) is becoming an increasingly popular and widespread practice. As a further development, it is not necessary for an actual fax machine to exist at either the source or the destination of the message transaction. A so-called "fax modem" may take the place of the fax machine at either or both locations. A fax modem connects to a telephone line on one side and to a computer on the other. On the telephone side it can both send and receive audio signals in one of the CCITT formats that represent an image undergoing facsimile transmission. On the computer side it either sends or receives a stream of eight-bit bytes of compressed data representing an image. A suitable application program running on the computer either converts an incoming byte stream to a bit-mapped image for display on a monitor or other output device, or converts a displayed image to its corresponding outgoing byte stream. Such an application program (together with its associated computer) may be terms a "fax viewer."

In a large facility it is typical to find many fax modems connected on the phone line side to some number of phone lines, and connected on the computer side to a single computer running a program called (in association with the computer) a "fax server". In turn, the fax server is connected to a Local Area Network (LAN), wide area network, or other Electronic mail (E-mail) system. (Hereinafter, we shall simply use the term "network" as a synonym for any of the preceding computer-to-computer communication arrangements.) In such a facility there may be several hundred subscribers on the network, each with a fax viewer running on his computer and an assigned fax phone number, but perhaps only five or ten fax modems. Whereas a small business may well be obliged to use an actual subscriber loop per modem (which may be termed "traditional single party service"), a larger facility can arrange for the local phone company to interact with the facility as if it were an exchange in its own right. Then, some level of trunking is provided between the central office of the local phone company and a private branch exchange at the large facility. A well known conventional arrangement allows the allocation of the fax modems to whichever ones of selected (for fax service) phone lines are in use. This arrangement may be termed "direct inward dialing."

With either traditional single party service or direct inward dialing there is a necessary correspondence between the phone number used to dial the destination within the facility and the E-mail address of the intended recipient. If someone wants to send Charlie (who is a useful but wholly fictitious person) a fax, then they must dial Charlie's fax number. To correctly route the received fax the fax server must determine to which phone line the modem receiving Charlie's incoming fax is connected. That information indexes a table of E-mail addresses; Charlie's fax phone number points to Charlie's E-mail address.

While single party service and direct inward dialing work, they are not without a few warts. First, there is the matter of the phone line per user for single party service. To add a user it is necessary to add a phone line, which involves the phone company and added expense. Even with direct inward dialing a proliferation of fax phone numbers could require a change to the level of trunking to maintain adequate service. It would be cheaper and just as useful if a way could be found to use a suitable number of phone lines all representing the same phone number, and answer or select them "in rotation." Second, unless there is a modem per phone line (expensive!), there is the hardware needed to keep track of which phone line is being served by which fax modem. The system would be less expensive if that hardware could be eliminated. Third, there is system administration associated with adding or deleting a user. The table of correspondence between fax phone numbers and E-mail addresses must be kept up to date, or incoming faxes will not be correctly routed.

And while on the subject of warts, it should be noted that a conventional fax server has no way of determining if the received fax message will appear upside down on Charlie's fax viewer. It is usually left to the recipient to turn upside down messages right side up.

The underlaying reason for all these particular warts on the prior art is that the fax server has no way to read the incoming fax message and intelligently base its actions on the contents of the message.

SUMMARY OF THE INVENTION

We have a devised a way of making the fax server responsive to certain contents that may be placed into the fax message. Our fax server expects a fax message to include as its first page a header page, which in turn may contain the information to which the fax server is responsive. The incoming fax includes on its header page bar coded information that is detected and read by the fax server. This information includes, but is not limited to, a TO: line and a FROM: line, as well as a SUBJECT: line. These lines are logical lines, and a mechanism has been provided to allow a logical line of bar code to be composed of several physical lines of bar code. Of these logical lines, it should be noted that only the TO: line (or one having a corresponding logical function) is truly necessary for the automatic routing of incoming fax's. A TO: line is used to specify the E-mail address to which the fax message is to be routed.

Because the actual E-mail destination address can now be put into the fax (via a TO: line in the header) and then recovered by the fax server, no table of correspondence between phone numbers and E-mail destination address is required. In fact, the need for direct inward dialing for fax service is itself eliminated, since the fax server can now route an incoming fax irrespective of which phone line the fax was received on. The facility can now distribute a single fax number for all incoming fax traffic, and respond to that number with an appropriate number of phone lines answered in rotation. Lines can be added or deleted to reflect the volume of traffic without disturbing the arrangements through which persons communicate by fax. That is, Charlie doesn't need his own special fax phone number to receive fax messages on his E-mail terminal. Obviously, gone also is the mechanism that informs the fax server of which phone line the fax modem answered.

Also, no special system administration is needed, over and above the normal amount associated with Charlie's having an E-mail address in the first place. That is, the fax server need not maintain knowledge of particular E-mail addresses at all, and if desired, it can be left up to the E-mail system to decide what to do with a message having a defective address.

It may be argued that not every sender will be equipped with the proper bar code generation mechanism, and that too many messages will end up in the unknown or general delivery bin. Suppose Charlie gets a voice phone call from someone who wants to send him a fax, but who does not have any means to create the needed bar code to correctly address Charlie on E-mail. Then Charlie just faxes(!) a suitable cover sheet to the other party, who then makes as may photo-copies as desired and uses one to send his message to Charlie. The bar code reader in our fax server is quite tolerant of size changes in the bar code, and enlargements or reductions in size and skew arising from repeated photo-copying cause no harm.

Another aspect of the invention is that the particular bar code preferred for use in this method is not symmetrical for a certain "START/STOP" cipher used to enclose each physical line of bar coded information. Thus it is possible for the fax server to inspect a scan line of bar code looking for a START/STOP cipher, and do it from both left-to-right and right-to-left. Owing to the asymmetry, only one direction of inspection will be successful. Since the START/STOP cipher is on the left side of the line when the page is right side up, which inspection is successful indicates whether or not the header page (and by implication, the entire document) is right side up or upside down. If it is upside down the fax server can turn it right side up before sending it to its E-mail destination.

Further aspects of the invention are as follows. For the convenience of the human reader at the destination, the various bar codes are supplemented by the ASCII string counterparts, so that the TO:, FROM: and SUBJECT: lines on the cover sheet can be read and understood by Charlie when he looks at the message.

Now, it may be the case that the addressee is not a human being at all, but a piece of software designed to respond to things sent to it by fax. There are at least two ways this can work. First, the software could be in a computer that is some destination on the network, just as any other addressee. The message that this software receives is itself bar code, check boxes in a predefined field, or a combination of both. It could also include font characters to be recognized by optical character recognition. Second, the software could be in the fax server itself. In this case the fax server does not route the message, but directly performs itself any action needed in response to the message. In this connection we have provided that our fax server detect a particular cipher in a designated line of the bar coding in the header page, say on the first line. This cipher indicates whether to route a fax to an E-mail address or treat the entire fax as message to the fax server itself requiring some particular response.

Such a fax server can be used to perform a variety of functions. Consider the lowly advertising "bingo" card, which is a post card included in, say, a magazine. The reader fills out the card and mails it. In due course some requested goods arrive or a requested service is rendered. With the aid of the fax server described herein, the reader could fill out his bingo card and fax it in. And, if the request was for information in printed form, then the fax server could simply fax it back, on the spot! In similar fashion, one could use the inventive system to accomplish order placement generally, and as an overall replacement for optical character recognition at the resolution of fax machines. With the aid of a program that generates from ASCII characters graphics images that are bar code, a sender of such faxes to a fax server can generate for arbitrary ASCII text the corresponding bar code for inclusion in the message.

BRIEF DESCRIPTION OF THE DRAWINGS

FIG. 10 is an illustration of an information request "bingo card" incorporating aspects of the invention.

DESCRIPTION OF A PREFERRED EMBODIMENT

Figure 1:
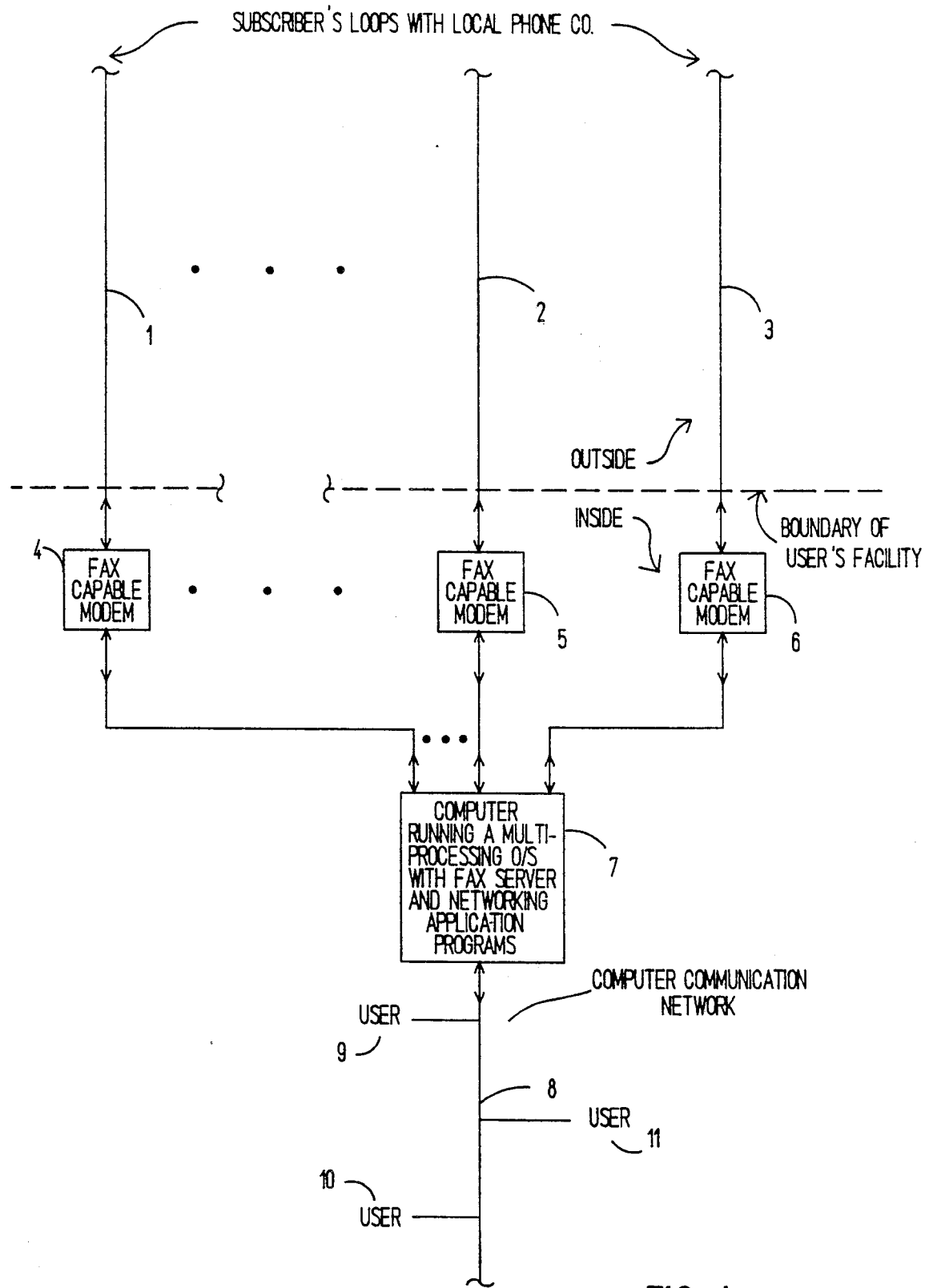
FIG. 1 is a simplified block diagram of a fax server/network installation for use with the method of the invention.

Refer now to FIG. 1, wherein is shown a simplified block diagram of one system to which the invention is applicable. As shown in FIG. 1, a number of subscriber's loops (1, 2, 3) originate from a local telephone company outside the user's facility. These subscriber's loops 1-3 are what are commonly though of as "telephone lines," although it will be understood that the practice of the invention is not in any way limited to use with only metallic conductors such as those employed in traditional telephone systems. That is, the facility's telephone service can be carried over any suitable communications channels using any appropriate technology; e.g., microwaves or fiber optics. Furthermore, it will be understood that while the figure is compatible with the case where each of the subscriber's loops has its own phone number (direct inward dialing), it is in no way limited to just that situation. FIG. 1 is equally representative of the situation where each one of the subscriber's loops 1-3 represents the same phone number. In fact, it is just this latter situation that is preferred, since it dispenses with the inconvenience of distributing more than one phone number for fax communication.

After the subscriber's loops 1-3 cross into the user's facility they each terminate at a respective fax capable modem 4-6. By the term "fax capable" we mean that the modems 4-6 can at a minimum send and receive fax images, but may be capable of other types of service as well. And although we have shown one modem per subscriber loop, other arrangements may be possible involving a switching arrangement (not shown). Such a switching arrangement would allow there to be fewer modems than subscriber loops. Each of the modems 4-6 is connected to a computer 7, which, in conjunction with the software that it runs, is called the fax server. The computer 7 serves a network 8 upon which resides a number of users 9-11. The users 9-11 all have E-mail addresses and terminal or workstation hardware and associated software suitable for receiving fax images; e.g. high resolution monitors, laser printers and fax viewer software.

It will, of course, be understood that FIG. 1 is a generalization of a wide variety of possible arrangements for connecting a computer network to a telephone system for the sending and receiving of fax messages.

Figure 2:
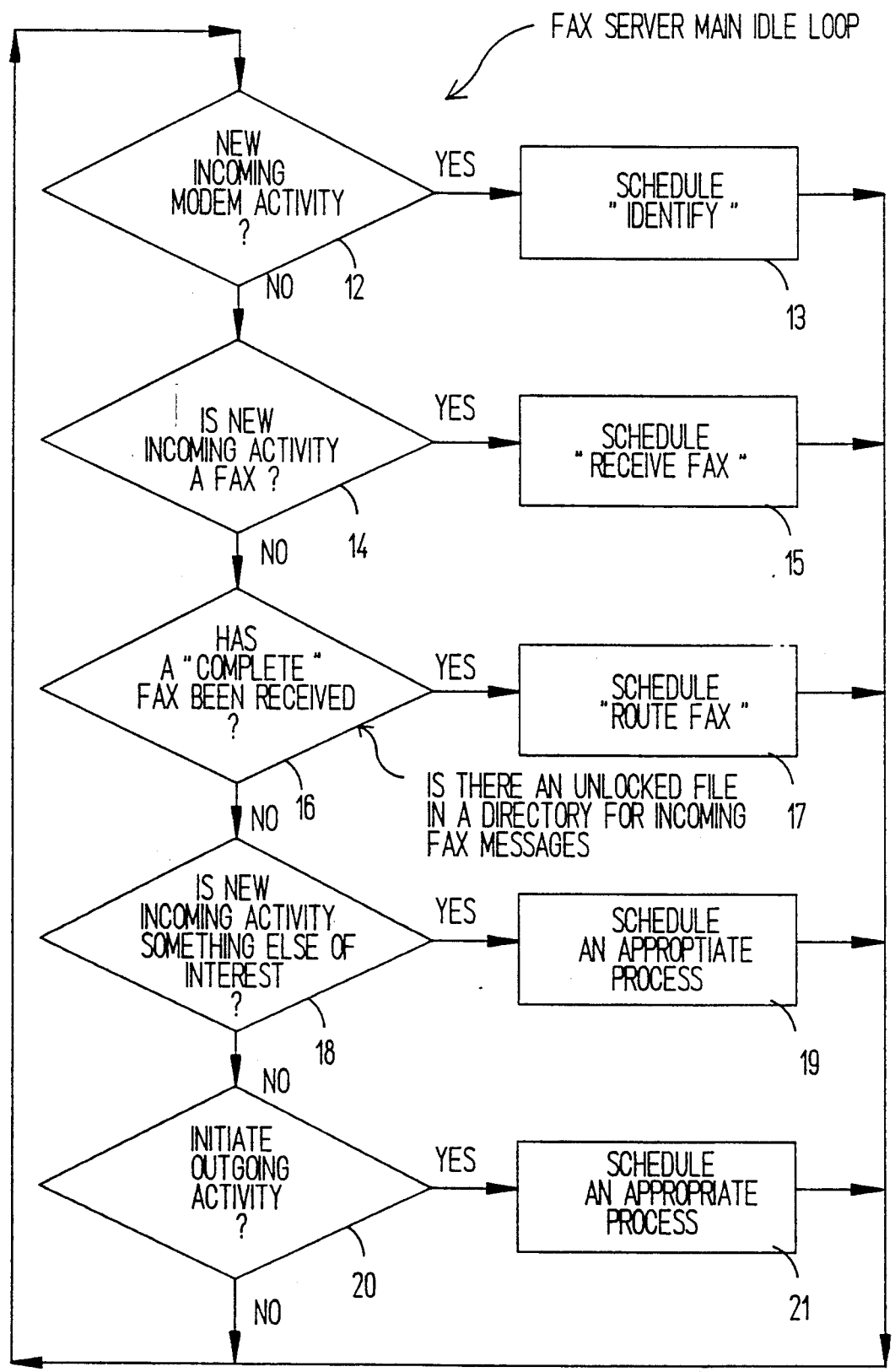
FIG. 2 is a simplified flow chart of an idle loop in the fax server of FIG. 1.

Turn now to FIG. 2, which is a simplified flow chart of the main idle loop for the fax server 7 of FIG. 1. Actually, in one real installation it is a flow chart for the highest level of abstraction associated with the fax server function executed on the computer 7; there may be other functions performed by the computer 7, such as managing the E-mail system on the network 8 or maintaining some bulletin board. Indeed, the function of "fax server" is accomplished by running an appropriate application program on the computer 7; any of these other functions would be accomplished by "simultaneously" running other corresponding application programs on the computer 7, too. To this end, the operating system for computer 7 is of the multi-tasking variety. The details of what amount to time sharing between these various other applications and the fax server software are handled by the operating system. With the foregoing in mind, it will be understood that FIG. 2 is the main idle loop for the fax server function of the computer 7, and that there may well be other main idle loops of equal logical rank (or position in a hierarchy) in existence on the computer 7. That is to say, the flow chart of FIG. 2 is not the supreme idle loop of the highest possible abstraction on the computer; that idle loop would be someplace in the operating system itself. Instead, the flow chart of FIG. 2 is the highest level of abstraction for a given category of application program activity, which in this case is fax message management.

The flow chart of FIG. 2 is an arrangement of ten steps 12-21; in accordance with convention, decision-making is represented by diamonds and the performance of tasks by rectangles. It will be understood that the flow chart of FIG. 2 has been simplified along functional lines, and that an actual program carrying out the stated functionality would probably deserve a longer and more detailed flow chart, principally because of the details of implementation.

Step 12 determines if there is new incoming activity on one of the modems. Exactly how this may be accomplished is somewhat implementation dependent; an interrupt service routine, for example, could detect the sending of an ASCII string from a modem previously listed as dormant. Once step 12 has determined that there is new (i.e., so far unacknowledged) incoming activity on a modem, step 13 schedules a process named IDENTIFY whose purpose is to acknowledge the activity and find out what kind of traffic the modem is to handle. The process IDENTIFY is an independently executable program to be performed by the computer 7 under its multi-tasking operating system. The process IDENTIFY is discussed in connection with FIG. 3.

Upon its conclusion, IDENTIFY returns to step 12 of the flow chart of FIG. 2.

Continuing with FIG. 2, if step 12 determines that there is no unacknowledged activity at any of the modems, step 14 determines if a newly acknowledged activity is a fax message. The way this works is that there has been a previous instance where step 12 scheduled IDENTIFY, which in turn determined that the incoming activity was indeed a fax and created some interprocess indication (flag, message in a mailbox in memory, etc.). Step 14 is really an inspection of that indication. If there is such an indication (YES) then the indication is cleared and step 15 schedules a process RECEIVE FAX whose task it is to actually store the digitized form of the incoming fax into memory. Upon its conclusion RECEIVE FAX returns to step 12.

If step 14 determines that there is no new incoming activity that is a fax, then step 16 determines if a "complete" fax has been received. In the preferred embodiment this is accomplished by testing for an unlocked file in a directory (of disc files) used by the process RECEIVE FAX to store incoming fax messages. RECEIVE FAX does not create such an unlocked file until it has received some minimally useful quantity of information, say, an entire page of a fax message. (For our purposes here, such a partial fax message is "complete" even if parts of it are indeed missing. Just what to do about abnormal terminations resulting in missing parts is a matter of choice. By routing what did arrive, at least Charlie will know that somebody has tried to send him something, and further steps can now be taken by the parties.) If step 16 determines that such a "complete" fax has indeed been received step 17 schedules the process ROUTE FAX whose task it is to determine the E-mail address of the destination of the fax, and then mail the fax to that address. As the first step in that activity it locks the file so that it will cause no further instances of "YES" at step 16. Upon conclusion step 17 returns to step 12.

The remaining steps of the flow chart of FIG. 2 deal with non-fax messages. Step 18, for instance, determines if there is incoming activity that is of interest, even though it may not be a fax message. If there is, step 19 schedules an appropriate process to handle it. We are speaking very generally here, as it is difficult to anticipate all the possibilities. However, a regular data communications transmission (e.g., over a Bell 102/103 compatible modem) is a good example. The appropriate process scheduled by step 19 returns to step 12 upon its conclusion.

If step 18 does not branch to step 19, then it branches to step 20 instead. Step 20 determines if there is outgoing activity that is to be initiated. If there is then step 21 schedules an appropriate process to accomplish that. That process returns to step 12 when it reaches its conclusion. Likewise, if step 20 determines that there is no outgoing activity, it also returns to step 12.

Figure 3:
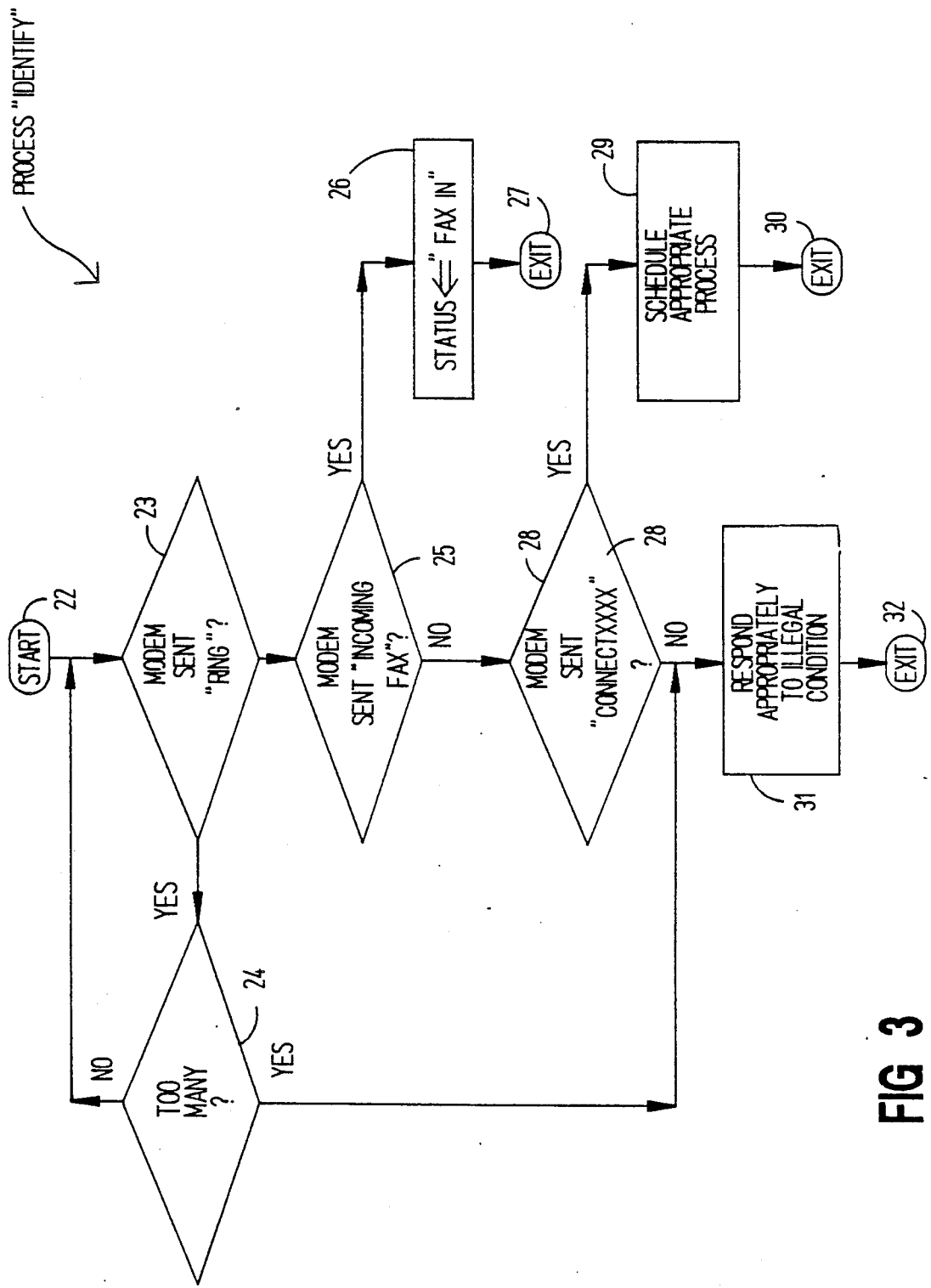
FIG. 3 is a simplified flow chart of a process started by the flow chart of FIG. 1 and used to determine that the modem of FIG. 1 is receiving an incoming fax message.

Refer now to FIG. 3, which is a flow chart of the process IDENTIFY, scheduled in step 13 in FIG. 2. After starting at location 22, the first step 23 is the determination of whether or not the activity detected in step 12 of FIG 2 (NEW INCOMING MODEM ACTIVITY) is the sending by the modem of the string "RING" (or some other equivalent activity). For the sake of explanation, assume that the modem is like one famous brand of modem currently on the market. That particular modem and its imitators send the string "RING" to its controller whenever the subscriber loop is experiencing a ringing current. The modem is pre-programmed to go off-hook after some predetermined number of rings, upon which the modem transmits another message to the controller (e.g., "CONNECT 2400" for a datacom connection, or perhaps "INCOMING FAX" for a fax).

If step 23 determines that the modem sent "RING", a count of the number of rings is maintained and step 24 used to determine if an abnormal number of rings is occurring. If there is, then something is amiss, and step 24 transitions to step 31, RESPOND APPROPRIATELY TO ILLEGAL CONDITION. But in a normal case of a pick-up on, say, the third ring, step 24 will be reached twice, after each of which it will transition back to step 23. Now the modem sends not "RING" but something else, having gone off-hook and established a connection on the start of the third ring. The "something else" causes step 23 to transition to step 25, where it is determined if the modem sent "INCOMING FAX" or not. If the determination is YES then step 26 assigns a value "FAX IN" to variable called STATUS that survives the death of the process. (This particular mechanism comes from the UNIX brand operating system; the actual code for the preferred embodiment was written in C and runs under the UNIX brand operating system. Other inter-process communication mechanisms could be used.) The value of STATUS is passed back as a parameter to the process that scheduled IDENTIFY in the first place. Step 27 is a normal exit back to the calling program.

If step 25 determines that the modem did not send "INCOMING FAX" step 28 determines if it was some other legitimate response, such as "CONNECT 1200" or "CONNECT 2400". If the determination is NO, then something is amiss, and the transition is to step 31 for an appropriate response to an illegal condition, followed by an exit back to the calling program. Otherwise, step 28 transitions to step 29, which schedules the appropriate (and legitimate) process. Following that there is a normal exit at step 30 back to the calling program.

Figure 4:
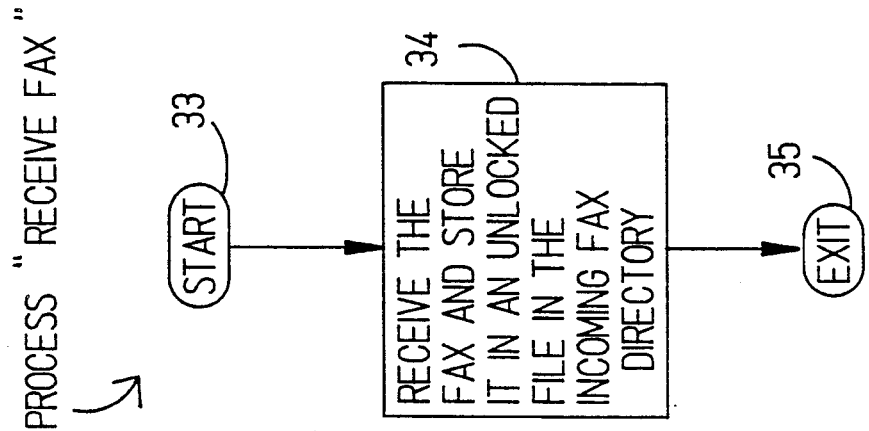
FIG. 4 is a very simplified flow chart of a process started by the flow chart of FIG. 1 and used to actually receive an incoming fax message from the modem and leave the message in a file for further processing.

FIG. 4 is a simplified flow chart of the process RECEIVE FAX scheduled by step 15 in the flow chart of FIG. 2. At the level of explanation that suits our present purpose the process RECEIVE FAX may be thought of mainly as a single step 34 following a start location 33. That step 34 is to receive the fax and store it in an unlocked file in a directory (of disc files) whose contents are incoming fax messages. Following this the process terminates itself at exit step 35. Naturally, the program corresponding to step 34 is susceptible of subdivision into several steps, some of which are themselves divisible. But on the whole, the step 34 is conventional and well understood in the art, and we needn't discuss it further.

Figure 5A:
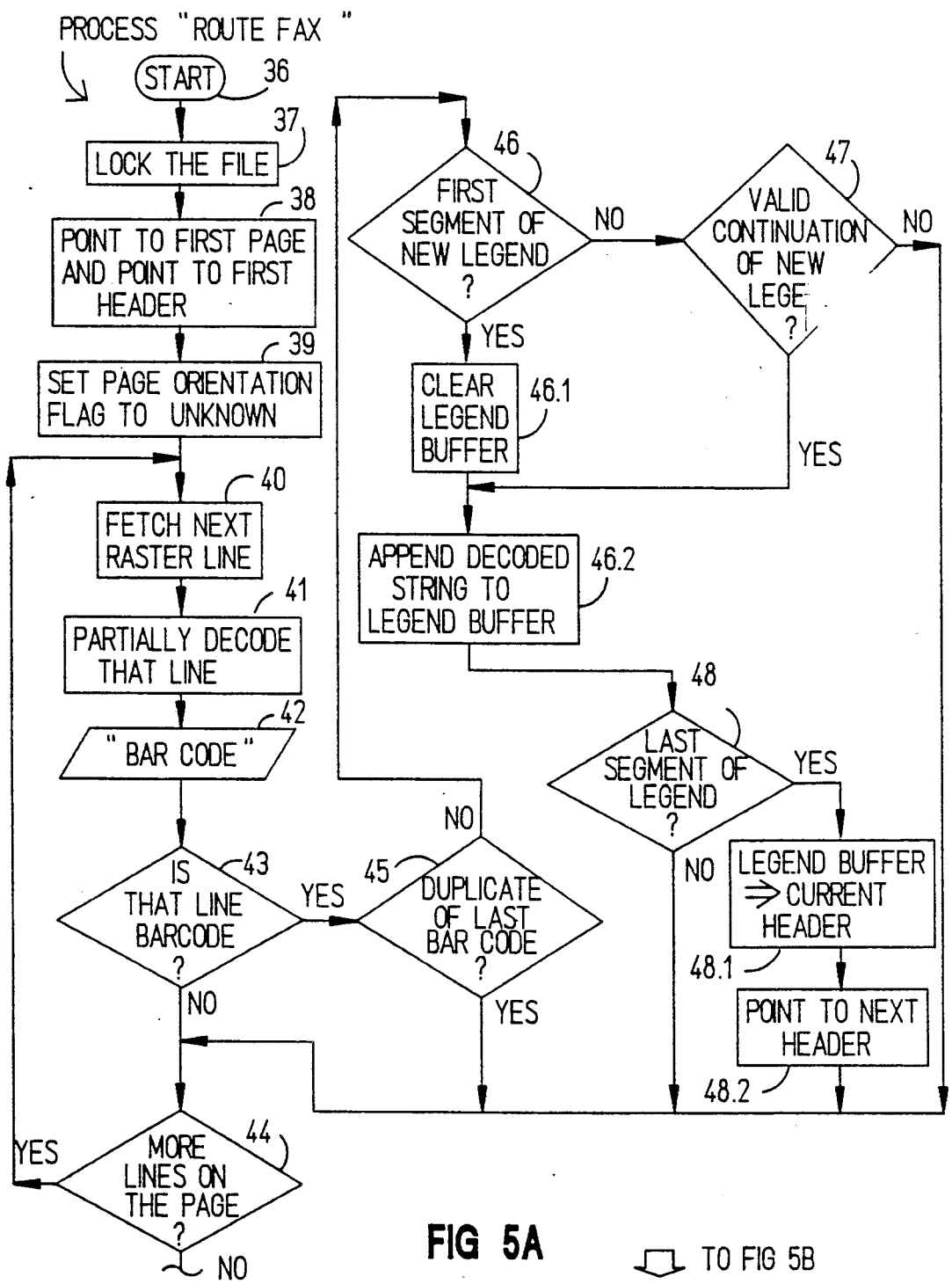
FIGS. 5A-B are a flow chart of the process ROUTE FAX that appears as a step in the flow chart of FIG. 2.
Figure 5B:
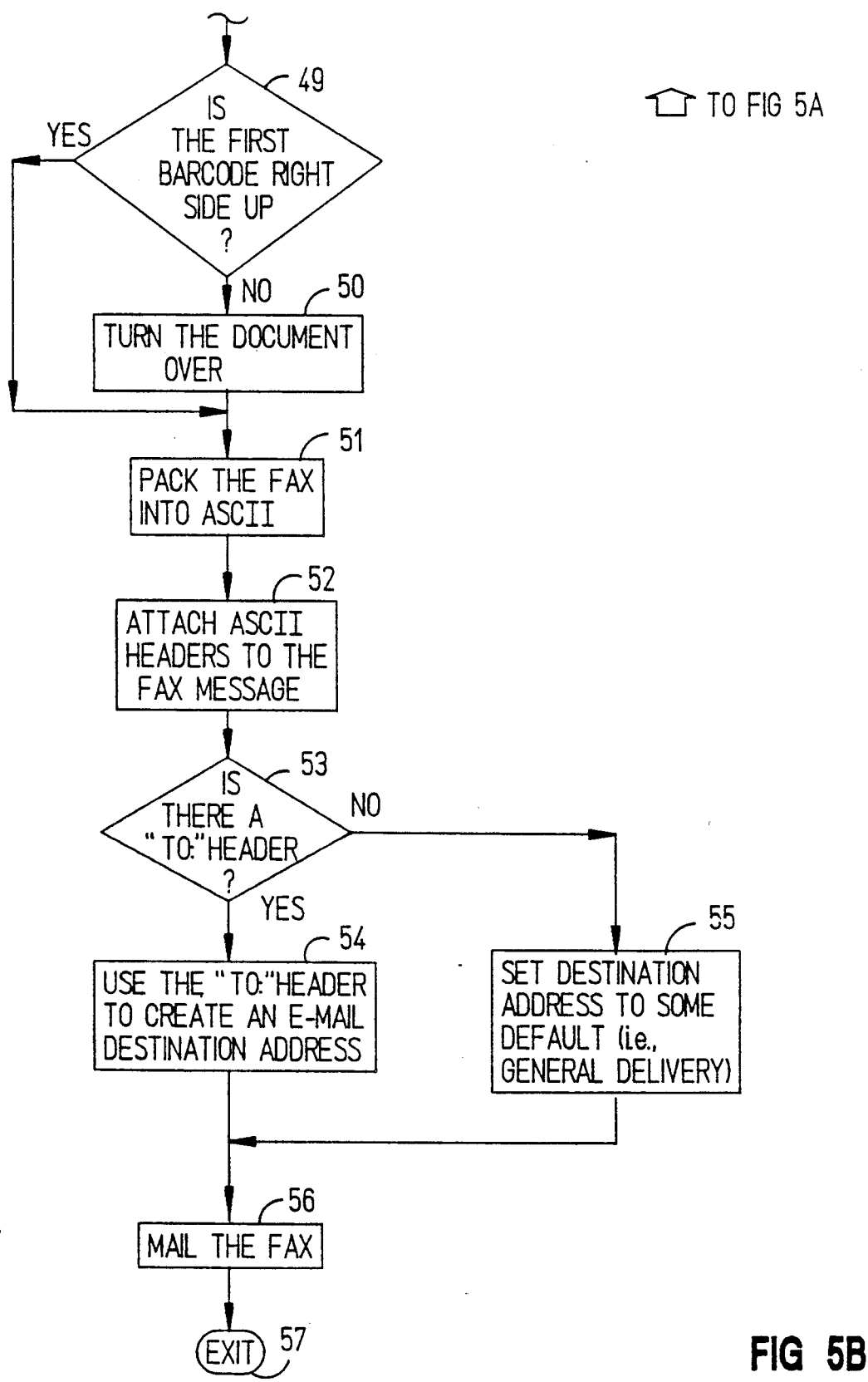

Turn not to FIGS. 5A-B, which are a flow chart of the process ROUTE FAX that is step 17 in FIG. 2. (A program listing for ROUTE FAX appears in Appendix II.) The first step 37 in the process ROUTE FAX is to lock the file in the subdirectory containing the received image. This action keeps the file from being processed more than once by step 17 in the flow chart of FIG. 2. In the next step 38 a page pointer is set to point to the first page of the document and a header pointer is set to point to the first header. The headers are bar coded information expected to appear on the cover sheet in accordance with the invention. (Setting a pointer to the first header does not locate that header, but instead indexes where to store the header information once the first header is located and processed.) The next step 39 is to set a page orientation flag to a value meaning "unknown."

Steps 40-48 constitute a loop for detecting bar coded headers and converting the bar codes to ASCII, both done in preparation for later attaching the ASCII header information to the body of the message. To this end, step 40 fetches the next (or first) raster line (scan line) of the first page of the fax. No header can precede this location, although it is possible that one could occur this early in the document. Step 41 partially decodes the line fetched in step 41. What does on here is this. The CCITT transmission is a string of sequences of ones and zeros representing symbols in a compression scheme. The partial decoding trades the sequences representing symbols in the compression scheme for a simple run length encoding of black and white pixels, beginning with white. Step 42 is the application of a procedure named BAR CODE, one of whose jobs it is to determine if the fetched raster line is a line of bar code. The procedure BAR CODE is described in connection with FIGS. 6A-B. Step 43 tests the outcome of the procedure BAR CODE; in the simplest case the fetched raster line was not bar code, whereupon step 44 determines if there are yet more lines for this page of the document. If there are the loop continues from step 40. Otherwise, there can be no further headers, and the loop of steps 40-48 is complete, leading to the execution of step 49 (shown on FIG. 5B and discussed a little further on below).

To return to step 43, if the fetched raster line was indeed bar code, steps 45-48 cooperate to store its content (then legend) as the current header. To this end, step 45 inquires if the line or segment of bar code in hand is a duplicate of the last line or segment of bar code from steps 42 and 43. (Upon initial entry the answer will be NO, since a previous legend has not yet been stored.) Unless the answer is NO, it not desirable to further process the bar code, as it is probable that the raster line in hand is simply a subsequent scan line of a multi-scan-line image for a bar code already processed (with an earlier fetched scan line). If this is the case then this scan line is to be ignored. Assuming the answer is NO, then step 46 determines if the line in hand is an initial or first segment of a legend. (That is, it is a logical line of only one physical line or is the first physical line of a logical line having several physical lines. This is the same as having a LINE OF cipher that is any of the "one of" characters described in connection with FIG. 7.) If the answer is YES then step 46.1 clears the legend buffer, which is the temporary location for storing and assembling the legend into a complete header. Otherwise, step 47 determines if the physical line of bar code in hand is a valid continuation of the previous one. That is, if the previous line was number one of three, is this one number two of three, and if the previous one was number four of six, is this one number five of six, etc. If it is a valid continuation, then the loop continues with step 46.2, which appends the decoded ASCII string of the line or segment in hand to the legend buffer. Otherwise, the line in hand is of no interest, and is ignored by continuing with step 44.

From step 46.2 the loop continues with step 48, which determines if the line or segment in hand is the last segment (is the last physical line in the logical line). That is, is the LINE OF cipher of the form "one of one", "two of two", "three of three", etc. If it is, then step 48.1 stores the legend buffer into the header location currently pointed at, and step 48.2 increments the pointer to point at the next header. Following that, the loop continues with step 44. Otherwise, steps 48.1 and 48.2 are skipped, and the loop continues with step 44 directly.

After the entire first page has been scanned and all headers detected and stored, step 49 determines if the first header is right side up or upside down. If the first header is upside down then it seems probable that the entire document is also upside down (although it is possible that this unfortunate condition applies only to the first page), and step 50 turns the entire document over (i.e., right side up). If the first header is already right side up step 49 skips step 50 and continues instead with step 51.

The ability to determine if the first (or for that matter, any) header is right side up or upside down arises from the asymmetrical nature of a certain "START/STOP" cipher occurring at distal ends of a physical line of bar code and used to enclose bar coded information. The idea is that if the document is right side up (and by implication the first page with its first header, too) then a left-to-right scan of the first header will be successful in detecting the enclosing "START/STOP" ciphers. If the header (an by implication, the rest of the document) is upside down, then a left-to-right scan will be unsuccessful, but a right-to-left scan will succeed.

Step 51 packs the fax message into ASCII characters as a format for transmission over the network 8. That is, at this point the fax consists of a file of sequences of ones and zeros representing a compressed (in the sense of data compression) image, of the same type to which the partial decoding of step 41 pertained. These sequences are not as conveniently transmitted over the network 8 as are ASCII characters having a regular predefined length. So, the bits of the sequences are simply taken in six bit chunks and added to an offset, so that they may be treated as though they were printable ASCII characters. Any framing control bits, start and stop bits, parity pits, etc., that are then added for transmission on the network 8 are then later removed by the software at the destination, as is the offset used to position the six bit pattern into the range of printable characters, and the transported groups of six bits are reassembled into their original sequences. Software at the destination can then proceed to convert the received fax into a displayable or printable image.

Following step 51, step 52 attaches the ASCII characters representing the actual content of the headers to a preamble segment in the E-mail package containing the fax message. This is one of a plurality of uses that are made of the ASCII representation of the content of the headers, as now explained. The actual bar coded header is itself a visual image of some bar code, and is transmitted as any other graphical component of the fax message (i.e., as described in the preceding paragraph). What step 52 does is to decode the bar code of each header and supplement the graphical description of the image of the header with actual ASCII codes representing the content of the header. These ASCII strings are placed into predefined places for such information located in a preamble portion of the E-mail format. (This is similar to pads of memo paper having already printed thereon the headings "TO:", "FROM:" and "SUBJECT:".) This makes the header content readable even though the fax itself has perhaps not yet even been rendered as a graphic image by the fax viewer. That is, a person looking into the beginning of a file containing the stuff the fax viewer is going to use can see the ASCII content of the headers. (See the TO: line on page 1 of Appendix V.) Also, step 54 (described in the next paragraph) needs the decoded content (meaning) of the "TO:" header for routing purposes. And, upon reflection, it will be appreciated that even when the fax is finally rendered by the fax viewer into an image, or a series of images, the headers would then appear only as bar code, just as they appeared on the originally transmitted document. Who likes to read bar code, anyway? Fortunately, there is no need to learn how to read the bar code, as the sender can use a program for header page creation ($MAKE_{13}HEADER$, described later) that not only produces the desired bar code image but also creates adjoining the bar code the graphic image of the corresponding ASCII characters. Thus a header page can have not only bar code readable by the fax server but also corresponding alphabetic characters that are readable by a human being.

Next, step 53 determines if there is a TO: header. If there is its ASCII content is used in step 54 to create the ASCII representation of the E-mail destination address that the bar code of the TO: header represents, as shown in Appendix V. If there is not step 55 sets the E-mail address to some default value, say, general delivery. Either way, the next step 56 mails the fax. Following that the process ROUTE FAX terminates with the exit as step 57.

The astute reader will note a similarity between steps 52 and 54/55. It may appear that step 54 is redundant, having been accomplished in step 52. Whether or not this is so may depend upon the inner workings of the E-mail system. In the system we used, step 54/55 was necessitated by the requirement by the E-mail system that it be expressly passed a destination parameter at the time it is called, regardless of what good information may be in the header portion of the file or package being mailed.

Refer now to Appendix IV and Appendix V. Appendix IV show the binary format of a file containing the image of the faxed document. This file format permits arbitrary binary data, and as such may not be easily transmitted over some networks since many of the patterns that would occur would not correspond to benign ASCII characters. Note also that this format does not include any header information that pertains to the origin and destination of the fax itself. The fax itself is in there, but the characters that would result from decoding the raster lines and assembling them are not apparent.

Appendix V illustrates a sample message that can be transmitted over the network, and that once was in the form of Appendix IV. Two things have happened between Appendix IV and Appendix V. First, the arbitrary binary format of Appendix IV is brought under control by application of the UNIX utility uuencode. This renders the arbitrary binary file as a sequence of printable ASCII characters. Thus, Appendix IV maps into that portion of Appendix V following "being 444 fax". Second, above that point in the format of Appendix V is the E-mail header stuff. This is the place where the TO: line in the faxed document, decoded by instances of steps 42 and 43 in FIG. 5A and stored by steps 52 and 54 in FIG. 5B, gets placed into the message routed by the E-mail system. (Look under the X-FAX-FROM line, which now stands for "FROM:", since the E-mail system insists that its FROM be for the entity that gave it the message to mail, which in this case is the fax server (Fax Daemon).) To drop the other shoe, once the mailed fax gets to the fax viewer (whose source code is shown in Appendix VI) the UNIX utility uudecode is used on the fax image portion to recover the binary data representing the image.

Figure 6A:
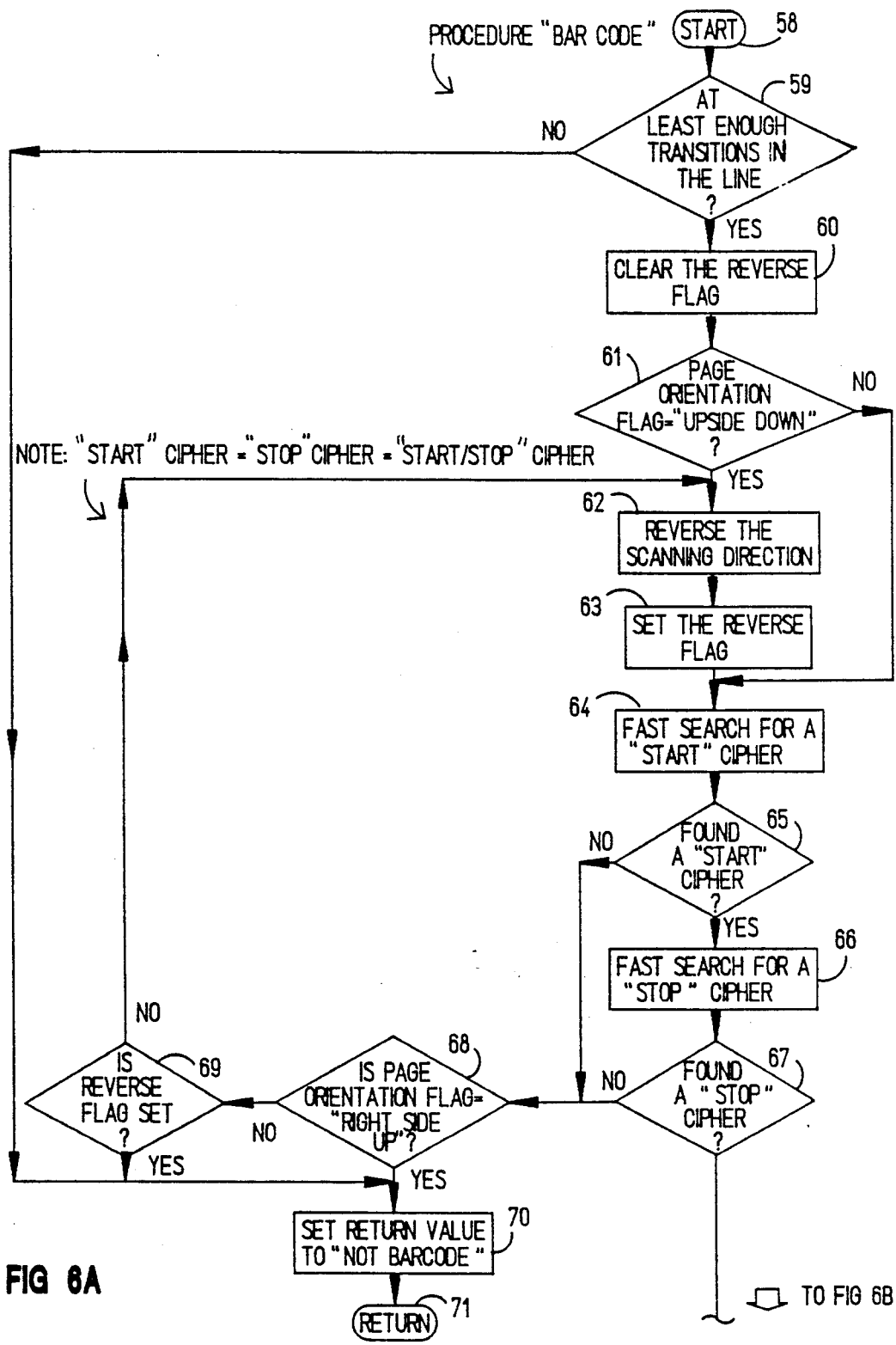
FIGS. 6A-B are a flow chart of a procedure named BAR CODE that is used as a component operation in the flow chart of FIGS. 5A-B.
Figure 6B:
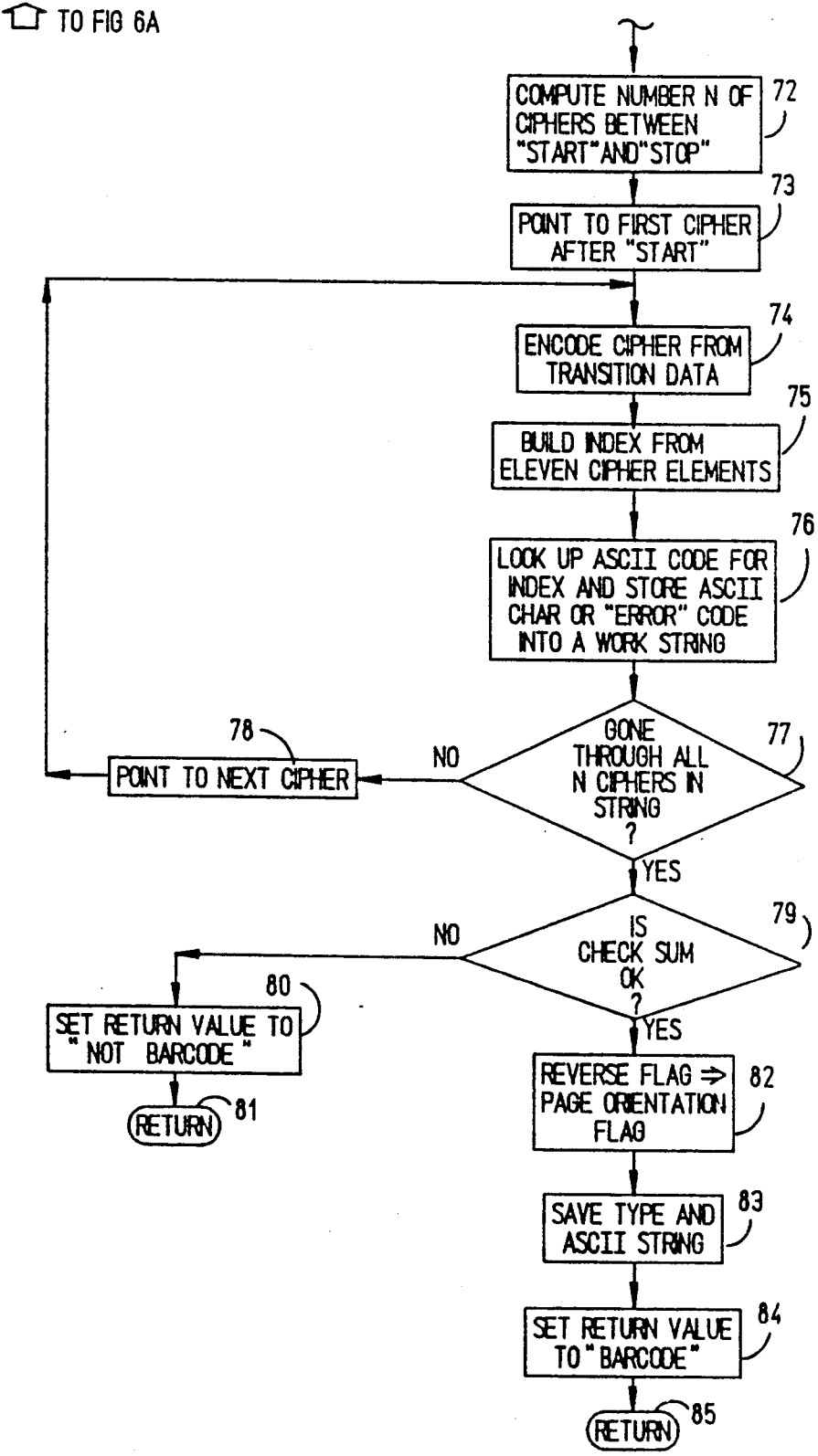

Refer now to FIGS. 6A-B, which are a flow chart for the procedure BAR CODE appearing as step 42 in FIG. 5A. (Appendix III contains a program listing of the procedure BAR CODE.) Recall that one of the purposes of the procedure BAR CODE is to determine if a scan line contains bar code or not.

Following a start represented by location 58, the first step 59 in the procedure BAR CODE is to determine if there are at least enough transitions (white-black or black-white pixel pairs) in the line for it to represent bar code in the first place. If the answer is "NO" then the procedure has found the desired result (the scan line is not bar code) and continues with step 70, which sets a return value to "NOT BAR CODE". This is followed at step 71 by a RETURN to the calling process. The return value mentioned above is a parameter passing communication device found in the C programming language. It is used here as a way to inform a calling routine about the now concluded goings-on in a procedure that was called.

If step 59 determines that there are indeed a sufficient number of transitions in the line, then it is possible that the line contains bar code, although sat this point it is by no means a certainty that it does. After the "YES" transition from step 59 the next step 60 clears the reverse flag. This flag indicates which direction of scanning to use. For our purposes here we may say that if the reverse flag is cleared, then forward scanning of from left to right is in use. If the reverse flag is set then reverse scanning of from right to left is in use. So, step 60 initially sets forward scanning.

The next step 61 determines the value of the page orientation flag. It will be recalled that this flag was initially set to a value of "UNKNOWN" by step 39 in the flow chart of the process ROUTE FAX (FIG. 5A). Thus, upon initially reaching step 61 of FIG. 6A the answer to the question "IS THE PAGE ORIENTATION FLAG=UPSIDE DOWN?" will be "NO" and the procedure BAR CODE will continue with step 64.

Step 64 is a fast search in the selected direction for a START cipher. A START cipher is a START/STOP cipher that occurs at the beginning of a line, and a STOP cipher is a START/STOP cipher that occurs at the end of a line. Since the same physical cipher is used for both START and STOP; which one is which is then distinguished by its location relative to the interior portion of the line. Also, separate ciphers could be used for START and STOP, although this is not necessary. Step 65 determines if a START cipher was found. If the answer is "YES" then step 66 performs a similar fast search in the selected direction for a STOP cipher. Next, step 67 determines if the STOP cipher was indeed found. If the answer to either of steps 65 or 67 is "NO" then the procedure BAR CODE continues with step 68, which determines if the page orientation flag is set to a value of "RIGHT SIDE UP". That is, if a previous application of BAR CODE has decided that the page is indeed right side up, then the current scan line must not contain bar code. Accordingly, upon a "YES" answer at step 68 the procedure continues with step 70 (already explained) followed by the RETURN at step 71.

If the page actually is upside down, however, then searching for the ciphers from left to right would fail to find them, and the answer at step 68 would be "NO" (the page orientation at this point could be either upside down or unknown). Of course, the ciphers might simply not be there to be found, either. But that can't be known until after searching for them from right to left. Under these conditions the next step 69 is to ask if the reverse flag is set. If it is, then we have already checked the other direction of scanning, and can now say that the scan line does not contain bar code. Therefore, a "YES" answer at step 69 also produces a transition to steps 70 and 71. However, a "NO" answer at step 69 means that there is still a chance that the document is upside down. Under these conditions the procedure continues with step 62, followed by step 63. These steps reverse the scanning direction and set the reverse flag. Following this the search for START and STOP ciphers is repeated. Unless both are found then we again find ourselves at step 68. The answer will be "NO" (if it were "YES" it would also have been "YES" on the first pass, and there would not have been a second pass ... ) and the procedure resumes with a second pass through step 69: "IS THE REVERSE FLAG SET?" After the second pass it will be, and the attempt to find bar code in the scan line has failed. That leads to steps 70 and 71, which indicate the failure to find bar code and terminate the procedure.

We can now consider the case when the answer to step 67 is "YES". This means that both a START and STOP cipher were found for some direction of scanning; the reverse flag indicates which. The procedure then continues with steps 72 and 73. Step 72 computes the number N of ciphers between START and STOP, and step 73 sets a pointer to the first cipher after START.

Steps 74-78 are a loop that trades ciphers for ASCII characters. To this end step 74 determines from the bar code transition data a code representing the associated cipher. Step 75 uses that code to index into a table of ASCII values for the ciphers. Step 76 gets the ASCII code or an error code and stores it into the next position in a work string. Step 77 determines if there are more ciphers to convert, and if there are ("NO") then step 78 points to the next cipher and closes the loop by continuing at step 74.

If all the ciphers have been converted the answer at step 77 will be "YES", and the procedure continues with step 79: "IS CHECKSUM OK?" If the answer is "NO", then something has gone amiss and the situation is treated as though the scan line is not bar code. This is accomplished by continuing with steps 80 and 81, which correspond to steps 70 and 71.

However, if the checksum if OK, then good bar code is in hand and the procedure continues with steps 82-85. Step 82 sets the value of the page orientation flag according to the value of the reverse flag. The idea here is that the process described above aligns the reverse flag with whichever assumption about page orientation first produces successful bar code. Step 82 assigns a value to the page orientation flag that corresponds to the first successful value of the reverse flag. There is an implicit latch that allows the page orientation flag to be determined only once, so that subsequent assignments of value to the page orientation flag at step 82 are always of the same value as the first assignment.

Consider a subsequent application of BAR CODE for a header after the first one. Step 60 will clear the reverse flag, but now the page orientation flag will have a value of RIGHT SIDE UP or UPSIDE DOWN; UNKNOWN will not be a choice. If the document is right side up then steps 62 and 63 will be skipped, leaving forward scanning in effect. Presumably, steps 64–67 will be successful, avoiding any attempt to change the value of the reverse flag, so that at step 82 no change occurs to the page orientation flag, since it already has a value RIGHT SIDE UP.

If the document is upside down at the start of the subsequent use of BAR CODE, the answer at step 61 will be "YES", which allows steps 62 and 63 to reverse the scanning direction and set the reverse flag. Presumably, the searches and checks of steps 64–67 will now be successful, leaving step 82 to again assign a value of UPSIDE DOWN to the page orientation flag.

If steps 64–67 are not successful, then the answer at step 68 will be "YES" if the page orientation flag has already been set to RIGHT SIDE UP, transitioning to the unsuccessful exit of steps 70 and 71. The logic here is this: The page orientation flag said at step 61 that the document is right side up, so it was scanned from left to right. But the scanning failed. So, if the document is supposed to be right side up at step 68, then the line must not be bar code, and the update operation for the page orientation flag is never even reached. The remaining case is where step 61 says the document is already upside down, so steps 62–63 reverse the scanning direction and set the reverse flag. But now steps 64–67 fail. The answer at step 68 will be "NO", but since the reverse flag was set in step 63, step 69 will transition to the failure exit of steps 70–71. That averts any attempt to assign another value to the page orientation flag at step 82. Here the logic is: The page orientation flag said at step 61 that the document was upside down, so step 63 set the reverse flag. Thus, if the cipher-finding operation fails (steps 64–67) and the reverse flag is already set (step 69), it must not be bar code.

To conclude the procedure BAR CODE, step 83 saves the type (TO:, FROM:, etc.,) and ASCII content (the work string) of the header. Then step 84 sets the return value to "BAR CODE", and step 85 does the RETURN that terminates the procedure.

To this point we have been examining what could be termed an overview of the operation of the fax server. We turn now to a discussion of certain issues pertaining more directly to the bar code preferred for use with the fax server. These include the layout of the header page, a description of the preferred bar code itself, and a means for generating images of bar code.

Figure 7:
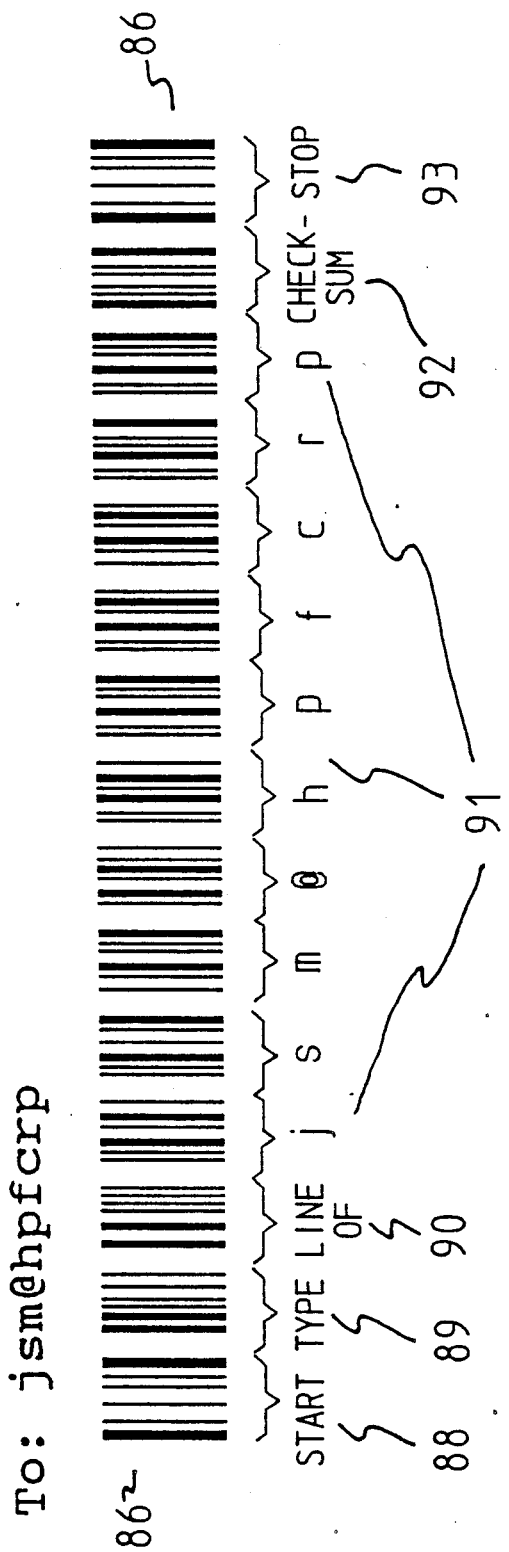
FIG. 7 is an example of a line of bar code that is used to represent header information in accordance with certain aspects of the invention.
Figure 8A:
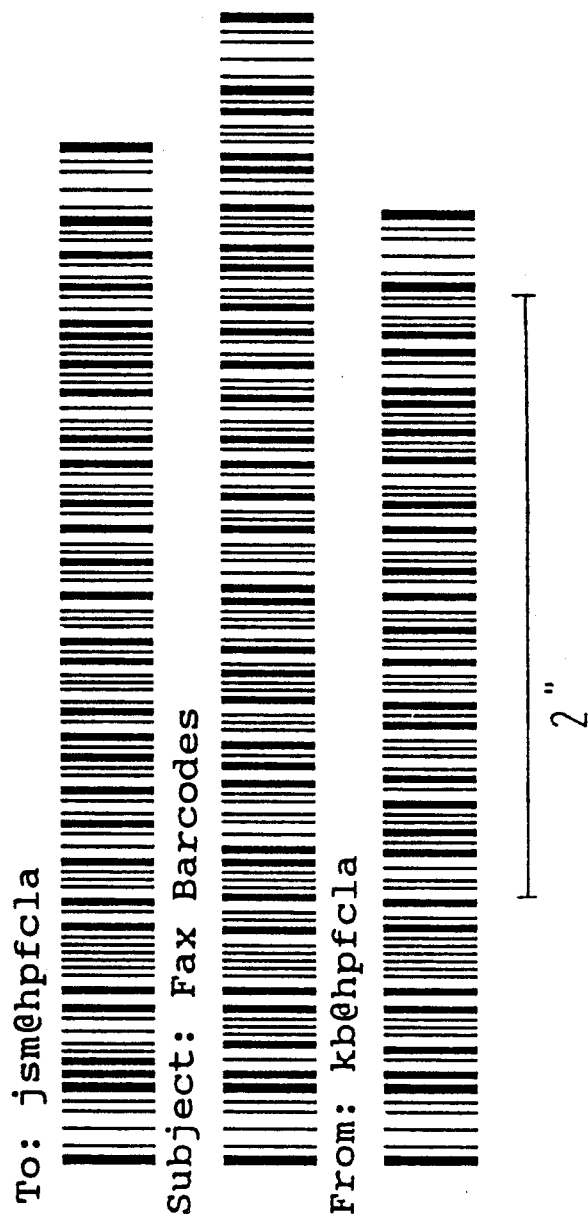
FIGS. 8A-D are examples of a sample header page having different sized bar code ciphers for header information to be used in accordance with certain aspects of the invention.
Figure 8B:
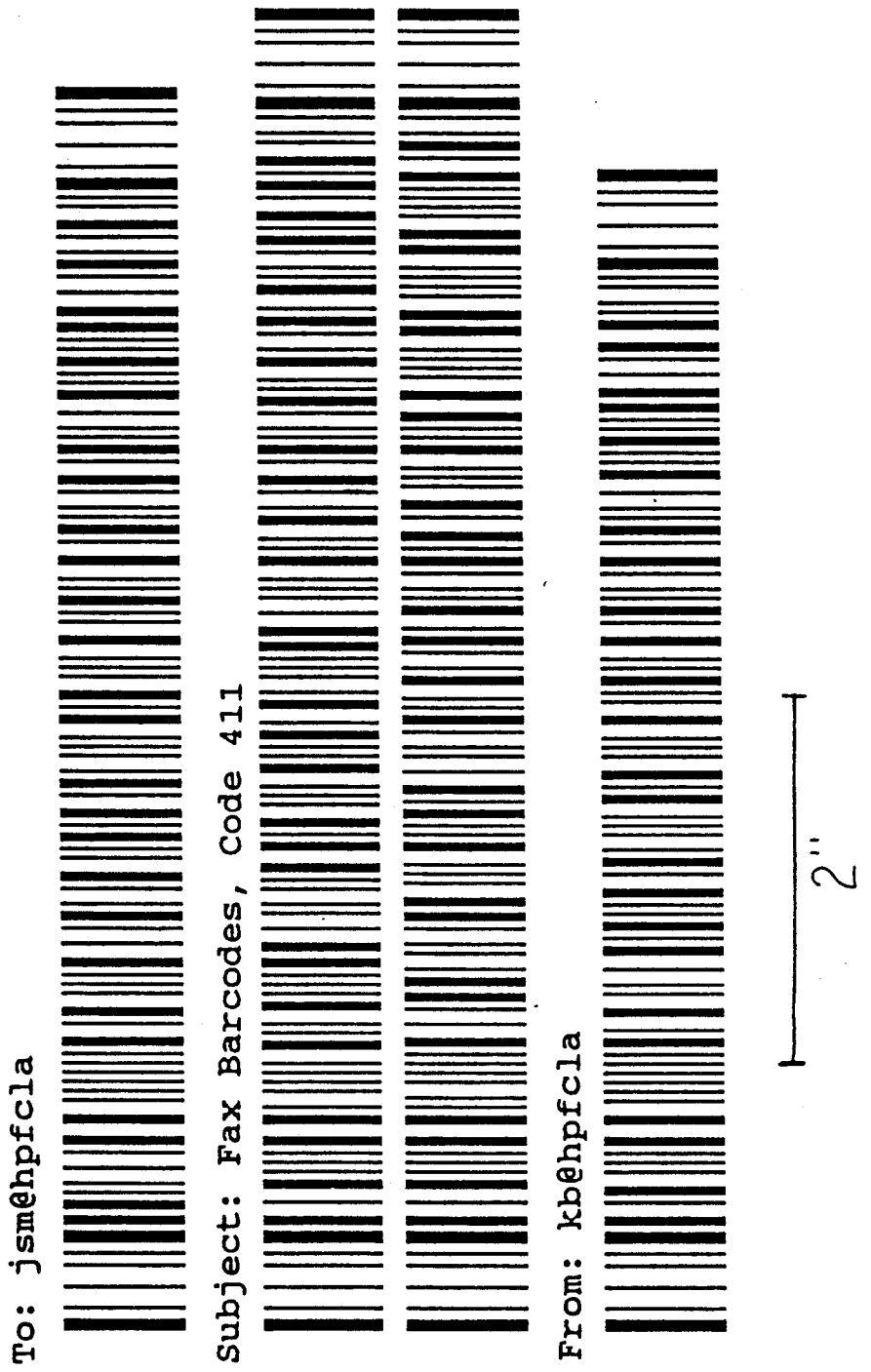
Figure 8C:
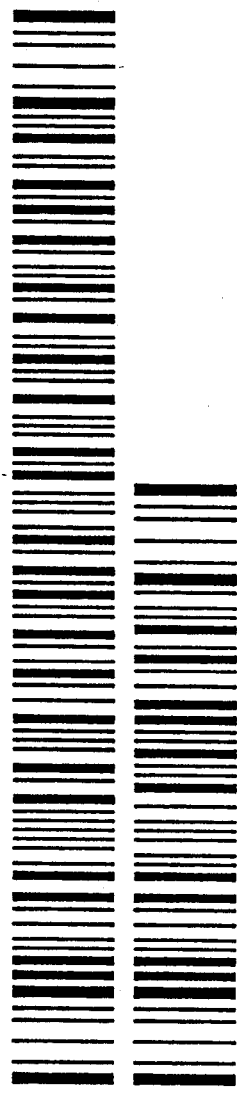
Figure 8C:
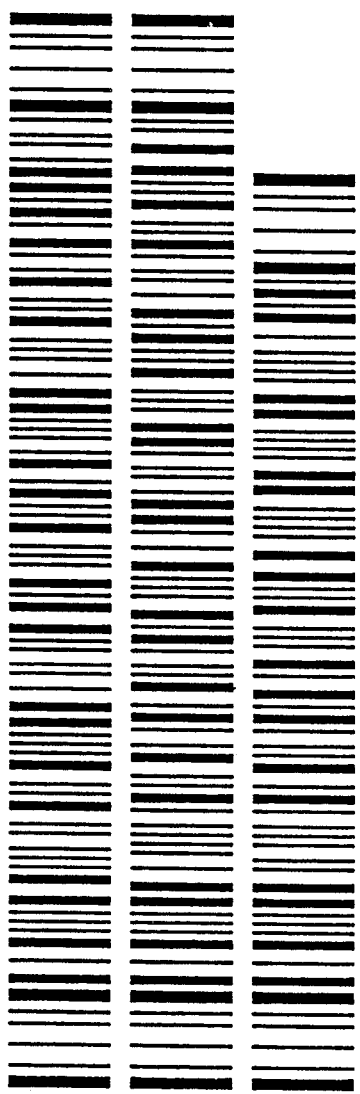
Figure 8C:
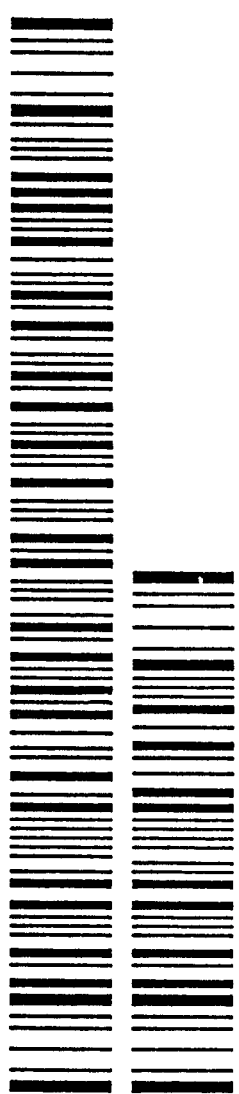
Figure 8D:
Figure 8D:
Figure 8D:
Figure 8D:
Figure 8D:
Figure 8D:
Figure 8D:
Figure 8D:
Figure 8D:

Refer now to FIG. 7, which is an illustration of a line of bar code 86 adapted to use on a header page intended to cooperate with the fax server 7 of FIG. 1. The particular header line shown is for a TO: header; it could as easily have been for any of the other types of headers. The particular line 86 shown is composed of fifteen bar code ciphers and represents the information shown in the corresponding ASCII header line 87.

The line of bar code 86 begins with a START/STOP cipher 88 and ends with a START/STOP cipher 93. Every physical line of bar code begins and ends with such START/STOP ciphers, regardless of whether or not it is part of a logical line composed of several physical lines. The second cipher in the line 86 (or in any physical line) is a TYPE cipher 89. This cipher indicates what kind of logical line (i.e., what its function is, TO:, FROM:, etc.) this physical line belongs to. The various TYPES may include:

| TO: | FROM: | SUBJECT: |
|---|---|---|

-continued

| XXX: | YYY: | ZZZ: |
|---|---|---| the X's, Y's and Z's in the line above represent the possibility of defining other types to service particular functions. For example, a TYPE cipher might be construed to mean "first quarter '90 bingo card", which would implicitly indicate a particularly formatted request for information.

In addition to all the types mentioned to this point is a type we may call "NCT" (No Coded Type). When a header has type NCT it means that the header does indeed have a type, but rather than being indicated directly by the cipher the type is spelled out by the ASCII symbols in the content portion of the header. To extend the bingo card example above, one might find the NCT cipher followed by 1Q90BINGO".

Although our preferred method of identifying header type is by the use of a TYPE cipher as explained above (either as expressly predefined type or the NCT type followed by a definition in the content portion), it entirely conceivable that the notion of a type indicating cipher could be dispensed with in favor of simply including the keywords TO:, FROM:, etc. in the content portion. The use of the START/STOP ciphers and the LINE OF mechanism (described below) would still work as before. Now the problem becomes one of parsing the content portion to determine what use to make of it.

The third cipher in any physical line is a LINE OF cipher 90. This cipher indicates how many physical lines comprise the logical line, and which one of that number this particular physical line represents. In the case where there is but one physical line in the logical line the LINE OF cipher 90 will be a bar code pattern whose meaning is "one of one". If a logical line has two physical lines then one of those two will have a LINE OF cipher whose meaning is "one of two" and the other one will have a meaning of "two of two". The other meanings are "one of three", "two of three", . . . "four of four", etc. Since there are 150 different values for a cipher in the preferred bar code, the preceding list goes as high as sixteen of sixteen (not enough ciphers are available to complete the "of seventeen" series).

An extension mechanism is provided to allow the number of physical lines in a logical line of bar code to be greater than sixteen. This works as follows. One of the ciphers falling into what would otherwise be part of the "of seventeen" series is selected to indicate that the next two ciphers M and N indicate "M of N", bringing the number of possible physical lines up to a full one hundred and fifty.

Following the LINE OF cipher 90 occur zero or more ciphers 91 representing the "actual content" of the line. In the example shown in the figure this is the (fictitious) string "jsm@hpfcrp". After the content string 91 occurs a CHECKSUM cipher 92, which is in turn followed by the STOP cipher 93.

The line of bar code 86 and the line of ASCII characters 87 in FIG. 7 were produced by a program called MAKE$_{13}$HEADER. The source code for the program appears in APPENDIX I. MAKE$_{13}$HEADER accepts as input an indication of what type of line to produce, along with any content string. The output is produced upon a fax machine or upon a suitable graphics output device, say a display monitor or a high resolution printer. The height of the resulting line of bar code is selectable, from a minimum of one pixel to as high as the output medium can produce. What height buys is immunity to skew, and since most fax machines have pretty good paper transport mechanisms, a minimum height of one half of an inch is plenty, even for lines of maximum width. It was found that most machines would jam the paper before continuing to feed a sheet with sufficient skew to disturb the reading of full width lines of bar code only one quarter of an inch high.

The widths of the wide and narrow lines and of the wide and narrow spaces between the lines are not fixed at any particular size, although there are preferred ratios amongst them. Within the limits of practicality, the MAKE₁₃HEADER program can make the ciphers wider or narrower, as desired. In cooperation with this, the bar code reading capability in the fax server does not expect set sizes of bar code ciphers, understanding instead what the preferred ratios are, and accepting (within practical limits) arbitrarily scaled ciphers. Accordingly, the length of a line of bar code is not rigidly cast in advance, either, except that a maximum physical length can be specified to respect output device limitations. Thus, a given logical line might fit on a single physical line if the cipher width is set at or below a certain size, but will automatically be broken and reformatted into two (or more) physical lines either as the number of characters in the content string increases or as the selected width of the ciphers is increased.

FIGS. 8A-D illustrate what has been discussed above. These figures represent four different instances of the same header page. (Other useful stuff that might be found on an actual header page, such as company logos, reply phone numbers, page count, time and date have been omitted for clarity. Those things would not affect the operation of the invention, since they are not bar code, and they can appear in any convenient locations.) Each of these four figures is logically equivalent to the other three, although they are each different in various physical respects. In particular, note that in FIG. 8A all three of the TO:, SUBJECT: and FROM lines fit on respective single physical lines. In the following figures various ones (or all) of the logical lines are broken into instances of multiple physical lines. A careful inspection of those instances will reveal the existence of START and STOP ciphers for each physical line, as well as the different TYPE and LINE OF ciphers.

Figure 9:
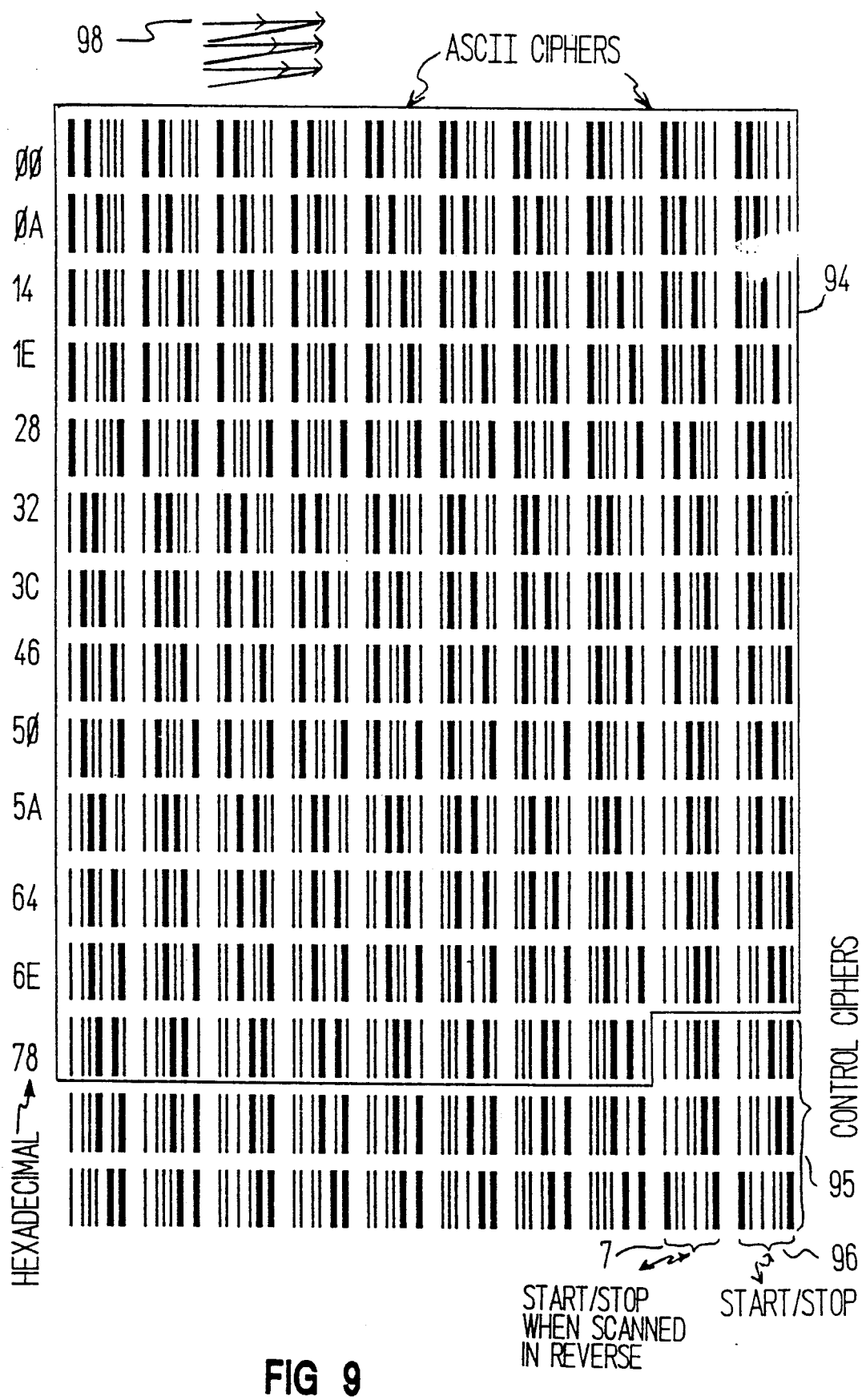
FIG. 9 is an illustration of the ciphers of a particular bar code preferred for use with the invention.

Refer now to FIG. 9, which is an illustration of the bar code preferred for use with the invention. The figures shows one hundred and fifty ciphers, of which a portion 94 of one hundred and twenty eight represent either the ASCII character set or the ordinal numbers associated with the "line of" mechanism for multi-line bar codes. The remaining portion 95 of twenty-two ciphers are available for control codes, as well as for use as ordinals in the multi-line mechanism. At the left-hand side of the portion 64 is a column of hexadecimal addresses. Each address indicates a starting address for the left-hand edge of the associated row in the portion 94. The individual ciphers in the portion 94 have addresses that increase from left to right along rows, and increase from top to bottom by rows, as indicated by the arrows 98. The hexadecimal addresses of the ciphers identify the corresponding ASCII character according to the arrangement depicted in Table I.

Finally, note ciphers 96 and 97; these are the START/STOP cipher. Cipher 96 is the START/STOP cipher as scanned in the forward direction, and cipher 97 is the same cipher when scanned in the reverse direction.

TABLE I

| 00 | nul | 01 | soh | 02 | stx | 03 | etx | 04 | eot | 05 | enq | 06 | ack | 07 | bel |
|---|---|---|---|---|---|---|---|---|---|---|---|---|---|---|---|
| 08 | bs | 09 | ht | 0a | nl | 0b | vt | 0c | np | 0d | cr | 0e | so | 0f | si |
| 10 | dle | 11 | dc1 | 12 | dc2 | 13 | dc3 | 14 | dc4 | 15 | nak | 16 | syn | 17 | etb |
| 18 | can | 19 | em | 1a | sub | 1b | esc | 1c | fs | 1d | gs | 1e | rs | 1f | us |
| 20 | sp | 21 | ! | 22 | " | 23 | # | 24 | $ | 25 | % | 26 | & | 27 | ' |
| 28 | ( | 29 | ) | 2a | * | 2b | + | 2c | , | 2d | — | 2e | . | 2f | / |
| 30 | 0 | 31 | 1 | 32 | 2 | 33 | 3 | 34 | 4 | 35 | 5 | 36 | 6 | 37 | 7 |
| 38 | 8 | 39 | 9 | 3a | : | 3b | ; | 3c | < | 3d | = | 3e | > | 3f | ? |
| 40 | @ | 41 | A | 42 | B | 43 | C | 44 | D | 45 | E | 46 | F | 47 | G |
| 48 | H | 49 | I | 4a | J | 4b | K | 4c | L | 4d | M | 4e | N | 4f | O |
| 50 | P | 51 | Q | 52 | R | 53 | S | 54 | T | 55 | U | 56 | V | 57 | W |
| 58 | X | 59 | Y | 5a | Z | 5b | [ | 5c | \ | 5d | ] | 5e | ^ | 5f | _ |
| 60 | ` | 61 | a | 62 | b | 63 | c | 64 | d | 65 | e | 66 | f | 67 | g |
| 68 | h | 69 | i | 6a | j | 6b | k | 6c | l | 6d | m | 6e | n | 6f | o |
| 70 | p | 71 | q | 72 | r | 73 | s | 74 | t | 75 | u | 76 | v | 77 | w |
| 78 | x | 79 | y | 7a | z | 7b | { | 7c | \| | 7d | } | 7e | ~ | 7f | del |

One conventional bar code in wide use today is the "code-39" bar code. The name arises from the use of three wide elements (two black and one white) out of a total of nine. The problem with code-39 is that it has only ninety-some ciphers, while at least one hundred and twenty-eight are need for a full implementation of ASCII, with preferably a few more ciphers available for use as control characters. The bar code depicted in FIG. 9 may be termed "code-411", as it uses eleven total elements, of which four are wide (two white and two black) and seven are thin (three white and four black). Each cipher starts and ends with black, and elements alternate between black and white. Ciphers may be separated by an arbitrary amount of white.

Table II lists, according to an arbitrarily selected algorithm for ordering the ciphers, the binary coded hexadecimal representation of the code-411 bar code (the "0x" is the convention in the C programming language for denoting hexadecimal integers, and is not itself part of the bit pattern). In the hex representation a one denotes a wide element (whether white or black) and a zero denote a thin element. Replace each of the three hex digits with its binary equivalent, and take the right-most eleven bits of the twelve bits. The most-significant bit of the resulting hex code corresponds to the left-most element of a cipher that is right side up. It will also be necessary to recall that each cipher begins and ends with black elements, and that black and white elements occur in strict alternation.

TABLE II

| | | | | | | | | | |
|---|---|---|---|---|---|---|---|---|---|
| 0x780, | 0x720, | 0x708, | 0x702, | 0x5a0, | 0x588, | 0x582, | 0x528, | 0x522, | 0x50a |
| 0x6c0, | 0x660, | 0x648, | 0x642, | 0x4e0, | 0x4c8, | 0x4c2, | 0x468, | 0x462, | 0x44a |
| 0x690, | 0x630, | 0x618, | 0x612, | 0x4b0, | 0x498, | 0x492, | 0x438, | 0x432, | 0x41a |
| 0x684, | 0x624, | 0x60c, | 0x606, | 0x4a4, | 0x48c, | 0x486, | 0x42c, | 0x426, | 0x40e |
| 0x681, | 0x621, | 0x609, | 0x603, | 0x489, | 0x483, | 0x423, | 0x40b, | 0x3c0, | 0x360 |
| 0x348, | 0x342, | 0x1e0, | 0x1c8, | 0x1c2, | 0x168, | 0x162, | 0x14a, | 0x390, | 0x330 |
| 0x318, | 0x312, | 0x1b0, | 0x198, | 0x192, | 0x138, | 0x132, | 0x11a, | 0x384, | 0x324 |
| 0x30c, | 0x306, | 0x1a4, | 0x18c, | 0x186, | 0x12c, | 0x126, | 0x10e, | 0x381, | 0x321 |
| 0x309, | 0x303, | 0x1a1, | 0x189, | 0x183, | 0x129, | 0x123, | 0x10b, | 0x2d0, | 0x270 |
| 0x258, | 0x252, | 0x0f0, | 0x0d8, | 0x0d2, | 0x078, | 0x072, | 0x05a, | 0x2c4, | 0x264 |
| 0x24c, | 0x246, | 0x0e4, | 0x0cc, | 0x0c6, | 0x06c, | 0x066, | 0x04e, | 0x2c1, | 0x261 |
| 0x249, | 0x243, | 0x0e1, | 0x0c9, | 0x0c3, | 0x069, | 0x063, | 0x04b, | 0x294, | 0x234 |
| 0x21c, | 0x216, | 0x0b4, | 0x09c, | 0x096, | 0x03c, | 0x036, | 0x01e, | 0x291, | 0x231 |
| 0x219, | 0x213, | 0x0b1, | 0x099, | 0x093, | 0x039, | 0x033, | 0x01b, | 0x285, | 0x225 |
| 0x20d, | 0x207, | 0x0a5, | 0x08d, | 0x087, | 0x02d, | 0x027, | 0x00f, | 0x429, | 0x4a1 |

When produced by the program MAKE$_{13}$HEADER (APPENDIX I) certain default parameters are used. These include:

Thickness of wide black=0.0100"
Thickness of wide white=0.0133"
Thickness of thin black=0.0033"
Thickness of thin white=0.0066"
Intercipher spacing=one thin white
Height of bar code elements=0.50"

In addition, the START/STOP cipher (as produced by MAKE$_{13}$HEADER) is fifty percent larger in all dimensions except height. This is not an absolute requirement; it is done simply as a safety measure to ensure added reliability.

The above default values were chosen to facilitate reliable readability after fax-photocopy—fax cycles. Both faxing and photocopying tend to cause changes in black widths, even if there is no enlargement or reduction in the overall size of the document as a whole. The default height was selected to allow as much as three and one half degrees of skew in a received document of eight and one half inches in width. Our experiments suggest that the nature of the paper transport mechanism in most fax machines limits even deliberately induced skew to approximately three degrees.

Refer now to FIG. 10, wherein is depicted in schematic form one way that a "bingo card" 99 could be arranged for use with the invention. As indicated in the figure, one or more lines of bar code 100 identify the bingo card to the fax server. An array of check boxes 101 is located on the card. These may be in a known spatial relationship to suitable targets 105 and 106, or perhaps simply in fixed relation to the bar code 100. It is also possible that the edges of the check boxes in the array are independently recognizable, and that the check boxes can therefore be arbitrarily located. Associated with each check box is a field of text 102. Each field of text contains a human readable explanation of what is to be understood by placing a mark inside the associate check box. For example, if the bingo card 99 were a request for literature, each field of text 102 would contain the title or description of a piece of literature that could be requested. An optional encoding matrix of check boxes may be included to allow the sender of the card to convey other information, such as a reply phone number. In that particular example, a ten by ten array of check boxes could serve to encode an area code followed by a seven digit phone number. In many instances this would be unnecessary, as the requested information could simply be faxed back as part of the same phone call, relieving the fax server from even needing to know the phone number of the caller. An optional arrow 104 indicates a direction to feed the image of the bingo card 99 through the fax machine, in the event there is some advantage to this. What was said earlier about document erection still stands, but absent some instruction like arrow 104 the fax server may be forced to store and manipulate an entire graphics image of the bingo card if sideways or angled cards are faxed. The information is still all there, but now the scan lines of the fax machine are not essentially parallel to the "axis of information progression" in the document, and more complicated algorithms would be required.

The image of the bingo card 99 is distributed in any convenient fashion; e.g., in a magazine. To use the card the respondent fills it out and either places it in a plastic sleeve or photo copies it onto full size paper prior to faxing. Then he faxes it to the number indicated.

The faxable bingo card is not limited in its application to situations involving a static or predetermined response, such as replying with a prewritten document. It may also be used in conjunction with replies that are custom generated by the fax server (or other application at the destination) at the time the request or other transaction is undertaken. Say, for example, an account holder wishes a printed statement indicated the status of his account. Or consider, as a second example, a case where the bingo card is filled out and faxed in order to place an order for merchandise. Upon receipt of the order the fax server immediately prepares and sends an order acknowledgment, confirming what was ordered and indicating the billing arrangements. While remote ordering systems can be based on tones transmitted from a telephone keypad, they are awkward with regard to verification and error correction. The bingo card has the advantage that it can be filled out, studied for correctness, and altered if need be. What is more, the faxing of the bingo card is, as far as the user is concerned, a unitary operation once the proper phone number is dialed. There is no worry about accidentally pressing the wrong key during the order entry process, or having a key produce either a missing or double burst of tone as sometimes happens when the finger is not placed squarely in the center of the key, resulting in a binding action within the key.

APPENDIX I

```
1   /************************************************************************/
2   /* Program to generate code-411 bar codes for FAX addressing.           */
3   /*                                                                      */
4   /* Genesis Oct. 31, 89                                                  */
5   /* Author: Ken Burgess                                                  */
6   /*                                                                      */
7   /* Last Edit Nov. 16, 89                                                */
8   /************************************************************************/
9
10  #include <stdio.h>
11  #include <sys/types.h>
12  #include <string.h>
13  #include "bc411.h"
14
15  /*********************** Constants *************************************/
16
17  #define WIDE_BAR   3.0
18  #define THIN_BAR   1.0
19  #define WIDE_SPACE 4.0
20  #define THIN_SPACE 2.0
21  #define SS_SCALE   1.5
22
23  #define MAX_DOTS 2300  /* Max dots hoiz on a page, leave some margin */
24
25  /*********************** Defaults **************************************/
26
27  int bar_height = 150;
28  int bar_width = 3;
29  float pad = 1; /* Inter character spacing (* bar_widths) */
30
31
32  /************************************************************************/
33
34  /* unsigned short code411ciphers[150] defined in 411.h */
35
36  int line_of_id[16][16];
37
38  char *address = NULL;
39  char *subject = NULL;
40  char *from    = NULL;
41
42
43  /************************************************************************/
44  void usage(cmd)
45      char *cmd;
46  {
47    fprintf(stderr, "Usage %s: \
48  To generate barcodes on a header page for FAX addressing\n\
49  \t[-w <width> (5)] [-h <height> (150)] [-p <pad> (1)]\n\
50  \t[-f <from>] [-s <subject>] <address>\n",cmd);
51    exit(1);
52  }
53
54  main(argc,argv)
55      int argc;
56      char **argv;
57  {
58    extern char *optarg;
59    extern int optind;
60    extern int opterr;
61    int c;
62
63    /* Process Arguments */
64    opterr = 0;
65    while ((c = getopt(argc,argv,"crw:h:p:s:f:")) != EOF) {
66      switch(c) {
67        case 's':
68          subject = optarg;
69          break;
70        case 'f':
```

```
            from = optarg;
            break;
          case 'w':
            bar_width = atoi(optarg);
            break;
          case 'h':
            bar_height = atoi(optarg);
            break;
          case 'p':
            pad = atoi(optarg);
            break;
          default:
            fprintf(stderr,"Unrecognized option.\n");
            usage(argv[0]);
        }
      } if (optind + 1 != argc) {
        fprintf(stderr,"Address required.\n");
        usage(argv[0]);
      } else {
        address = argv[optind];
      } init_line_of_array();
      make_header_page();
    }

/************ Printer dependant escape sequences ******************/ reset_printer()
{
  printf("\033E");
} h_pos_a(dots) /* Set abs horiz position */
int dots;
{
  printf("\033*p%dX",dots);
} v_pos_r(dots) /* Set rel vertical position */
int dots;
{
  printf("\033*p+%dY",dots);
} set_height(dots)
int dots;
{
  printf("\033*c%dB",dots);
} set_width(dots)
int dots;
{
  printf("\033*c%dA",dots);
} print_bar(width)
float(width);
{
  int w;

w = (int) width * bar_width;
  set_width(w);
  printf("\033*c0P");
  printf("\033*p+%dX",w);
} print_space(width)
float width;
```

```
144     {
145       int w;
146
147       w = (int) width * bar_width;
148       printf("\033*p+%dX",w);
149     }
150
151
152     /****************************************************************************/
153
154     init_line_of_array()
155     {
156       char i;
157       int line,max_line;
158
159       /* line_of_id is a 2d array indicating which line of a set "this" line   */
160       /* is. line N of M is identified by the char indexed by line_of_id[N][M] */
161       /* With 150 tokens the maximum number of lines is 16. A "$" in the       */
162       /* line_of_id field will indicate two tokens follow N,M which expand the */
163       /* number of possible lines to 150 (or the char set size - a few)        */
164       /* The progression is as follows ...                                     */
165       /* 1 of 1 = 0                                                            */
166       /* 1 of 2 = 1, 2 of 2 = 3                                                */
167       /* 1 of 3 = 4, 2 of 3 = 5, 3 of 3 = 6                                    */
168       /* etc ... the array is 0 based, the token for 1 of 1 is in [0][0]       */
169
170       i = 0;
171       for (max_line=0; max_line<16; max_line++) {
172         for (line=0; line<=max_line; line++) {
173           line_of_id[line][max_line] = i++;
174         }
175       }
176     }
177
178     print_char_bars(c,scale)
179       int c;
180       float scale;
181     {
182       int i,bit,space;
183       unsigned short cipher;
184
185       cipher = code411ciphers[c];
186       for (i=0; i<11; i++) {
187         bit = (1 << (10-i));
188         space = (i & 1);
189         if (space) {
190           if (cipher & bit) print_space(WIDE_SPACE * scale);
191           else print_space(THIN_SPACE * scale);
192         } else {
193           if (cipher & bit) print_bar(WIDE_BAR * scale);
194           else print_bar(THIN_BAR * scale);
195         }
196       }
197       print_space(pad*THIN_SPACE,scale);
198     }
199
200     print_barcode(string,len)
201       int len;
202       char *string;
203     {
204       int c,i,cs;
205
206       cs = 0;
207       print_char_bars(SS_CIPHER,SS_SCALE); /* Start character */
208       for (i=0; i<len; i++) {
209         c = (int) string[i];
210         cs += c; /* checksum includes only characters in string */
211         print_char_bars(c,1.0);
212       }
213       cs %= 100; /* checksum is mod 100 */
214       print_char_bars(cs,1.0); /* Include a one character checksum */
215       print_char_bars(SS_CIPHER,SS_SCALE); /* Stop character */
216     }
217
```

```
218    print_barcode_lines(message_id,string)
219      char message_id;
220      char *string;
221    {
222      char str[150];
223      int len,max_chars,num_lines;
224      int i,j,m,ln;
225      int cdots;
226
227      len = strlen(string);
228      cdots = (int) ((((4*THIN_BAR)+(2*WIDE_BAR)+(3*THIN_SPACE)+(2*WIDE_SPACE)+
229        (pad*THIN_SPACE)) * bar_width) + 0.5);
230      max_chars = MAX_DOTS / cdots;
231      max_chars -= 3; /* Reduce by overhead per line */
232      max_chars -= (int) ((2.0 * SS_SCALE) + 0.5); /* Subtract start chars */
233      if(len % max_chars) num_lines = (len / max_chars) + 1;
234      else num_lines = (len / max_chars); /* Comes out full length */
235
236      if(num_lines > 16) {
237        fprintf(stderr,"Line too long. Aborting...\n");
238        exit(1);
239      }
240
241      set_height(bar_height);
242      v_pos_r((int)(bar_height * 0.2)); /* Space below printed characters */
243      for (ln=0; ln<num_lines; ln++) {
244        i=0;
245        str[i++] = message_id;
246        str[i++] = (char) line_of_id[ln][num_lines-1];
247        m = (ln+1) * max_chars;
248        if(m > len) m = len;
249        for (j=(ln*max_chars); j<m; j++) {
250          str[i++] = string[j];
251        }
252        h_pos_a(50); /* Leave a little white space */
253        print_barcode(str,i);
254        v_pos_r((int)(bar_height * 1.2));
255      }
256      h_pos_a(0);
257      printf("\n"); /* So the next printed line won't overlap a barcode */
258    }
259
260    make_header_page()
261    {
262      reset_printer();
263      printf("To: %s",address);
264      print_barcode_lines(9,address);
265      if (subject != NULL) {
266        printf("Subject: %s",subject);
267        print_barcode_lines(10,subject);
268      }
269      if (from != NULL) {
270        printf("From: %s",from);
271        print_barcode_lines(11,from);
272      }
273      reset_printer();
274    }
```

APPENDIX II

```
1   #define MAX_BAR_CODES 64
2
3   static void
4   convert_fax_file(faxfd,sbufptr,fname)
5       register int faxfd;
6       struct stat *sbufptr;
7       register char *fname;
8   {
9       register int i;
10      register char *s;
11      int tmpfd;
12      FILE *tmpfptr;
13      unsigned long *offsets;
14      unsigned long npages;
15      unsigned long filesize;
16      unsigned long reqinfo_offset;
```

```
17        unsigned long offsets_offset;
18        unsigned long bits_per_line;
19        unsigned long hres;
20        unsigned long vres;
21        unsigned long faxdate;
22        unsigned long upside_down;
23        char csi[CSI_SIZE+ 1]; /* Extra byte for null termination */
24        char reqinfo[256];
25        char *barcodes[MAX_BAR_CODES];
26        int nbarcodes;
27        char *faxto;
28        int req_cmd;
29        char *req_replyto;
30        char *req_date;
31        extern char *malloc();
32
33        /* Attempt to lock the file so that only one process will attempt */
34        /* conversion of a particular fax file.                           */
35
36        if (lockf(faxfd,F_TLOCK,0) != 0)
37            return;
38
39        filesize = sbufptr->st_size;
40        if (   filesize < FAX_TMP_HEADER_SIZE
41            || read(faxfd,(char *)&npages,4) != 4
42            || read(faxfd,(char *)&reqinfo_offset,4) != 4
43            || read(faxfd,(char *)&offsets_offset,4) != 4
44            || read(faxfd,(char *)&bits_per_line,4) != 4
45            || read(faxfd,(char *)&hres,4) != 4
46            || read(faxfd,(char *)&vres,4) != 4
47            || read(faxfd,(char *)&faxdate,4) != 4
48            || read(faxfd,csi,CSI_SIZE) != CSI_SIZE ) {
49
50            (void) unlink(fname);
51            return;
52        }
53
54        if (   reqinfo_offset == 0
55            || offsets_offset == 0
56            || offsets_offset < reqinfo_offset
57            || bits_per_line == 0
58            || (offsets_offset + (4 * npages)) != filesize) {
59
60            (void) unlink(fname);
61 #ifdef DEBUG
62            log(EL5,"Size inconsistancy in file %s.\n",fname);
63 #endif
64            return;
65        }
66
67        /* Null terminate csi string */
68
69        csi[CSI_SIZE] = '\0';
70 #ifdef DEBUG
71        if (csi[0] == '\0')
72            log(EL5,"Read CSI: <Null>\n");
73        else
74            log(EL5,"Read CSI: %s\n",csi);
75 #endif
76
77        if (lseek(faxfd,reqinfo_offset,SEEK_SET) != reqinfo_offset) {
78            (void) unlink(fname);
79 #ifdef DEBUG
80            log(EL5,"Size inconsistancy in file %s.\n",fname);
81 #endif
82            return;
83        }
84
85
86        req_cmd = 0;
87        req_replyto = (char *)0;
88        req_date = (char *)0;
89        if ((i = offsets_offset - reqinfo_offset) > 0) {
90            if (read(faxfd,reqinfo,i) != i) {
91                (void) unlink(fname);
```

```
 92     #ifdef DEBUG
 93             log(EL5,"read failure on file %s.\n",fname);
 94     #endif
 95             return;
 96         }
 97
 98         req_cmd = (int)reqinfo[0];
 99         i--;
100         s = &reqinfo[1];
101         req_replyto = s;
102         while (i > 0 && *s != '\0') {
103             s++;
104             i--;
105         }
106
107         if (*s != '\0') {
108             (void) unlink(fname);
109     #ifdef DEBUG
110             log(EL5,"Illegal format in file %s.\n",fname);
111     #endif
112             return;
113         }
114
115         s++;
116         i--;
117         req_date = s;
118         while (i > 0 && *s != '\0') {
119             s++;
120             i--;
121         }
122
123         if (*s != '\0') {
124             (void) unlink(fname);
125     #ifdef DEBUG
126             log(EL5,"Illegal format in file %s.\n",fname);
127     #endif
128             return;
129         }
130
131     #ifdef DEBUG
132         log(EL5,"req_cmd=%c req_replyto=%s req_date=%s\n",
133                 req_cmd,req_replyto,req_date);
134     #endif
135         }
136
137         nbarcodes = 0;
138         if (req_cmd == 0) {
139             if (npages == 0) {
140                 (void) unlink(fname);
141     #ifdef DEBUG
142             log(EL5,"Number of Pages is zero in file %s.\n",fname);
143     #endif
144             return;
145         }
146
147         offsets = (unsigned long *)malloc(4 * npages);
148         if (offsets == (unsigned long *)0) {
149             (void) unlink(fname);
150     #ifdef DEBUG
151             log(EL5,"Malloc Failure.\n");
152     #endif
153             return;
154         }
155
156         if (read(faxfd,(char *)offsets,4 * npages) != (4 * npages)) {
157             (void) unlink(fname);
158     #ifdef DEBUG
159             log(EL5,"Read failure reading offset table in %s.\n",fname);
160     #endif
161             return;
162         }
163
164     #ifdef DEBUG
165         log(EL5,"Checking %s for barcodes.\n",fname);
166     #endif
```

```
167
168            /* get size of first page */
169
170            if (npages == 1)
171                i = filesize - offsets[0];
172            else
173                i = offsets[1] - offsets[0];
174
175            nbarcodes = get_barcodes(faxfd,offsets[0],i,bits_per_line,
176                            barcodes,MAX_BAR_CODES,&upside_down);
177
178    #ifdef DEBUG
179            log(EL5,"get_barcodes() returned %d.\n",nbarcodes);
180    #endif
181        }
182
183        if ((s = allocate_tmpfile(FAX_RCV_DIR,'M',&tmpfd,FALSE)) == (char *)0) {
184            log(EL1,"Could not allocate temp file for conversion.\n");
185            return;
186        }
187
188        (void) unlink(s);
189
190        if ((tmpfptr = fdopen(tmpfd,"w+")) == (FILE *)0) {
191            (void) close(tmpfd);
192            return;
193        }
194
195        faxto = write_headers(tmpfptr,nbarcodes,barcodes,faxdate,npages,csi,
196                            req_cmd,req_replyto);
197
198        if (req_cmd != 0)
199            write_body(tmpfptr,req_cmd,req_date,npages);
200
201        if (npages > 0) {
202            if (write_fax(tmpfptr,faxfd,bits_per_line,hres,vres,filesize,
203                            npages,offsets,upside_down) != 0) {
204                (void) close(tmpfd);
205                (void) unlink(fname);
206                return;
207            }
208        }
209
210        if (lseek(tmpfd,0,SEEK_SET) != 0) {
211            (void) close(tmpfd);
212            return;
213        }
214
215        if (send_mail(tmpfd,faxto) == 0) {
216
217    #ifdef DEBUG
218            log(EL5,"Fax successfully sent to %s\n",faxto);
219    #endif
220            (void) unlink(fname);
221        }
222
223        (void) close(tmpfd);
224        return;
225    }
226
227    char *
228    write_headers(tmpfptr,nbarcodes,barcodes,faxdate,npages,csi,
229                    req_cmd,req_replyto)
230        FILE *tmpfptr;
231        int nbarcodes;
232        char *barcodes[];
233        unsigned long faxdate;
234        unsigned long npages;
235        char *csi;
236        int req_cmd;
237        char *req_replyto;
238    {
239        register int i;
240        char *faxto_ptr;
241        char *faxfrom_ptr;
```

```
242         char *faxsubject_ptr;
243         char *datestring;
244         char  faxhdrbuf[128];
245
246
247         if (req_cmd != 0) {
248             sprintf(faxhdrbuf,"To: %s",req_replyto);
249             faxto_ptr = string_save(faxhdrbuf);
250             faxsubject_ptr = "Subject: Fax Request Response\n";
251             faxfrom_ptr    = (char *)0;
252         }
253         else {
254
255             faxto_ptr      = (char *)0;
256             faxfrom_ptr    = (char *)0;
257             faxsubject_ptr = (char *)0;
258
259             /* search for To:, X-Fax-From:, and Subject: headers */
260
261             for (i = 0; i < nbarcodes; i++) {
262
263                 if (strncmp(barcodes[i],"To: ",4) == 0) {
264                     faxto_ptr = barcodes[i];
265                     barcodes[i] = (char *)0;
266                 }
267                 else {
268                     if (strncmp(barcodes[i],"X-Fax-From: ",12) == 0) {
269                         faxfrom_ptr = barcodes[i];
270                         barcodes[i] = (char *)0;
271                     }
272                     else {
273                         if (strncmp(barcodes[i],"Subject: ",9) == 0) {
274                             faxsubject_ptr = barcodes[i];
275                             barcodes[i] = (char *)0;
276                         }
277                     }
278                 }
279             }
280         }
281
282         /* Write Full Name header */
283
284         fprintf(tmpfptr,"Full-Name: %s\n",FAXD_FULL_NAME);
285
286         if (npages != 0) {
287
288             /* Write content type header */
289
290             fputs("Content-Type: X-Fax; 1.0\n",tmpfptr);
291         }
292
293         /* Write Received by header */
294
295         datestring = get_datestring(faxdate);
296         fprintf(tmpfptr,"X-Fax-Received: by Fax-Daemon (%s); %s\n",faxd_hostname,
297                                                                   datestring);
298
299         /* Write fax machine id header if we have a non-null csi */
300
301         if (csi[0] != '\0')
302             fprintf(tmpfptr,"X-Fax-Machine-Id: %s\n",csi);
303
304         /* Write barcoded headers */
305
306         for (i = 0; i < nbarcodes; i++) {
307
308             if (barcodes[i] != (char *)0) {
309                 fputs(barcodes[i],tmpfptr);
310                 putc('\n',tmpfptr);
311             }
312         }
313
314         if (npages != 0) {
315
316             /* Write X-Fax-Pages header */
```

```
            fprintf(tmpfptr,"X-Fax-Pages: %d\n",npages);
        }

/* Write date header */ fprintf(tmpfptr,"Date: %s\n",datestring);

/* Write To header. save for return later */ if (faxto_ptr == (char *)0) {
            sprintf(faxhdrbuf,"To: %s",default_to);
            faxto_ptr = string_save(faxhdrbuf);
            faxsubject_ptr = "Subject: General Delivery Fax\n";
        }

/* Write fax from header if one exists */ if (faxfrom_ptr != (char *)0) {
            fputs(faxfrom_ptr,tmpfptr);
            putc('\n',tmpfptr);
        } fputs(faxto_ptr,tmpfptr);
        putc('\n',tmpfptr);

/* Write subject header if one exists */ if (faxsubject_ptr != (char *)0) {
            fputs(faxsubject_ptr,tmpfptr);
            putc('\n',tmpfptr);
        } putc('\n',tmpfptr); /* Separate headers from body */
        fflush(tmpfptr);

/* Skip over To: and return address to send this fax to */ faxto_ptr += 3;
        while (*faxto_ptr == ' ')
            faxto_ptr++;

return(faxto_ptr);
    } void
    write_body(tmpfptr,req_cmd,req_date,npages)
        FILE *tmpfptr;
        int req_cmd;
        char *req_date;
        int npages;
    { if (req_date == (char *)0 || *req_date == '\0')
            req_date = "<Date Unknown>";

fprintf(tmpfptr,"Date of Request: %s\n\n",req_date);

switch (req_cmd) { case 'P':
            if (npages == 0) {
                fprintf(tmpfptr,"Your fax poll request completed successfully,\
    however there was no\n");
                fprintf(tmpfptr,"data available to receive at the time of the\
    poll.\n\n");
            }
            else {
                fprintf(tmpfptr,"Your fax poll request completed successfully.\
    The received data\n");
                fprintf(tmpfptr,"is enclosed.\n\n");
            }
            break;

case 'S':
```

```
393              break;
394
395         case 'T':
396              if (npages == 0) {
397                   fprintf(tmpfptr,"Your fax combination send/poll request\
398         completed successfully, however\n");
399                   fprintf(tmpfptr,"there was no data available to receive\
400         at the time of the poll.\n\n");
401              }
402              else {
403                   fprintf(tmpfptr,"Your fax combination send/poll request\
404         completed successfully. The\n");
405                   fprintf(tmpfptr,"received data is enclosed.\n\n");
406              }
407              break;
408
409         default:
410              fprintf(tmpfptr,"Your fax request of UNKNOWN type\
411         completed successfully.\n\n");
412              break;
413         }
414
415         fflush(tmpfptr);
416         return;
417    }
418
419    #define ENC(c) (((c) & 077) + ' ')
420
421    int
422    write_fax(tmpfptr,faxfd,bits_per_line,hres,vres,filesize,npages,
423              old_offsets,upside_down)
424         FILE *tmpfptr;
425         int faxfd;
426         unsigned long bits_per_line;
427         unsigned long hres;
428         unsigned long vres;
429         unsigned long filesize;
430         unsigned long npages;
431         unsigned long *old_offsets;
432         unsigned long upside_down;
433    {
434         register int pageno;
435         register int nlines;
436         register int i;
437         register unsigned char *s;
438         short linecodes[FAX_MAX_PPL];
439         unsigned char outline[2048];
440         int pagesize;
441         unsigned long tmp;
442         unsigned long cur_offset;
443         unsigned long save_offset;
444         unsigned long *new_offsets;
445         unsigned long *page_nlines;
446         extern char *malloc();
447
448         /* Allocate space for new_offsets and page_nlines arrays */
449
450         new_offsets = (unsigned long *)malloc(8 * npages);
451         if (new_offsets == (unsigned long *)0) {
452              log(EL1,"Malloc Failure.\n");
453              return(-1);
454         }
455
456         page_nlines = new_offsets + npages;
457
458         fputs("begin 444 fax\n",tmpfptr);
459         uuinit();
460
461         cur_offset = 0;
462         for (pageno = 0; pageno < npages; pageno++) {
463
464              new_offsets[pageno] = cur_offset;
465
```

```
466         if (pageno == (npages - 1))
467             pagesize = filesize - old_offsets[pageno];
468         else
469             pagesize = old_offsets[pageno + 1] - old_offsets[pageno];
470
471         /* Call set_raw_page to initialize fax decoding state machine */
472
473         if (set_raw_page(faxfd,old_offsets[pageno],
474                          pagesize,bits_per_line) != 0) {
475             log(EL1,"Conversion failure.\n");
476             return(-1);
477         }
478
479         if (upside_down == 0) {
480             nlines = 0;
481             while ((i = read_raw_line(faxfd,&linecodes[0])) > 0) {
482                 nlines++;
483
484                 i = encode_fax_line(&outline[2],i,&linecodes[0]);
485                 s = outline;
486                 *s++ = (i >> 8) & 0xff;
487                 *s   = i & 0xff;
488                 i += 2;
489                 uuwrite(tmpfptr,outline,i);
490                 cur_offset += i;
491             }
492         }
493         else {
494             cur_offset += write_upside_down_page(faxfd,tmpfptr,
495                                         outline,linecodes,&nlines);
496         }
497
498 #ifdef DEBUG
499         log(EL5,"Number of lines on page #%d: %d\n",pageno+1,nlines);
500 #endif
501
502         page_nlines[pageno] = nlines;
503     }
504
505     save_offset = cur_offset;
506
507     filesize = cur_offset + 64 + 8 * npages;
508
509
510     tmp = FT_RAW; /* Type */
511     uuwrite(tmpfptr,(unsigned char *)&tmp,4);
512     tmp = 10; /* Version */
513     uuwrite(tmpfptr,(unsigned char *)&tmp,4);
514     memset(outline,'\0',32);
515     uuwrite(tmpfptr,outline,32);
516     uuwrite(tmpfptr,(unsigned char *)&filesize,4);
517     uuwrite(tmpfptr,(unsigned char *)&bits_per_line,4);
518     uuwrite(tmpfptr,(unsigned char *)&hres,4);
519     uuwrite(tmpfptr,(unsigned char *)&vres,4);
520     uuwrite(tmpfptr,(unsigned char *)&npages,4);
521     uuwrite(tmpfptr,(unsigned char *)new_offsets,4 * npages);
522     uuwrite(tmpfptr,(unsigned char *)page_nlines,4 * npages);
523     uuwrite(tmpfptr,(unsigned char *)&save_offset,4);
524
525     uuflush(tmpfptr);
526
527     fputs("end\n@eof\n",tmpfptr);
528     fflush(tmpfptr);
529
530     return(0);
531 }
532
533 int
534 send_mail(tmpfd,faxto)
535     int tmpfd;
536     char *faxto;
537 {
538     int childpid;
539     int status;
```

```
        /* Fork and exec rmail to deliver the fax */ if ((childpid = fork()) == -1)
            return(-1);

/* If parent, wait for child to die and check exit status. If zero */
        /* then remove fax file.                                           */ if (childpid != 0) { if (waitpid(childpid, &status, 0) == -1)
                return(-1);

if (!WIFEXITED(status) || WEXITSTATUS(status) != 0)
                return(-1);

return(0);
        }

/* Child */

/* close standard input and dup temp file to be fd 0 */

(void) close(0);
        if (dup(tmpfd) != 0)
            exit(1);

log(EL5,"Calling exec sendmail to %s\n",faxto);
        (void) execl("/usr/lib/sendmail","sendmail",
                    "-oeq","-oi","-ffaxd",faxto,0);

log(EL1,"Exec failed attempting delivery. errno=%d\n",errno);
        exit(1);
} define NHEADER_TYPES 12 static char *header_text[NHEADER_TYPES] = {
    /*  0 */    (char *)0,
    /*  1 */    (char *)0,
    /*  2 */    (char *)0,
    /*  3 */    (char *)0,
    /*  4 */    (char *)0,
    /*  5 */    (char *)0,
    /*  6 */    (char *)0,
    /*  7 */    (char *)0,
    /*  8 */    (char *)0,
    /*  9 */    "To:",
    /* 10 */    "Subject:",
    /* 11 */    "X-Fax-From:"
};

define MAX_TEXT_LEN 1024 int
get_barcodes(faxfd,pageoffset,pagesize,pagebpl,barcodes,
            maxbarcodes,upside_down)
    register int faxfd;
    unsigned long pageoffset;
    int pagesize;
    int pagebpl;
    char *barcodes[];
    int maxbarcodes;
    unsigned long *upside_down;
{
    register int i;
    short linecodes[FAX_MAX_PPL];
    int   ncodes;
    int   nbarcodes;
    int   cur_id;
    int   cur_line;
    int   cur_ofline;
    char  cur_text[MAX_TEXT_LEN + 1];
```

```
614         char cur_textlen;
615         char barcode_text[256];
616         int  barcode_id;
617         int  barcode_line;
618         int  barcode_ofline;
619         int  len;
620         int  reverse;
621
622         /* Call set_raw_page to initialize fax decoding state machine */
623
624         if (set_raw_page(faxfd,pageoffset,pagesize,pagebpl) != 0)
625             return(0);
626
627         /* Start processing page for barcodes */
628
629         nbarcodes = 0;
630         cur_id = -1;
631         cur_line = -1;
632         cur_ofline = -1;
633         cur_textlen = 0;
634         reverse = 2;  /* Don't know yet */
635
636         while ((ncodes = read_raw_line(faxfd,&linecodes[0])) > 0) {
637
638             if ((len = bar_decode(&barcode_id,&barcode_line,&barcode_ofline,
639                             barcode_text,ncodes,linecodes,&reverse)) >= 0) {
640
641                 barcode_text[len] = '\0';
642
643 #ifdef DEBUG
644                 log(EL5,"Got Good Barcode. id= %d line= %d of %d text=[%s]\n",
645                         barcode_id,barcode_line,barcode_ofline,barcode_text);
646 #endif
647
648                 if (   barcode_id != cur_id || barcode_line != cur_line
649                     || barcode_ofline != cur_ofline) {
650
651                     if (   barcode_line == 1
652                         || (   barcode_id == cur_id
653                             && barcode_ofline == cur_ofline
654                             && barcode_line == (cur_line + 1) ) ) {
655
656                         if (barcode_line == 1)
657                             cur_textlen = 0;
658
659                         i = strlen(barcode_text);
660                         if (cur_textlen + i > MAX_TEXT_LEN) {
661                             i = MAX_TEXT_LEN - cur_textlen;
662                             barcode_text[i] = '\0';
663                         }
664                         strcpy(&cur_text[cur_textlen],barcode_text);
665                         cur_textlen += i;
666
667                         cur_line = barcode_line;
668                         cur_ofline = barcode_ofline;
669                         cur_id = barcode_id;
670
671                         if (   cur_line == cur_ofline
672                             && nbarcodes < maxbarcodes) {
672
673
674                             if ((barcodes[nbarcodes] =
675                                     header_line(cur_id,cur_text))
676                                     != (char *)0) {
677
678                                 nbarcodes++;
679                             }
680                         }
681                     }
682                     else {
683                         cur_id = -1;
684                         cur_line = -1;
685                         cur_ofline = -1;
686                         cur_textlen = 0;
687                     }
```

```
688                 }
689             }
690         }
691
692 #ifdef DEBUG
693         log(EL5,"Reverse = %d\n",reverse);
694 #endif
695
696     *upside_down = reverse;
697
698     return(nbarcodes);
699 }
700
701 char *
702 header_line(id,text)
703     int id;
704     char *text;
705 {
706     register char *s1;
707     register char *s2;
708     char generic_header[128];
709     extern char *malloc();
710
711     if (id < 0)
712         return((char *)0);
713
714     if (id < NHEADER_TYPES && header_text[id] != (char *)0)
715         s1 = header_text[id];
716     else {
717         s1 = generic_header;
718         sprintf(generic_header,"X-Fax-Id-%d:",id);
719     }
720
721     if ((s2 = malloc(strlen(text) + strlen(s1) + 2)) == (char *)0)
722         return((char *)0);
723
724     strcpy(s2,s1);
725     strcat(s2," ");
726     strcat(s2,text);
727
728 #ifdef DEBUG
```

APPENDIX III

```
1   #define LINELEN 216
2   #define MAXBAR  40
3   #define MAXLENRLA 2048
4   #define NOCIPHER 255
5   #define MAX_WIDE 40
6
7   unsigned char ascii_of_cipher[2048];
8   int l_num[150];
9   int of_num[150];
10
11
12  /********************* Initialization *****************************/
13
14  static void init_line_of_tables()
15  {
16    char i;
17    int line,max_line;
18
19    i = 0;
20    for (max_line=0; max_line<16; max_line++) {
21      for (line=0; line<=max_line; line++) {
22        l_num[i] = line+1;
23        of_num[i] = max_line+1;
24        i++;
25      }
26    }
27  }
28
29
```

```
30    static void init_ascii_of_cipher_table()
31    {
32      int i;
33      for(i=0; i<2048; i++) ascii_of_cipher[i] = NOCIPHER;
34      for(i=0; i<150; i++) ascii_of_cipher[code411ciphers[i]] = (unsigned char) i;
35    }
36
37
38    /************************************************************************/
39    static int get_index_of_max(array)
40    short array[6];
41    {
42      int i,max,index_of_max;
43
44      index_of_max = 0;
45      max = 0;
46
47      for(i=0; i<6; i++) {
48        if (array[i] > max) {
49          max = array[i];
50          index_of_max = i;
51        }
52      }
53      return(index_of_max);
54    }
55
56
57    static int get_thin_bar_limits(start,rla,thin_limit_black,thin_limit_white)
58    int start;
59    short rla[MAXLENRLA];
60    int *thin_limit_black,*thin_limit_white;
61    {
62      int i,b;
63      short black[6];
64      short white[6];
65
66      i = start;
67      for(b=0; b<5; b++) {
68        black[b] = rla[i++];              /* start points to a black */
69        white[b] = rla[i++];
70      }
71      black[5] = rla[i];                  /* include last black bar */
72      white[5] = 0;
73
74      i = get_index_of_max(black);
75      black[i] = 0;
76      i = get_index_of_max(black);
77      black[i] = 0;
78      i = get_index_of_max(black);
79      *thin_limit_black = black[i];
80
81      i = get_index_of_max(white);
82      white[i] = 0;
83      i = get_index_of_max(white);
84      white[i] = 0;
85      i = get_index_of_max(white);
86      *thin_limit_white = white[i];
87    }
88
89
90    static short get_cipher(first_bar,rla)
91    int first_bar;
92    short rla[MAXLENRLA];
93    {
94      int i,j,b;
95      int wide_blacks,wide_whites;
96      int tlb,tlw;
97      short cipher;
98      int pass = 0;
99
100     get_thin_bar_limits(first_bar,rla,&tlb,&tlw);
101
102   restart:
103     i = first_bar;
```

```
104       wide_blacks = 0;
105       wide_whites = 0;
106       cipher = 0; /* assume all thin */
107       j = 0;
108
109       for (b=0; b<5; b++) {
110         if (rla[i++] > tlb) { /* check black bars */
111           cipher |= (1 << (10-j));
112           wide_blacks++;
113         }
114         j++; /* point to next bit */
115         if (rla[i++] > tlw) { /* check white bars */
116           cipher |= (1 << (10-j));
117           wide_whites++;
118         }
119         j++; /* point to next bit */
120       }
121       if (rla[i++] > tlb) { /* check last black bar */
122         cipher |= (1 << (10-j));
123         wide_blacks++;
124       }
125       if ((wide_blacks != 2) || (wide_whites != 2)) { /* guess again! */
126         if (pass > 0) return(-2);
127         if (wide_blacks > 2) tlb++;
128         if (wide_blacks < 2) tlb--;
129         if (wide_whites > 2) tlw++;
130         if (wide_whites < 2) tlw--;
131         pass++;
132         goto restart;
133       }
134       return(cipher);
135     }
136
137
138     /*******************************************************/
139     /* If pointing to a start/stop char, will return a 0
140     /* If not, will return how many elements may be skipped
141     /* ! DEPENDANT ON START/STOP CHAR OF 0x4a1
142     /*******************************************************/
143     static int check_for_ss(start,rla)
144     int start;
145     short rla[MAXLENRLA];
146     {
147       int i,tlb,tlw,tmax;
148
149       get_thin_bar_limits(start,rla,&tlb,&tlw);
150       tmax = tlw * 4;
151
152       i = start;
153       if (rla[i++] > tlb)
154         if (rla[i++] <= tlw)
155           if (rla[i++] <= tlb)
156             if (rla[i++] >= tlw)
157               if (rla[i++] <= tlb)
158                 if (rla[i++] > tlw)
159                   if (rla[i++] <= tlb)
160                     if (rla[i++] <= tlw)
161                       if (rla[i++] <= tlb)
162                         if (rla[i++] <= tlw)
163                           if (rla[i++] > tlb) i++; /* found a start? */
164       if (i == (start+12)) { /* double check the wide bars */
165         i = start+3;
166         if (rla[i++] <= tmax) {
167           i ++;
168           if (rla[i++] <= tmax) {
169             i += 4;
170             if (rla[i++] <= tmax) return(0); /* found start */
171           }
172         }
173       }
174       if (rla[i-1] > tmax) return(i-start);
175       else return(1);
176     }
177
```

```
178
179    /*********************************************************/
180    /* If start/stop found, will return position of first
181    /* element of ss cipher
182    /* If start/stop not found, will return -1
183    /* Starts searching at "start"
184    /*********************************************************/
185    static int search_for_ss(start,lenrla,rla)
186    int start;
187    int lenrla;
188    short rla[MAXLENRLA];
189    {
190      int i,tlim,tmax,inc;
191      short cipher;
192      unsigned char c;
193
194      i = start;
195      if (!(i % 2)) i++; /* must start on black */
196      while (i<=(lenrla-11)) {
197        if (rla[i] > MAX_WIDE) i += 2;
198        else {
199          if ((inc = check_for_ss(i,rla)) == 0) { /* Start found */
200            cipher = get_cipher(i+12,rla); /* Check next cipher to */
201                                           /* validate start       */
202            if (c >= 0) {
203              c = ascii_of_cipher[cipher];
204              if (c != NOCIPHER) return(i); /* Must have found a good start */
205            }
206          }
207          i += inc;
208          if (!(i % 2)) i++; /* must start on black */
209        }
210      }
211      return(-1); /* No start found */
212    }
213
214
215    /*********************************************************/
216    /* If start/stop found, will return position of first
217    /* element of ss cipher
218    /* If start/stop not found, will return -1
219    /* Starts searching at "start", by 12's
220    /*********************************************************/
221    static int fast_search_for_stop(start,lenrla,rla)
222    int start;
223    int lenrla;
224    short rla[MAXLENRLA];
225    {
226      int i;
227
228      i = start;
229      while (i<=(lenrla-11)) {
230        if (rla[i] > MAX_WIDE) return(-1);
231        else {
232          if (check_for_ss(i,rla) == 0) return(i);
233          i += 12;
234        }
235      }
236      return(-1);
237    }
238
239
240    /*********************************************************/
241    static int get_ascii_string(start,stop,cc,rla)
242    int start,stop;
243    char *cc;
244    short rla[MAXLENRLA];
245    {
246      int i,cnt;
247      short cipher;
248      unsigned char c;
249
250      cnt=0;
251      for (i=start; i<stop; i+=12) {
```

```
252          cipher = get_cipher(i,rla);
253          if (cipher < 0) return(-2);       /* Bad code */
254          c = ascii_of_cipher[cipher];
255          if (c == NOCIPHER) return(-3); /* Unknown character */
256          cc[cnt++] = c;
257        }
258        return(cnt); /* Return string length */
259      }
260
261
262      /**********************************************/
263      static void reverse_scanline(lenrla,rla)
264      int *lenrla;
265      short rla[MAXLENRLA];
266      {
267        int i;
268        short tmp;
269
270        if((*lenrla % 2) == 0) {/* must be odd so reversed array will start white */
271          rla[*lenrla] = 0; /* put a 0 on the front */
272          (*lenrla)++;
273        }
274        for (i=0; i<(*lenrla/2); i++) {
275          tmp = rla[i];
276          rla[i] = rla[(*lenrla-1)-i];
277          rla[(*lenrla-1)-i] = tmp;
278        }
279      }
280
281
282      static int check_n_strip_checksum(strlen,cc)
283      int strlen;
284      char *cc;
285      {
286        int i,cs;
287
288        cs = 0;
289        for (i=0; i<(strlen-1); i++) {
290          cs += (int) cc[i];
291        }
292        cs %= 100;
293        if (cc[strlen-1] == cs) {
294          cc[strlen-1] = '\0'; /* Terminate the string */
295          return(0); /* checksum is ok */
296        } else return(-1);
297      }
298
299
300
301      /*********************** Stuff below here is exported *********************/
302      /**************************************************************************/
303      /* Function: init_bar_decode
304      /*    Must be called sometime before invocation of bar_decode
305      /**************************************************************************/
306      void init_bar_decode()
307      {
308        init_line_of_tables();
309        init_ascii_of_cipher_table();
310      }
311
312
313      /**************************************************************************/
314      /*
315      /* Function: bar_decode
316      /*    Decode requires run length encoded data (starting with white) in the
317      /*    array "scanline" (max size 2432 entries) and the number of entries in
318      /*    the variable scanlen. The array may be modified.
319      /*
320      /*    The variable "reverse" is used to read barcodes that were
321      /*    sent "backwards", decode may modify this variable.
322      /*    On entry:
323      /*       If reverse = 0, decode will not reverse
324      /*       If reverse = 1, decode will reverse
325      /*       If reverse = 2, decode will first try forward then reversed, If the
326      /*                       decode is successfull reverse will be set to 0 or 1
```

```
327   /*   Menu bars:
328   /*      Type 0 records are "menu selection items", bars of type 0 have
329   /*      "check boxes" following them. If the checkbox for a type 0
330   /*      record is "filled in" (by the user), decode will append a 'Y'
331   /*      to the end of the returned string, if not an 'N' will be appended.
332   /*
333   /*   Return codes:
334   /*      >=0 = Success, message body length (does not include term null)
335   /*      -1 = line too short, or start not found
336   /*      -2 = Bad code encountered
337   /*      -3 = Decoded character not mapped
338   /*      -4 = Stop not found
339   /*      -5 = Bad checksum
340   /*
341   /************************************************************************/
342   int bar_decode(m_id,line_num,of_line,m_body,scanlen,scanline,reverse)
343   int *m_id,*line_num,*of_line;
344   char *m_body;
345   int scanlen;
346   short scanline[MAXLENRLA];
347   int *reverse;
348   {
349     int i,strlen,start,stop;
350     int num_elements;
351     int num_chars;
352     int reversed;
353
354     if(scanlen < 59) return(-1); /* Too short, can't be a valid barcode */
355     reversed = 0;
356     if(*reverse == 1) {
357       reverse_scanline(&scanlen,scanline);
358       reversed = 1;
359     }
360     start = search_for_ss(0,scanlen,scanline);
361     if (start >= 0) {
362       start += 12; /* skip over start char */
363       stop = fast_search_for_stop(start+36,scanlen,scanline); /* skip 3 chars */
364     }
365     if ((stop < 0) || (start < 0)) {
366       if(*reverse == 2) {
367         reverse_scanline(&scanlen,scanline);
368         reversed = 1;
369         start = search_for_ss(0,scanlen,scanline);
370         if (start < 0) return(-1);
371         start += 12;
372         stop = fast_search_for_stop(start+36,scanlen,scanline);
373         if (stop < 0) return(-4);
374       } else {
375         if (start < 0) return(-1);
376         else return(-4);
377       }
378     }
379     if ((strlen=get_ascii_string(start,stop,m_body,scanline))<0) return(strlen);
380     if (strlen < 3) return(-1); /* line too short */
381     if (check_n_strip_checksum(strlen,m_body) < 0) return(-5);
382     *m_id = (int) m_body[0];
383     *line_num = l_num[m_body[1]];
384     *of_line = of_num[m_body[1]];
385     for(i=0; i<strlen; i++) m_body[i] = m_body[i+2]; /* strip first two chars */
386     if (reversed == 1) *reverse = 1; /* found a good one reading backward */
387     else *reverse = 0; /* found a good one reading forward */
388     return(strlen-3); /* Good decode, return message body length */
389   }
390
391   /************************************************************************/
392   /* Header file for code-411 bar codes.
393   /*
394   /* Genesis Nov. 16, 89
395   /* Author: Ken Burgess
396   /*
397   /* Last Edit Nov. 27, 89
398   /************************************************************************/
399
400   /************************************************************************/
```

```
401  /*
402  /* Information encoded in barcodes on the header page of a fax is separated
403  /* into "messages". The e-mail address is one "message", the subject line
404  /* is another. Up to 150 message "types" may be defined using code411.
405  /*
406  /* The physical format of a barcode line is:
407  /*
408  /*    Start_char    one cipher
409  /*    Message_id    one cipher
410  /*    line_of_id    one cipher, indicates line N of M for a message, up
411  /*                  to 16 lines per message
412  /*    Message       Variable number of ciphers depending on the message
413  /*                  length and the physical size of the barcode
414  /*    Checksum      one cipher, Sum mod 100 of all ASCII codes in the
415  /*                  barcode, except start, stop, and checksum)
416  /*    Stop_char     one cipher
417  /*
418  /***********************************************************************/
419
420  /***********************************************************************/
421  /* line_of_id is a character indicating which line of a set "this" line is.
422  /* With 150 tokens the maximum number of lines is 16. A special code in the
423  /* line_of_id field will indicate two tokens follow N,M which expand the
424  /* number of possible lines to 150 (or the char set size - a few)
425  /* The progression is as follows ...
426  /* 1 of 1 = 0
427  /* 1 of 2 = 1, 2 of 2 = 3
428  /* 1 of 3 = 4, 2 of 3 = 5, 3 of 3 = 6, etc.
429  /***********************************************************************/
430
431  /*************************** Code 411 ******************************/
432  /*
433  /* Invented by John Marvin Nov 3, 89
434  /*
435  /* The code as implemented has a capacity of 150 combinations
436  /* The full ASCII set of 128 characters is encoded in sequence
437  /* Each "character" has 11 elements including 2 wide bars and
438  /* 2 wide spaces. Each "character begins with a bar and ends
439  /* with a bar, each element alternates between black and white.
440  /* In the code below 1 = wide, 0 = narrow.
441  /***********************************************************************/
442
443  #define SS_CIPHER 149
444
445  short code411ciphers[150] = {
446  0x780, 0x720, 0x708, 0x702, 0x5a0, 0x588, 0x582, 0x528, 0x522, 0x50a, 0x6c0,
447  0x660, 0x648, 0x642, 0x4e0, 0x4c8, 0x4c2, 0x468, 0x462, 0x44a, 0x690, 0x630,
448  0x618, 0x612, 0x4b0, 0x498, 0x492, 0x438, 0x432, 0x41a, 0x684, 0x624, 0x60c,
449  0x606, 0x4a4, 0x48c, 0x486, 0x42c, 0x40e, 0x681, 0x621, 0x609, 0x603,
450  0x489, 0x483, 0x423, 0x40b, 0x3c0, 0x360, 0x348, 0x342, 0x1e0, 0x1c8, 0x1c2,
451  0x168, 0x162, 0x14a, 0x390, 0x330, 0x318, 0x312, 0x1b0, 0x198, 0x192, 0x138,
452  0x132, 0x11a, 0x384, 0x324, 0x30c, 0x306, 0x1a4, 0x18c, 0x186, 0x12c, 0x126,
453  0x10e, 0x381, 0x321, 0x309, 0x303, 0x1a1, 0x189, 0x183, 0x129, 0x123, 0x10b,
454  0x2d0, 0x270, 0x258, 0x252, 0xf0,  0xd8,  0xd2,  0x78,  0x72,  0x5a,  0x2c4,
455  0x264, 0x24c, 0x246, 0xe4,  0xcc,  0xc6,  0x6c,  0x66,  0x4e,  0x2c1, 0x261,
456  0x249, 0x243, 0xe1,  0xc9,  0xc3,  0x69,  0x63,  0x4b,  0x294, 0x234, 0x21c,
457  0x216, 0xb4,  0x9c,  0x96,  0x3c,  0x36,  0x1e,  0x291, 0x231, 0x219, 0x213,
458  0xb1,  0x99,  0x93,  0x39,  0x33,  0x1b,  0x285, 0x225, 0x20d, 0x207, 0xa5,
459  0x8d,  0x87,  0x2d,  0x27,  0xf,
460  0x429, /* reverse start stop, put here so it won't get used a lot */
461  0x4a1  /* start stop */
462  };
```

APPENDIX IV

Binary Format of a fax file that is to be mailed over the network

The binary fax file contains N pages of fax data in modified CCITT Group 3 format, followed by an global information section.

Each page of fax data consists of a variable number of lines of run length encoded raster data, with a length prefix in bytes. Each line has the following format:

| Size (in 8 bit bytes) | Description |
| --- | --- |
| 2 | Contains the length of the encoded raster line. |
| X | Contains a raster line of fax data encoded according to CCITT Group 3 format, padded out to a byte boundary, without the EOL (end of line). |

After the N pages of fax data, a global information section is appended which is in the following format:

| Size (in 8 bit bytes) | Description |
| --- | --- |
| 4 | Fax format type. Only current defined type is FT_RAW (1). |
| 4 | Version (Currently 10). |
| 32 | Reserved for future use (currently initialized to zero). |
| 4 | Size of binary file in bytes |
| 4 | Bits per line |
| 4 | Horizontal Resolution |
| 4 | Vertical Resolution |
| 4 | Number of Pages of Fax Data (Npages) |
| 4 x Npages | An array of offsets to the beginning of each page of fax data. |
| 4 x Npages | An array containing the number of lines or raster data for each page of fax data. |
| 4 | The offset to the beginning of the global information section. |

APPENDIX V

Example of what a fax looks like after it has been mailed
by the fax server:

Return-Path: faxd
Received: by hpfcrp.HP.COM; Mon, 15 Jan 90 14:13:15 mst
From: UDL Fax Daemon <faxd>
Full-Name: UDL Fax Daemon
Content-Type: X-Fax; 1.0
X-Fax-Received: by Fax-Daemon (hpfcjsm2); Mon, 15 Jan 90 14:10:48 mst
X-Fax-Pages: 1
Date: Mon, 15 Jan 90 14:10:48 mst
X-Fax-From: John Marvin
To: jsm@hpfcrp
Subject: New 411 barcoded fax

```
begin 444 fax
M   --FH    TV:@   #39J     --FH    TV:@ !  7$PA\#Y@ZC.$X)POKY@ZCTUG
M/N#OGW] =P=P=.'F1Q;S_%P>P@//V$X(WL'L)8.("<$X(#"<$L'L(*AP8^;0^
M* !%7&\_S$S?.>33^<\^^??&&/B]?)GI$X_ERP)O)_'$ONEl-(3ANP\_WV9@[&&R5
M?/OGGGm{O]VYYmmNSffff]gnVx^s^jbar^bar{?}lb}?/5t?}Co/oN^ccv}w5l5qGllv/\sBG-LyaR
M5WYZ=GWS[ZSGW],^_IB/349]\^_I]]GWS]\\CO/OZ9]N1WS9&-^F^? ]\^1W
MGQ//I^;O?-E  $1<;^WY]61S":9'//OGW^WRGF$,>FLY]_3/OZ8CTU&??/OZ
M=\\^^?OGG^S[^F?;S??;\V)^F^? ]\_-]GQ//I_M^>;* !$7&^^^?IZ:?/Z
M9P]AW[[RG3Y/TTD'</??> H'/Z<P=P]Y]_3?/GW#]SY\\_82\^W([[[R,#]/
M@YX)I\$0XCOOGFOk{R@   O5Q?[GG=6(^ZL1Z;[_93B/GI:'SGW].^_]3$>FH
M]  =   10S!W[S\_L^^?TWS[?3??[TP9')/@R[/Z;Y\3P/?:[GFR@ #]<;<^^>?3XC
MO3XCTW<\IQ'ST]-9S[^G? ]IB/34>F F??T^^S[_<^<>>?1]-]\^WIW_3$$^FHQ&
M1G]-]\^X&Y\\V4  1%QO/SYXCS[Q&&].\^4\^>3]-9\[^F^^^ _IB/34>FO
MGOS[S[\_ON_OGWS[=\^^??/I_348CTS[Y]\^Z=SS\\V4  $=<3"<$!A.%
```

. . . .
    many lines deleted
. . . .

```
M1Y^F)Z>FY\]NE !+;HO8>,OYTORK[Z1&52>^I!JDIY] 3=Q#P>(]-1Z9]\Z>
M+X<,<L"T#,'!-B9VOYNOYV;C'"C@XYNOX/#L2!<9"+B;@&&.<A4(9F0&&.#ZSB
M.=A7<=FYN< @X<X_ -R<+8Y.$.0!<L<<#T;V/;M<< 5)#  C!0;:$L7#H4A*.& -R3'#
M/_78F4!!;6>]$[GT <)!P@P=%SX=F<LX8_&6:.X I=% *3>?($Z-!0;%]XG&U!CG'
M_A@]>D^'"U_-L4%/  >2\ N^S0?(_ <;FW>>_>/Q+>/?<[O]Cd?IH=\+X^A^Q^
MM 0 A    ! "4 8R   (#9W  ;    !     !     "    _    !    _   _
M? ; OE     !     !     !     !     !     /     !    .
M 0 B  H  &   $    1@@   /V   (@$     /V   #          C    H 
[ ... remaining lines as printed ... ]

end
@eof
```

APPENDIX VI

```
1    #include <stdio.h>
2    #include <sys/types.h>
3    #include <sys/signal.h>              /* NOTE: This file must be      */
4    #include <sys/termio.h>              /* compiled with the following  */
5    #include <sys/stat.h>                /* libraries (on HP-UX):        */
6    #include <unistd.h>                  /*                              */
7    #include <fcntl.h>                   /*   -lcurses -lXm -lXt -lX11   */
8    #include <varargs.h>
9    #include <curses.h>
10   #include <term.h>
11   #include <X11/Intrinsic.h>
12   #include <X11/Shell.h>
13   #include <Xm/Xm.h>
14   #include <Xm/Form.h>
15   #include <Xm/RowColumn.h>
16   #include <Xm/PushB.h>
17   #include <Xm/ToggleB.h>
18   #include <Xm/Label.h>
19   #include <Xm/ScrollBar.h>
20   #include <Xm/ScrolledW.h>
21   #include <Xm/DrawingA.h>
22
23   #ifndef FALSE
24   #define FALSE 0
25   #endif
26   #ifndef TRUE
27   #define TRUE  1
28   #endif
29
30   /* Error/Status levels for log() */
31
32   #define EL0 0 /* Startup, Initialization complete, Log Change, Terminating */
33   #define EL1 1 /* Non Fatal Errors level 1                                  */
34   #define EL2 2 /* Non Fatal Errors level 2                                  */
35   #define EL3 3 /* Non Fatal Errors level 3                                  */
36   #define EL4 4 /* Simple Debug                                              */
37   #define EL5 5 /* Detailed Debug                                            */
38
39   #define FAX_LOG_DIR      "/usr/spool/fax/log"
40   #define FAX_RCV_DIR      "/usr/spool/fax/receive"
41   #define FAX_SND_DIR      "/usr/spool/fax/send"
42   #define LOG_NAME         "faxlog"
43   #ifdef RGT
44   #define FAXD_FULL_NAME "SEM-FC Fax Daemon"
45   #else
46   #define FAXD_FULL_NAME "UDL Fax Daemon"
47   #endif
48
49   #define ROOTUID             0
50   #define FAXDATABUFSIZE      16384 /* size of common data buffer (faxdata)        */
51   #define FAXDATATRANSIZE     8192  /* block size to write to temp file. must be   */
52                                    /* less than FAXADATABUFSIZE.                  */
53   #define FAX_TMP_HEADER_SIZE 48    /* # of header bytes in the initial tmp file   */
54   #define CSI_SIZE            20    /* number of chars in a CSI (T.30)             */
55   #define FAX_MAX_PPL         2432  /* Max pels per line (CCITT)                   */
56   #define DEFER_TIME          30    /* Time to defer request before retry          */
57   #define MAX_REQ_SIZE        2048  /* Maximum size of a piped request
58
59   /* returns from childfork() */
60
61   #define FORK_CHILD  0
62   #define FORK_PARENT 1
63
64   /* Flags */
65
66   #define FAX_F_SEND    0x1
67   #define FAX_F_RECEIVE 0x2
68
69   /* Fax Modem State */
70
```

```
71      #define FAX_S_DEAD      0
72      #define FAX_S_READY     1
73      #define FAX_S_SETUP     2
74      #define FAX_S_IOTYPE    3
75      #define FAX_S_SENDING   4
76      #define FAX_S_RECEIVING 5
77
78      struct fax_conf {
79          struct fax_conf *next;
80          int faxtype;                /* Index into faxdevsw[]           */
81          int faxfd;                  /* File descriptor of fax modem    */
82          pid_t childpid;             /* pid of child if currently forked */
83          int flags;                  /* FAX_F_SEND and/or FAX_F_RECEIVE */
84          int state;                  /* state of fax modem              */
85          char *faxdevice;            /* Device name of fax modem        */
86          char *faxreqfile;           /* file containing outbound request */
87          unsigned char *card_addr;   /* Address of card (if mapped)     */
88      };
89
90      #define FM_WORLDPORT 0 /* Fax Type for Worldport 2496 Fax Modem */
91
92      struct faxdevsw {
93              char    *config_name;
94              int     (*fax_init)();
95              int     (*fax_iotype)();
96              int     (*fax_answer_setup)();
97              int     (*fax_answer_complete)();
98              int     (*fax_call_setup)();
99              int     (*fax_call_complete)();
100             int     (*fax_info)();
101             int     (*fax_send_T30)();
102             int     (*fax_read_T30)();
103             int     (*fax_send_init)();
104             int     (*fax_send)();
105             int     (*fax_send_end)();
106             int     (*fax_read)();
107     };
108
109     /* Fax File Types */
110
111     #define FT_RAW 1
112
113
114     /* T30 types */
115
116     #define T30_ERROR   -1
117     #define T30_NONE    0
118     #define T30_DIS     1
119     #define T30_CSI     2
120     #define T30_NSF     3
121     #define T30_DTC     4
122     #define T30_CIG     5
123     #define T30_NSC     6
124     #define T30_DCS     7
125     #define T30_TSI     8
126     #define T30_NSS     9
127     #define T30_TCF     10
128     #define T30_CFR     11
129     #define T30_FTT     12
130     #define T30_EOM     13
131     #define T30_MPS     14
132     #define T30_EOP     15
133     #define T30_PRIEOM  16
134     #define T30_PRIMPS  17
135     #define T30_PRIEOP  18
136     #define T30_MCF     19
137     #define T30_RTP     20
138     #define T30_RTN     21
139     #define T30_PIP     22
140     #define T30_PIN     23
141     #define T30_DCN     24
142     #define T30_CRP     25
143
144     /* IO Types */
```

```
145
146     #define FAX_T_NONE 0
147     #define FAX_T_KILL 1
148     #define FAX_T_FAX  2
149
150     struct codetree {
151         short   type;
152         short   info;
153         struct codetree *branch_0;
154         struct codetree *branch_1;
155     };
156
157     /* cell types */
158
159     #define CT_BRANCH 0
160     #define CT_TERM   1
161     #define CT_MAKEUP 2
162     #define CT_ERROR  3
163
164     /* Code Types */
165
166     #define CD_WHITE 0
167     #define CD_BLACK 1
168     #define CD_EOL   2
169
170     /* Arguments to fax_print() */
171
172     #define FP_CURPAGE  0
173     #define FP_ALLPAGES 1
174
175     /* Junk to be removed */
176
177     #define FAX_MAGIC 0x59af
178
179     #define FAX_GROUP3 0x3
180
181     struct fax_header {
182         int faxmagic;
183         int npages;
184         int linelength;
185         int group;
186         int hres;
187         int vres;
188         int spare1;
189         int spare2;
190     };
191
192     #define DEFAULT_ALTPAGER    "pg"
193     #define DEFAULT_EDITOR      "vi"
194     #define DEFAULT_PRINTTEXT   "lp -s"
195
196     #define DEFAULT_LINES 24
197     #define FDGETS_BUF_SIZE 16384
198     #define LINE_BUF_SIZE   256
199     char headerbuf[FDGETS_BUF_SIZE];
200     static char fdgetsbuf[FDGETS_BUF_SIZE]; /* These are outside of fdgets so that  */
201     static char *fdgetsptr;                 /* the buffer can be preloaded and used */
202     static int fdgets_read;                 /* to peek for the Content-Type header  */
203     static int is_fax;
204     static char linebuf[LINE_BUF_SIZE];
205     char *prog_name;
206     int modes_changed = FALSE;
207     int promptfd;
208     int nheader_lines;
209     struct termio t_old;
210
211     /* External declarations */
212
213     extern int xfaxfd;
214     extern int check_for_X();
215     extern void display_fax(), fax_code_init(), file_init(), get_page();
216     extern void fax_print();
217     extern char *strrchr();
218
```

```
219     /* Forward Declarations */
220
221     int check_for_fax();
222     char *pggets(), *fdgets();
223     void fax_init(), uudecode_fax(), log(), errexit(), page_file(), usage();
224     void print_file(), do_exec();
225     static void catch_intr(), uudecode(), outdec();
226
227     static void
228     catch_intr() {
229         if (modes_changed != FALSE)
230             ioctl(promptfd,TCSETAW,&t_old);
231         exit(1);
232     }
233
234     main(argc,argv)
235         int argc;
236         char **argv;
237     {
238         int infd;
239         int xwinopt;
240         int printopt;
241         int draftopt;
242         int ret;
243         extern char *optarg;
244         extern int optind;
245         extern int opterr;
246
247         signal(SIGINT,catch_intr);
248         signal(SIGCHLD, SIG_IGN); /* We normally don't care to wait for our kids */
249
250         prog_name = argv[0];
251         if ((prog_name = strrchr(argv[0],'/')) == (char *)0)
252             prog_name = argv[0];
253         else
254             prog_name++;
255
256         /* Process Options */
257
258         opterr = 0;
259         draftopt = FALSE;
260         printopt = FALSE;
261         xwinopt = FALSE;
262         while ((ret = getopt(argc,argv,"dpx")) != EOF) {
263
264             switch(ret) {
265
266             case 'd':
267                 draftopt = TRUE;
268                 break;
269
270             case 'p':
271                 printopt = TRUE;
272                 break;
273
274             case 'x':
275                 xwinopt = TRUE;
276                 break;
277
278             default:
279                 usage();
280             }
281         }
282
283         if (optind + 1 < argc)
284             usage();
285
286         if ((optind + 1) == argc) {
287             if ((infd = open(argv[optind],O_RDONLY)) < 0)
288                 errexit("Could not open %s.\n",argv[optind]);
289         }
290         else
291             infd = 0;
292
```

```
293         /* Pre load fdgets buf so we can check it for a Content_Type header */
294
295         if ((fdgets_read = read(infd,fdgetsbuf,16384)) < 0)
296             errexit("Read failure on input.\n");
297
298         fdgetsptr = fdgetsbuf;
299
300         is_fax = FALSE;
301         nheader_lines = check_for_fax(fdgetsbuf,fdgets_read);
302         if (nheader_lines != 0) {
303
304             is_fax = TRUE;
305
306             if (printopt == FALSE || xwinopt != FALSE) {
307                 if (check_for_X(argc,argv) != FALSE) {
308
309                     /* Copy initial fdgetsbuf into header buf for use by */
310                     /* display_fax().                                    */
311
312                     memcpy(headerbuf,fdgetsbuf,fdgets_read);
313
314                     fax_init(infd,printopt);
315
316                     /* Display the fax */
317
318                     display_fax(prog_name,printopt);
319
320                     /* not reached */
321                 }
322             }
323         }
324
325         if (printopt == FALSE) {
326
327             /* This is not a fax file or we cannot open an */
328             /* X diplay. Call page_file() to do paging.    */
329
330             page_file(infd);
331             ioctl(promptfd,TCSETAW,&t_old);
332         }
333         else {
334             if (is_fax == FALSE)
335                 print_file(infd);
336             else {
337                 fax_init(infd,TRUE);
338                 fax_print(-1,FP_ALLPAGES,draftopt);
339             }
340         }
341
342         exit(0);
343     }
344
345     void
346     print_file(fd)
347         int fd;
348     {
349         extern char *getenv();
350         char *print_cmd;
351         int pipefds[2];
352         int childpid;
353         FILE *writefptr;
354
355         if (pipe(pipefds) != 0)
356             errexit("could not create pipe.\n");
357
358         if ((childpid = fork()) == -1)
359             errexit("Fork failed.\n");
360
361         if (childpid != 0) {
362
363             /* Parent will exec print command */
364
365             (void) close(pipefds[1]);
366             (void) close(0);
```

```
367         if (dup(pipefds[0]) != 0) {
368             fprintf(stderr,"dup failed.\n");
369             _exit(1);
370         }
371
372         if ((print_cmd = getenv("PRINTTEXT")) == (char *)0)
373             print_cmd = DEFAULT_PRINTTEXT;
374
375         (void) execl("/bin/sh","sh","-c",print_cmd,0);
376         fprintf(stderr,"exec of print command \"%s\" failed.\n",print_cmd);
377         _exit(1);
378     }
379
380     /* Child - feed print command raw data */
381
382     (void) close(pipefds[0]);
383
384     if ((writefptr = fdopen(pipefds[1],"w")) == (FILE *)0) {
385         fprintf(stderr,"fdopen failed.\n");
386         _exit(1);
387     }
388
389     while (fdgets(linebuf,LINE_BUF_SIZE,fd) != (char *)0)
390         fputs(linebuf,writefptr);
391
392     fflush(writefptr);
393     _exit(0);
394 }
395
396 static char *
397 fdgets(buf,buflen,fd)
398     char *buf;
399     int buflen;
400     int fd;
401 {
402     register char *s1;
403     register char *s2;
404     register char *endptr;
405     static int eof_flag = FALSE;
406
407     if (buflen == 0)
408         return((char *)0);
409
410     s1 = fdgetsptr;
411     s2 = buf;
412     endptr = fdgetsbuf + fdgets_read;
413     while (buflen-- > 1) {
414         if (s1 == endptr) {
415             if (eof_flag != FALSE)
416                 return((char *)0);
417
418             if ((fdgets_read = read(fd,fdgetsbuf,FDGETS_BUF_SIZE)) < 0)
419                 errexit("Read Failure.\n");
420
421             s1 = fdgetsptr = fdgetsbuf;
422
423             if (fdgets_read == 0) {
424                 eof_flag = TRUE;
425                 if (s2 == buf)
426                     return((char *)0);
427
428                 *s2 = '\0';
429                 return(buf);
430             }
431         }
432
433         *s2 = *s1++;
434         if (*s2++ == '\n')
435             break;
436     }
437
438     *s2 = '\0';
439     fdgetsptr = s1;
440     return(buf);
```

```
441     }
442
443     int
444     check_for_fax(buf,buflen)
445         char *buf;
446         int buflen;
447     {
448         register char *s1;
449         register char *s2;
450         register char *endptr;
451         register int slen;
452         register int nlines;
453         register int fax_flag;
454
455         endptr = buf + buflen;
456         s1 = buf;
457         nlines = 0;
458         fax_flag = FALSE;
459         for (;;) {
460
461             s2 = s1;
462             while (s2 < endptr) {
463                 if (*s2 == '\n')
464                     break;
465
466                 s2++;
467             }
468
469             if (s2 == endptr) {
470                 if (fax_flag != FALSE)
471                     return(nlines);
472                 else
473                     return(0);
474             }
475
476             slen = (s2 - s1);
477
478             if (slen == 0 && fax_flag != FALSE)
479                 return(nlines);
480
481             nlines++;
482
483             if (slen >= 20 && memcmp(s1,"Content-Type: X-Fax;",20) == 0)
484                 fax_flag = TRUE;
485
486             s1 = ++s2;
487         }
488     }
489
490     #define NFAX_MSG_LINES 6
491
492     static char *faxlines[NFAX_MSG_LINES] = {
493         "\n",
494         " *** File body contains fax data which cannot be displayed because\n",
495         " *** an attempt to communicate with the X Server failed. Make sure\n",
496         " *** that your DISPLAY environment variable is set correctly if you\n",
497         " *** are currently running X Windows.\n",
498         "\n"
499     };
500
501     char *pggets(buf,buflen,fd)
502         char *buf;
503         int buflen;
504         int fd;
505     {
506         static int faxline = 0;
507
508         if (is_fax == FALSE || nheader_lines > 0) {
509             if (nheader_lines > 0)
510                 nheader_lines--;
511             return(fdgets(buf,buflen,fd));
512         }
513         else {
514             if (faxline >= NFAX_MSG_LINES)
515                 return(char *)0;
```

```
516
517                 strcpy(buf,faxlines[faxline++]);
518                 return(buf);
519         }
520     }
521
522     void
523     page_file(fd)
524         int fd;
525     {
526         register int nlines;
527         register int i;
528         char *s;
529         char ch;
530         struct termio t_new;
531         FILE *tmpfptr;
532         char tmpfilename[L_tmpnam];
533         char *cmd_name;
534         int ret;
535         extern char *getenv();
536         extern char *strrchr();
537
538         /* Check to see if we can read from stderr. If not, try opening */
539         /* /dev/tty for input.                                          */
540
541         promptfd = fileno(stderr);
542         i = fcntl(promptfd,F_GETFL,0);
543         if (i == -1 || (i & O_ACCMODE) == O_WRONLY) {
544             if ((promptfd = open("/dev/tty",O_RDONLY)) < 0)
545                 errexit("Could not open /dev/tty for reading.\n");
546         }
547
548         ioctl(promptfd,TCGETA,&t_old);
549         modes_changed = TRUE; /* It's ok to set this once t_old is valid */
550
551         setupterm((char *)0,promptfd,&ret);
552         if (ret != 1)
553             nlines = DEFAULT_LINES;
554         else
555             nlines = lines;
556
557         t_new = t_old; /* structure assignment */
558         t_new.c_iflag = BRKINT;
559         t_new.c_lflag = ISIG;
560         t_new.c_cc[VMIN] = 1;
561         t_new.c_cc[VTIME] = 0;
562
563         ioctl(promptfd,TCSETAW,&t_new);
564
565         /* Create a tmp file that we can save the data in as we page so */
566         /* that we can invoke an editor or alternate pager on request.  */
567
568         if (  tmpnam(tmpfilename) == (char *)0
569             || (tmpfptr = fopen(tmpfilename,"w+")) == (FILE *)0) {
570
571             errexit("Could not create temp file.\n");
572         }
573
574         nlines -= 2;
575         i = 0;
576         while (pggets(linebuf,LINE_BUF_SIZE,fd) != (char *)0) {
577
578             if (linebuf[strlen(linebuf) - 1] != '\n')
579                 errexit("Line too long.\n");
580
581             fputs(linebuf,tmpfptr);
582             fputs(linebuf,stdout);
583             i++;
584
585             if (i == nlines) {
586
587                 fputs("--More--",stdout);
588                 fflush(stdout);
589                 for (;;) {
```

```
            if (read(promptfd,&ch,1) != 1 || ch == 'q') {
                fputs("\r           \r",stdout);
                return;
            } switch (ch) { case '\r':
                i = nlines - 1;
                break;

case ' ':
                i = 0;
                break;

case 'h':
                fputs("\r\nCommands\r\n",stdout);
                fputs("----------------------------------------------------
                fputs("<return>        Scroll forward 1 line\r\n",stdout);
                fputs("<space>         Scroll forward 1 screen\r\n",stdout);
                fputs("    e           Invoke $EDITOR (/usr/bin/vi default)\r
                fputs("    h           Print this help screen\r\n",stdout);
                fputs("    p           Invoke $ALTPAGER (/usr/bin/pg default)
                fputs("----------------------------------------------------
                fputs("--More--",stdout);
                ch = '\0'; /* don't terminate loop */
                break;

case 'e':
            case 'p':
                while (pggets(linebuf,LINE_BUF_SIZE,fd) != (char *)0) { if (linebuf[strlen(linebuf) - 1] != '\n')
                        errexit("Line too long.\n");

fputs(linebuf,tmpfptr);
                }

(void) fclose(tmpfptr);

if (ch == 'e') {
                    if ((cmd_name = getenv("EDITOR")) == (char *)0)
                        cmd_name = DEFAULT_EDITOR;
                }
                else {
                    if ((cmd_name = getenv("ALTPAGER")) == (char *)0)
                        cmd_name = DEFAULT_ALTPAGER;
                } fputs("\r          \r",stdout);
                fflush(stdout);

if (modes_changed != FALSE)
                    ioctl(promptfd,TCSETAW,&t_old);

do_exec(promptfd,cmd_name,tmpfilename);

/* not reached */ default:
                putchar('\007');
                fflush(stdout);
                ch = '\0'; /* flag to continue loop */
                break;
            } if (ch != '\0')
                break;
        } fputs("\r        \r",stdout);
    }
}
```

```
        if (is_fax != FALSE) {
            for (;;) {
                fputs("Enter Option -- p) Print Fax, d) Print Draft Fax, or q) Quit :"
                fflush(stdout);

if (read(promptfd,&ch,1) != 1 || ch == 'q') {
                    fputs("\r\n",stdout);
                    return;
                } fputs("\r\n",stdout);
                fflush(stdout);
                if (ch == 'p' || ch == 'd') {
                    fax_init(fd,TRUE);
                    if (ch == 'p') {
                        fax_print(-1,FP_ALLPAGES,FALSE);
                        fputs("Fax Spooled.\r\n",stdout);
                    }
                    else {
                        fax_print(-1,FP_ALLPAGES,TRUE);
                        fputs("Draft Fax Spooled.\r\n",stdout);
                    }
                    fflush(stdout);
                }
                else {
                    putchar('\007');
                    fflush(stdout);
                }
            }
        }
    } void
do_exec(fd,cmd_name,file)
    int fd;
    char *cmd_name;
    char *file;
{
    char exec_cmd[512];
    int childpid;
    extern int errno;

signal(SIGCHLD,SIG_DFL);  /* In this case, be a good parent */

/* If fork fails, we go ahead and do the exec. The only  */
    /* problem with this is that the temp file won't be      */
    /* removed, but that is ok.                              */ if ((childpid = fork()) <= 0) {

(void) close(0);
        if (dup(fd) != 0)
            errexit("Could not set up standard input for exec.\n");

strcpy(exec_cmd,cmd_name);
        strcat(exec_cmd," ");
        strcat(exec_cmd,file);
        (void) execl("/bin/sh","sh","-c",exec_cmd,0);

errexit("Exec of \"%s\" failed.\n",exec_cmd);
    }

/* Parent -- wait for child to die and then remove temp file */ if (waitpid(childpid,(int *)0,0) == childpid)
        (void) unlink(file);

_exit(0);
} void
```

```
736    fax_init(fd,suppress_message_flag)
737        int fd;
738        int suppress_message_flag;
739    {
740        static int init_flag = FALSE;
741
742        if (init_flag == FALSE) {
743
744            /* uudecode the fax body and put results in a */
745            /* temporary file who file descriptor will be */
746            /* stored in the global "xfaxfd".              */
747
748            if (suppress_message_flag == FALSE)
749                fprintf(stderr,"Decoding Fax\n");
750
751            uudecode_fax(fd);
752
753            if (suppress_message_flag == FALSE)
754                fprintf(stderr,"Initialize Fax\n");
755
756            fax_code_init();
757
758            file_init();
759
760            if (suppress_message_flag == FALSE)
761                fprintf(stderr,"Rasterizing Fax\n");
762
763            get_page();
764
765            init_flag = TRUE;
766        }
767
768        return;
769    }
770
771    void
772    uudecode_fax(fd)
773        int fd;
774    {
775        FILE *tmpfptr;
776
777        if ((tmpfptr = tmpfile()) == (FILE *)0)
778            errexit("Could not create temporary file.\n");
779
780        /* search for header line */
781
782        for (;;) {
783            if (fdgets(linebuf, LINE_BUF_SIZE, fd) == (char *)0)
784                errexit("No begin line\n");
785
786            if (strncmp(linebuf, "begin ", 6) == 0)
787                break;
788        }
789
790        uudecode(fd,tmpfptr);
791
792        if (fdgets(linebuf, LINE_BUF_SIZE, fd) == (char *)0 || strcmp(linebuf, "end\n")
793            errexit("No end line\n");
794
795        fflush(tmpfptr);
796
797        xfaxfd = fileno(tmpfptr);
798
799        if (lseek(xfaxfd,0,SEEK_SET) != 0)
800            errexit("Lseek failure.\n");
801
802        return;
803    }
804
805    /* single character decode */
806
807    #define DEC(c)  (((c) - ' ') & 077)
808
```

```
809     /*
810      * copy from in to out, decoding as you go along.
811      */
812
813     static void
814     uudecode(in, out)
815         int in;
816         FILE *out;
817     {
818         register char *bp;
819         register int n;
820
821         for (;;) {
822
823             /* for each input line */
824
825             if (fdgets(linebuf, LINE_BUF_SIZE, in) == (char *)0)
826                 errexit("Short file\n");
827
828             n = DEC(linebuf[0]);
829             if (n <= 0)
830                 break;
831
832             bp = &linebuf[1];
833             while (n > 0) {
834                 outdec(bp, out, n);
835                 bp += 4;
836                 n -= 3;
837             }
838         }
839     }
840
841     /*
842      * output a group of 3 bytes (4 input characters).
843      * the input chars are pointed to by p, they are to
844      * be output to file f.  n is used to tell us not to
845      * output all of them at the end of the file.
846      */
847
848     static void
849     outdec(p, f, n)
850         register char *p;
851         FILE *f;
852         register int n;
853     {
854         register int c1;
855         register int c2;
856         register int c3;
857
858         c1 = DEC(*p) << 2 | DEC(p[1]) >> 4;
859         c2 = DEC(p[1]) << 4 | DEC(p[2]) >> 2;
860         c3 = DEC(p[2]) << 6 | DEC(p[3]);
861
862         if (n >= 1)
863             putc(c1, f);
864
865         if (n >= 2)
866             putc(c2, f);
867
868         if (n >= 3)
869             putc(c3, f);
870
871         return;
872     }
873
874     void
875     log()
876     {
877         /* If its not fatal we don't want to know about it */
878
879         return;
880     }
881
882     void
```

```
883     errexit(va_alist)
884         va_dcl
885     {
886         va_list args;
887         char *fmt;
888
889         va_start(args);
890         fmt = va_arg(args,char *);
891         (void) fprintf(stderr,"%s: ",prog_name);
892         (void) vfprintf(stderr, fmt, args);
893         va_end(args);
894
895         if (modes_changed != FALSE)
896             ioctl(promptfd,TCSETAW,&t_old);
897
898         exit(1);
899     }
900
901     void
902     usage()
903     {
904         fprintf(stderr, "Usage: %s [-d] [-p] [-x] [<fax file>]\n", prog_name);
905         exit(1);
906     }
907
908     #define PROGRAM "faxreader"
909     #define DEFAULT_FONT "hp8.8x16"
910     #define DEFSCROLLBAROVHD 34  /* Number of pixels scrolled window widget */
911                                  /* uses for scroll bars, borders,etc.      */
912
913     #define DISPLAYOVHD 32
914     #define ROWCOLHEIGHT 50
915     #define DRAWAREA_BDR_WIDTH 3
916
917     int xfaxfd;              /* File Descriptor for fax file */
918     int npages;              /* Number of pages */
919     int pageno = 1;          /* Current page number */
920     int linelength;          /* Number of pixels in a scan line */
921     int hres;
922     int vres;
923     int maxlines;
924     int filesize;
925     unsigned long *pageoffsets;
926     unsigned long *page_nlines;
927     unsigned char *pagebytes;   /* Current page raw bytes */
928     int bytesperline1;          /* number of bytes per scan line */
929     int bytesperline2;          /* number of bytes per scan line */
930     int bytesperline3;          /* number of bytes per scan line */
931     int bytesperline4;          /* number of bytes per scan line */
932     unsigned char *r1bytes;     /* Raw image raster */
933     unsigned char *r2bytes;     /* Raw image raster */
934     unsigned char *r3bytes;     /* Raw image raster */
935     unsigned char *r4bytes;     /* Raw image raster */
936     int r2flag;
937     int r3flag;
938     int r4flag;
939     int flip_flag = FALSE;
940     XImage ximage1;
941     XImage ximage2;
942     XImage ximage3;
943     XImage ximage4;
944     XImage *ximageptr;
945     Display *XDisp;
946     int mag;                 /* Current Magnification 0=0.33, 1=0.45  2=0.50 3=1.00 */
947     Arg args[20];            /* Args structure for widget initialization */
948     GC darea_gc;
949     Window darea_window;
950     int darea_width;
951     int darea_height;
952     extern int nheader_lines;
```

```
953    extern char headerbuf[];
954    char **header_array;
955    int font_height;
956    int font_ascent;
957    int header_win_height;
958    int header_win_width;
959
960    #define NBUTTONS 12
961    Widget button[NBUTTONS];
962    Widget drawarea;
963    Widget swindow;
964    Widget hbar;
965    Widget vbar;
966    Widget label;
967
968    /* External Declarations */
969
970    extern unsigned char *malloc();
971    extern void fax_print();
972    extern int set_page(), read_line();
973
974    /* Forward Declarations */
975
976    int check_for_X();
977    void file_init(), get_page(), flip_page(), create_buttons();
978    void drawarea_exposeCB(), buttonselectCB();
979    void x50_page(), x45_page(), x33_page();
980    void display_fax(), set_label();
981
982    int
983    check_for_X(argc,argv)
984        int argc;
985        char **argv;
986    {
987        /* Open the Display */
988
989        XtToolkitInitialize();
990        if ((XDisp = XtOpenDisplay(NULL, NULL, argv[0], PROGRAM, NULL, 0,
991            &argc, argv)) == (Display *)0)
992            return(FALSE);
993        else
994            return(TRUE);
995    }
996
997    void
998    display_fax(app_name,suppress_message_flag)
999        char *app_name;
1000       int suppress_message_flag;
1001   {
1002       Widget toplevel;
1003       Widget form;
1004       Widget rowcol1;
1005       Widget rowcol2;
1006       int wwidth;
1007       int wheight;
1008       int wxpos;
1009       int i;
1010       int fwidth;
1011       char *s;
1012       XGCValues gcv;
1013       char geometry[64];
1014       XFontStruct *Xfinfoptr;
1015       char *font_name;
1016
1017       if (suppress_message_flag == FALSE)
1018           fprintf(stderr,"Initialize X Window\n");
1019
1020       mag = 3;
1021
1022       if ((font_name = XGetDefault(XDisp,PROGRAM,"font")) == (char *)0)
1023           font_name = DEFAULT_FONT;
1024
1025       if ((Xfinfoptr = XLoadQueryFont(XDisp,font_name)) == (XFontStruct *)0)
1026           errexit("Could not open font %s\n",font_name);
```

```
1027
1028
1029        /* Compute header window height and width */
1030
1031        header_win_width = 0;
1032        for (i = 0; i < nheader_lines; i++) {
1033            fwidth = XTextWidth(Xfinfoptr,header_array[i],strlen(header_array[i]));
1034            if (fwidth > header_win_width)
1035                header_win_width = fwidth;
1036        }
1037        font_height =   Xfinfoptr->max_bounds.ascent
1038                      + Xfinfoptr->max_bounds.descent;
1039
1040        font_ascent = Xfinfoptr->max_bounds.ascent;
1041
1042        header_win_height = font_height * nheader_lines;
1043
1044        /* Compute window width and height for scrolled window Widget    */
1045        /* These dimensions are used in creating some of the other widgets */
1046
1047        wwidth  = DEFSCROLLBAROVHD + (linelength * 4 + 8) / 9;
1048        wheight = 2 * ROWCOLHEIGHT + DEFSCROLLBAROVHD +  8 * maxlines / 9;
1049
1050        i = DisplayWidth(XDisp,DefaultScreen(XDisp)) - DISPLAYOVHD;
1051        if (wwidth > i)
1052            wwidth = i;
1053
1054        wxpos = (i - wwidth) / 2;
1055
1056        i = DisplayHeight(XDisp,DefaultScreen(XDisp)) - DISPLAYOVHD;
1057        if (wheight > i)
1058            wheight = i;
1059
1060        /* Create Top Level Shell */
1061
1062        sprintf(geometry,"=%dx%d+%d+%d",wwidth,wheight,wxpos,0);
1063        XtSetArg(args[0],XmNgeometry, (XtArgVal) geometry);
1064        toplevel = XtAppCreateShell(app_name,PROGRAM,applicationShellWidgetClass,
1065                            XDisp, args, 1);
1066
1067        if (suppress_message_flag == FALSE)
1068            fprintf(stderr,"Display Fax\n");
1069
1070        /* Create Form Widget to put all this stuff on */
1071
1072        XtSetArg(args[0],XmNallowOverlap, (XtArgVal) False);
1073        form = XmCreateForm(toplevel,"faxform",args, 1);
1074        XtManageChild(form);
1075
1076        /* Create RowCol Widgets for buttons */
1077
1078        XtSetArg(args[0],XmNpacking, (XtArgVal) XmPACK_TIGHT);
1079        XtSetArg(args[1],XmNorientation, (XtArgVal) XmHORIZONTAL);
1080        XtSetArg(args[2],XmNrightAttachment, (XtArgVal) XmATTACH_FORM);
1081        XtSetArg(args[3],XmNleftAttachment, (XtArgVal) XmATTACH_FORM);
1082        XtSetArg(args[4],XmNtopAttachment, (XtArgVal) XmATTACH_FORM);
1083        XtSetArg(args[5],XmNradioBehavior, (XtArgVal) True);
1084        rowcol1 = XmCreateRowColumn(form,"faxrowcol1", args, 6);
1085        XtManageChild(rowcol1);
1086
1087        XtSetArg(args[0],XmNpacking, (XtArgVal) XmPACK_TIGHT);
1088        XtSetArg(args[1],XmNorientation, (XtArgVal) XmHORIZONTAL);
1089        XtSetArg(args[2],XmNrightAttachment, (XtArgVal) XmATTACH_FORM);
1090        XtSetArg(args[3],XmNleftAttachment, (XtArgVal) XmATTACH_FORM);
1091        XtSetArg(args[4],XmNtopAttachment, (XtArgVal) XmATTACH_WIDGET);
1092        XtSetArg(args[5],XmNtopWidget, (XtArgVal) rowcol1);
1093        rowcol2 = XmCreateRowColumn(form,"faxrowcol2", args, 6);
1094        XtManageChild(rowcol2);
1095
1096        create_buttons(rowcol1,rowcol2);
1097
1098        XtSetArg(args[0],XmNborderWidth, (XtArgVal) 2);
1099        label = XmCreateLabel(rowcol2,"label",args,1);
1100        XtManageChild(label);
1101        set_label();
```

```
1102
1103        /* Create Scrolled Window Widget for displaying fax */
1104
1105        XtSetArg(args[0],XmNscrollBarDisplayPolicy, (XtArgVal) XmSTATIC);
1106        XtSetArg(args[1],XmNleftAttachment, (XtArgVal) XmATTACH_FORM);
1107        XtSetArg(args[2],XmNbottomAttachment, (XtArgVal) XmATTACH_FORM);
1108        XtSetArg(args[3],XmNrightAttachment, (XtArgVal) XmATTACH_FORM);
1109        XtSetArg(args[4],XmNtopAttachment, (XtArgVal) XmATTACH_WIDGET);
1110        XtSetArg(args[5],XmNtopWidget, (XtArgVal) rowcol2);
1111        XtSetArg(args[6],XmNvisualPolicy, (XtArgVal) XmCONSTANT);
1112        XtSetArg(args[7],XmNscrollingPolicy, (XtArgVal) XmAUTOMATIC);
1113        swindow = XmCreateScrolledWindow(form,"faxscroll",args, 8);
1114        XtManageChild(swindow);
1115
1116
1117        /* Create Drawing Area Widget for displaying fax */
1118
1119        ximage1.width = linelength;
1120        ximage1.height = 2 * maxlines;
1121        ximage1.bytes_per_line = bytesperline1;
1122        ximage1.data = (char *)r1bytes;
1123        ximage1.xoffset = 0;
1124        ximage1.format = XYBitmap;
1125        ximage1.byte_order = MSBFirst;
1126        ximage1.bitmap_unit = 8;
1127        ximage1.bitmap_bit_order = MSBFirst;
1128        ximage1.bitmap_pad = 8;
1129        ximage1.depth = 1;
1130
1131        ximage2.width = (linelength + 1)/ 2;
1132        ximage2.height = maxlines;
1133        ximage2.bytes_per_line = bytesperline2;
1134        ximage2.data = (char *)r2bytes;
1135        ximage2.xoffset = 0;
1136        ximage2.format = XYBitmap;
1137        ximage2.byte_order = MSBFirst;
1138        ximage2.bitmap_unit = 8;
1139        ximage2.bitmap_bit_order = MSBFirst;
1140        ximage2.bitmap_pad = 8;
1141        ximage2.depth = 1;
1142
1143        ximage3.width = (linelength * 4 + 8) / 9;
1144        ximage3.height = 8 * maxlines / 9;
1145        ximage3.bytes_per_line = bytesperline3;
1146        ximage3.data = (char *)r3bytes;
1147        ximage3.xoffset = 0;
1148        ximage3.format = XYBitmap;
1149        ximage3.byte_order = MSBFirst;
1150        ximage3.bitmap_unit = 8;
1151        ximage3.bitmap_bit_order = MSBFirst;
1152        ximage3.bitmap_pad = 8;
1153        ximage3.depth = 1;
1154
1155        ximage4.width = (linelength + 2) / 3;
1156        ximage4.height = 2 * maxlines / 3;
1157        ximage4.bytes_per_line = bytesperline4;
1158        ximage4.data = (char *)r4bytes;
1159        ximage4.xoffset = 0;
1160        ximage4.format = XYBitmap;
1161        ximage4.byte_order = MSBFirst;
1162        ximage4.bitmap_unit = 8;
1163        ximage4.bitmap_bit_order = MSBFirst;
1164        ximage4.bitmap_pad = 8;
1165        ximage4.depth = 1;
1166
1167        XtSetArg(args[0],XmNheight, (XtArgVal) darea_height);
1168        XtSetArg(args[1],XmNwidth, (XtArgVal) darea_width);
1169        XtSetArg(args[2],XmNresizePolicy, (XtArgVal) XmRESIZE_NONE);
1170        XtSetArg(args[3],XmNborderWidth, (XtArgVal) DRAWAREA_BDR_WIDTH);
1171        drawarea = XmCreateDrawingArea(swindow,"faxdisplay",args, 4);
1172        XtAddCallback(drawarea, XmNexposeCallback, drawarea_exposeCB, NULL);
1173        XtManageChild(drawarea);
1174
1175        XtSetArg(args[0],XmNworkWindow, (XtArgVal) drawarea);
1176        XtSetValues(swindow,args,1);
```

```
        /* realize widgets */

XtRealizeWidget(toplevel);

/* Create the GC for the drawing area */ darea_window = XtWindow(drawarea);

gcv.function    = GXcopy;
        gcv.plane_mask  = AllPlanes;
        gcv.foreground  = BlackPixel(XDisp,DefaultScreen(XDisp));
        gcv.background  = WhitePixel(XDisp,DefaultScreen(XDisp));
        gcv.fill_style  = FillSolid;
        gcv.font        = Xfinfoptr->fid;

darea_gc = XCreateGC(XDisp,darea_window,
                            (GCFunction   | GCPlaneMask | GCForeground
                            | GCBackground | GCFillStyle | GCFont          ),
                            &gcv);

/* Set the background for the window */

XSetWindowBackground(XDisp, darea_window, WhitePixel(XDisp,DefaultScreen(XDisp

/* Get the scroll bar widgets id's */

XtSetArg(args[0],XmNhorizontalScrollBar, (XtArgVal) &hbar);
        XtSetArg(args[1],XmNverticalScrollBar, (XtArgVal) &vbar);
        XtGetValues(swindow, args, 2);

/* process events */

XtMainLoop();

/* Never Reached */
    } void
    drawarea_exposeCB(w, clientdata,calldata)
        Widget w;
        caddr_t clientdata;
        caddr_t calldata;
    {
        register XExposeEvent *eventptr;
        register int i;
        int startline;
        int endline;

eventptr = (XExposeEvent *)((XmDrawingAreaCallbackStruct *)calldata)->event;
        if (mag != 4) {
            XPutImage(XDisp,darea_window,darea_gc,ximageptr,
                        eventptr->x,eventptr->y,eventptr->x,eventptr->y,
                        eventptr->width, eventptr->height);
        }
        else {
            startline = eventptr->y / font_height;
            endline   = (eventptr->y + eventptr->height) / font_height;
            for (i = startline; i <= endline; i++) {
                XDrawImageString(XDisp,darea_window, darea_gc,
                        0, i * font_height + font_ascent,
                        header_array[i],strlen(header_array[i]));
            }
        }
        XFlush(XDisp);
        return;
    } void
    buttonselectCB(w, clientdata,calldata)
        Widget w;
        caddr_t clientdata;
        caddr_t calldata;
    {
```

```
1251        register int i;
1252        XmToggleButtonCallbackStruct *tb_calldata;
1253        int new_width;
1254        int new_height;
1255        int sl_value;
1256        int sl_size;
1257        int sl_inc;
1258        int sl_pginc;
1259        XmScrollBarCallbackStruct sb_calldata;
1260        static int draft_flag = TRUE;
1261
1262        /* Find which button was pushed */
1263
1264        for (i = 0; i < NBUTTONS; i++) {
1265            if (button[i] == w)
1266                break;
1267        }
1268
1269        if (i <= 4) {
1270            tb_calldata = (XmToggleButtonCallbackStruct *)calldata;
1271            if (tb_calldata->set == False)
1272                return;
1273
1274            mag = i;
1275            set_label();
1276        }
1277        else {
1278            switch (i) {
1279
1280            case 5: /* Next Page */
1281
1282                if (pageno == npages || mag == 4) {
1283                    XBell(XDisp,100);
1284                    XFlush(XDisp);
1285                    return;
1286                }
1287                pageno++;
1288                if (mag == 4)
1289                    mag = 3;
1290                set_label();
1291                XFlush(XDisp);
1292                get_page();
1293                break;
1294
1295            case 6: /* Previous Page */
1296
1297                if (pageno == 1 || mag == 4) {
1298                    XBell(XDisp,100);
1299                    XFlush(XDisp);
1300                    return;
1301                }
1302                pageno--;
1303                if (mag == 4)
1304                    mag = 3;
1305                set_label();
1306                XFlush(XDisp);
1307                get_page();
1308                break;
1309
1310            case 7: /* Quit */
1311                exit(0);
1312
1313            case 8: /* Flip Page */
1314                flip_page();
1315                tb_calldata = (XmToggleButtonCallbackStruct *)calldata;
1316                if (tb_calldata->set == False)
1317                    flip_flag = FALSE;
1318                else
1319                    flip_flag = TRUE;
1320                break;
1321
```

```
1322            case 9: /* Draft */
1323                tb_calldata = (XmToggleButtonCallbackStruct *)calldata;
1324                if (tb_calldata->set == False)
1325                    draft_flag = FALSE;
1326                else
1327                    draft_flag = TRUE;
1328                return;
1329
1330            case 10: /* Print Page */
1331                fax_print(ConnectionNumber(XDisp),FP_CURPAGE,draft_flag);
1332                return;
1333
1334            case 11: /* Print All */
1335                fax_print(ConnectionNumber(XDisp),FP_ALLPAGES,draft_flag);
1336                return;
1337
1338            default:
1339                return;
1340        }
1341    }
1342
1343    XtUnmapWidget(drawarea);
1344    XFlush(XDisp);
1345
1346    switch (mag) {
1347
1348    case 0:
1349        if (r4flag == FALSE) {
1350            x33_page();
1351            r4flag = TRUE;
1352        }
1353        ximageptr = &ximage4;
1354        new_height = (2 * maxlines) / 3;
1355        new_width = (linelength + 2) / 3;
1356        break;
1357
1358    case 1:
1359        if (r3flag == FALSE) {
1360            x45_page();
1361            r3flag = TRUE;
1362        }
1363        ximageptr = &ximage3;
1364        new_height = 8 * maxlines / 9;
1365        new_width = (linelength * 4 + 8) / 9;
1366        break;
1367
1368    case 2:
1369        if (r2flag == FALSE) {
1370            x50_page();
1371            r2flag = TRUE;
1372        }
1373        ximageptr = &ximage2;
1374        new_height = maxlines;
1375        new_width = (linelength + 1) / 2;
1376        break;
1377
1378    case 3:
1379        ximageptr = &ximage1;
1380        new_height = maxlines * 2;
1381        new_width = linelength;
1382        break;
1383
1384    case 4:
1385        new_height = header_win_height;
1386        new_width = header_win_width;
1387        break;
1388    }
1389
1390    if (new_height != darea_height || new_width != darea_width) {
1391
1392        darea_width = new_width;
1393        darea_height = new_height;
1394
```

```
1395            XtSetArg(args[0],XmNheight, (XtArgVal) darea_height);
1396            XtSetArg(args[1],XmNwidth, (XtArgVal) darea_width);
1397            XtSetValues(drawarea,args,2);
1398        }
1399
1400        XtMapWidget(drawarea);
1401
1402        /* Reset the scroll bars to zero and cause the work area to be  */
1403        /* repositioned. Ideally, XmScrollBarSetValues() would do this, */
1404        /* however, the Motif scrolled window widget does not install   */
1405        /* a value changed callback for its scroll bars, so we have to  */
1406        /* call the drag callbacks ourselves (ick!).                    */
1407
1408        sb_calldata.reason = XmCR_DRAG;
1409        sb_calldata.event  = (XEvent *)0;
1410        sb_calldata.value  = 0;
1411        sb_calldata.pixel  = 0;
1412
1413        XtSetArg(args[0],XmNvalue, (XtArgVal) 0);
1414        XtSetValues(hbar,args,1);
1415        XtSetValues(vbar,args,1);
1416        XtCallCallbacks(hbar,XmNdragCallback,(caddr_t) &sb_calldata);
1417        XtCallCallbacks(vbar,XmNdragCallback,(caddr_t) &sb_calldata);
1418        return;
1419    }
1420
1421    void
1422    create_buttons(rowcol1,rowcol2)
1423        Widget rowcol1;
1424        Widget rowcol2;
1425    {
1426        register int i;
1427        register char *btn_text;
1428
1429        XtSetArg(args[0],XmNlabelType,(XtArgVal) XmSTRING);
1430        XtSetArg(args[2],XmNborderWidth, (XtArgVal) 2);
1431        XtSetArg(args[3],XmNindicatorType,(XtArgVal) XmONE_OF_MANY);
1432        XtSetArg(args[4],XmNselectColor,(XtArgVal) WhitePixel(XDisp,DefaultScreen(XDisp
1433        btn_text = XmStringCreateLtoR("0.33 X",XmSTRING_DEFAULT_CHARSET);
1434        XtSetArg(args[1],XmNlabelString,(XtArgVal) btn_text);
1435        button[0] = XmCreateToggleButton(rowcol1,"faxbutton0",args, 5);
1436        XtAddCallback(button[0],XmNvalueChangedCallback, buttonselectCB,   NULL);
1437
1438        btn_text = XmStringCreateLtoR("0.45 X",XmSTRING_DEFAULT_CHARSET);
1439        XtSetArg(args[1],XmNlabelString,(XtArgVal) btn_text);
1440        button[1] = XmCreateToggleButton(rowcol1,"faxbutton1",args, 5);
1441        XtAddCallback(button[1],XmNvalueChangedCallback, buttonselectCB,   NULL);
1442
1443        btn_text = XmStringCreateLtoR("0.50 X",XmSTRING_DEFAULT_CHARSET);
1444        XtSetArg(args[1],XmNlabelString,(XtArgVal) btn_text);
1445        button[2] = XmCreateToggleButton(rowcol1,"faxbutton2",args, 5);
1446        XtAddCallback(button[2],XmNvalueChangedCallback, buttonselectCB,   NULL);
1447
1448        btn_text = XmStringCreateLtoR("1.00 X",XmSTRING_DEFAULT_CHARSET);
1449        XtSetArg(args[1],XmNlabelString,(XtArgVal) btn_text);
1450        XtSetArg(args[5],XmNset,(XtArgVal) True);
1451        button[3] = XmCreateToggleButton(rowcol1,"faxbutton3",args, 6);
1452        XtAddCallback(button[3],XmNvalueChangedCallback, buttonselectCB,   NULL);
1453
1454        btn_text = XmStringCreateLtoR("Headers",XmSTRING_DEFAULT_CHARSET);
1455        XtSetArg(args[1],XmNlabelString,(XtArgVal) btn_text);
1456        button[4] = XmCreateToggleButton(rowcol1,"faxbutton4",args, 5);
1457        XtAddCallback(button[4],XmNvalueChangedCallback, buttonselectCB,   NULL);
1458
1459        btn_text = XmStringCreateLtoR("Next",XmSTRING_DEFAULT_CHARSET);
1460        XtSetArg(args[1],XmNlabelString,(XtArgVal) btn_text);
1461        button[5] = XmCreatePushButton(rowcol1,"faxbutton5",args, 3);
1462        XtAddCallback(button[5],XmNactivateCallback, buttonselectCB,   NULL);
1463
1464        btn_text = XmStringCreateLtoR("Prev",XmSTRING_DEFAULT_CHARSET);
1465        XtSetArg(args[1],XmNlabelString,(XtArgVal) btn_text);
1466        button[6] = XmCreatePushButton(rowcol1,"faxbutton6",args, 3);
1467        XtAddCallback(button[6],XmNactivateCallback, buttonselectCB,   NULL);
```

```
1468
1469        btn_text = XmStringCreateLtoR("Quit",XmSTRING_DEFAULT_CHARSET);
1470        XtSetArg(args[1],XmNlabelString,(XtArgVal) btn_text);
1471        button[7] = XmCreatePushButton(rowcol1,"faxbutton7",args, 3);
1472        XtAddCallback(button[7],XmNactivateCallback, buttonselectCB, NULL);
1473
1474        btn_text = XmStringCreateLtoR("Flip",XmSTRING_DEFAULT_CHARSET);
1475        XtSetArg(args[1],XmNlabelString,(XtArgVal) btn_text);
1476        XtSetArg(args[3],XmNindicatorType,(XtArgVal) XmN_OF_MANY);
1477        button[8] = XmCreateToggleButton(rowcol2,"faxbutton8",args, 5);
1478        XtAddCallback(button[8],XmNvalueChangedCallback, buttonselectCB, NULL);
1479
1480        btn_text = XmStringCreateLtoR("Draft",XmSTRING_DEFAULT_CHARSET);
1481        XtSetArg(args[1],XmNlabelString,(XtArgVal) btn_text);
1482        XtSetArg(args[5],XmNset,(XtArgVal) True);
1483        button[9] = XmCreateToggleButton(rowcol2,"faxbutton9",args, 6);
1484        XtAddCallback(button[9],XmNvalueChangedCallback, buttonselectCB, NULL);
1485
1486        btn_text = XmStringCreateLtoR("Print Page",XmSTRING_DEFAULT_CHARSET);
1487        XtSetArg(args[1],XmNlabelString,(XtArgVal) btn_text);
1488        button[10] = XmCreatePushButton(rowcol2,"faxbutton10",args, 3);
1489        XtAddCallback(button[10],XmNactivateCallback, buttonselectCB, NULL);
1490
1491        btn_text = XmStringCreateLtoR("Print All",XmSTRING_DEFAULT_CHARSET);
1492        XtSetArg(args[1],XmNlabelString,(XtArgVal) btn_text);
1493        button[11] = XmCreatePushButton(rowcol2,"faxbutton11",args, 3);
1494        XtAddCallback(button[11],XmNactivateCallback, buttonselectCB, NULL);
1495
1496        for (i = 0; i < NBUTTONS; i++) {
1497            XtManageChild(button[i]);
1498        }
1499        return;
1500    }
1501
1502    void
1503    set_label()
1504    {
1505        register char *btn_text;
1506        static char labelstring[64];
1507
1508        switch(mag) {
1509
1510        case 0:
1511            sprintf(labelstring,"Magnification: 0.33 Page %2d of %2d",pageno,npages);
1512            break;
1513
1514        case 1:
1515            sprintf(labelstring,"Magnification: 0.45 Page %2d of %2d",pageno,npages);
1516            break;
1517
1518        case 2:
1519            sprintf(labelstring,"Magnification: 0.50 Page %2d of %2d",pageno,npages);
1520            break;
1521
1522        case 3:
1523            sprintf(labelstring,"Magnification: 1.00 Page %2d of %2d",pageno,npages);
1524            break;
1525
1526        case 4:
1527            sprintf(labelstring,"Header Information");
1528            break;
1529        }
1530
1531        XtSetArg(args[0],XmNlabelType,(XtArgVal) XmSTRING);
1532        btn_text = XmStringCreateLtoR(labelstring,XmSTRING_DEFAULT_CHARSET);
1533        XtSetArg(args[1],XmNlabelString,(XtArgVal) btn_text);
1534        XtSetValues(label,args,2);
1535
1536        return;
1537    }
1538
1539    void
1540    file_init()
1541    {
```

```
register int i;
struct stat sbuf;
int offset;
int maxpagebytes;
int npagebytes;
register char *s;
char buf[36];

/* Seek to end of file to get offset to beginning of parameter area */ if (fstat(xfaxfd,&sbuf) != 0)
    errexit("stat failure on fax file.\n");

offset = sbuf.st_size - 4;
if (offset < 0 || lseek(xfaxfd,offset,SEEK_SET) != offset)
    errexit("lseek failure on fax file.\n");

if (read(xfaxfd,(char *)&offset,4) != 4)
    errexit("Read error on fax file.\n");

if (offset < 0 || offset >= sbuf.st_size
                || lseek(xfaxfd,offset,SEEK_SET) != offset)
    errexit("lseek failure on fax file.\n");

/* Get file type */ if (read(xfaxfd,(char *)&offset,4) != 4)
    errexit("Read error on fax file.\n");

if (offset != FT_RAW)
    errexit("Unknown Fax file type.\n");

/* Get the parameters for the fax file */ if (   read(xfaxfd,buf,36) != 36
    || read(xfaxfd,(char *)&filesize,4) != 4
    || read(xfaxfd,(char *)&linelength,4) != 4
    || read(xfaxfd,(char *)&hres,4) != 4
    || read(xfaxfd,(char *)&vres,4) != 4
    || read(xfaxfd,(char *)&npages,4) != 4 )
    errexit("Read error on fax file.\n");

if (sbuf.st_size != filesize)
    errexit("filesize inconsistancy on fax file.\n");

/* Allocate space for page offsets and page nlines arrays */ pageoffsets = (unsigned long *)malloc(npages * 8);
if (pageoffsets == (unsigned long *)0)
    errexit("Malloc Failure.\n");

page_nlines = pageoffsets + npages;

/* Read offsets and page_nlines arrays */ if (   read(xfaxfd,(char *)pageoffsets,(npages * 4)) != (npages * 4)
    || read(xfaxfd,(char *)page_nlines,(npages * 4)) != (npages * 4))
    errexit("Read error on fax file.\n");

/* Compute bytes per line */ bytesperline1 = (linelength + 7) / 8;
bytesperline1 += (bytesperline1 % 18);
bytesperline2 = bytesperline1 / 2;
bytesperline3 = (bytesperline1 * 4) / 9;
bytesperline4 = bytesperline1 / 3;

/* Traverse offsets array to find maxpagebytes */ maxpagebytes = filesize - pageoffsets[npages - 1];
for (i = 0; i < (npages - 1); i++) {
```

```
            npagebytes = pageoffsets[i + 1] - pageoffsets[i];
            if (npagebytes > maxpagebytes)
                maxpagebytes = npagebytes;
        }

/* Traver page nlines array to find maxlines */ maxlines = 0;
        for (i = 0; i < npages; i++) {
            if (page_nlines[i] > maxlines)
                maxlines = page_nlines[i];
        }

/* Allocate space for raw bytes for page */ if ((pagebytes = malloc(maxpagebytes)) == (unsigned char *)0)
            errexit("Malloc Failure.\n");

/* Make sure maxlines is divisible by 9 */ maxlines += (maxlines % 9);

/* Allocate space for rasters */ if ((r1bytes = malloc(bytesperline1 * 2 * maxlines)) == (unsigned char *)0)
            errexit("Malloc Failure.\n");

if ((r2bytes = malloc(bytesperline2 * maxlines)) == (unsigned char *)0)
            errexit("Malloc Failure.\n");

i = 8 * maxlines / 9;
        if ((r3bytes = malloc(bytesperline3 * i)) == (unsigned char *)0)
            errexit("Malloc Failure.\n");

i = 2 * maxlines / 3;
        if ((r4bytes = malloc(bytesperline4 * i)) == (unsigned char *)0)
            errexit("Malloc Failure.\n");

/* Allocate space for header pointers */ header_array = (char **)malloc(nheader_lines * sizeof(char **));
        if (header_array == (char **)0)
            errexit("Malloc Failure.\n");

/* Fill in header pointers */ s = headerbuf;
        for (i = 0; i < nheader_lines; i++) {
            header_array[i] = s;
            while (*s != '\n')
                s++;

*s++ = '\0';
        } return;
} unsigned char highmask[8] = { 0x00, 0x80, 0xc0, 0xe0, 0xf0, 0xf8, 0xfc, 0xfe };

void
get_page()
{
        register unsigned char *s;
        register unsigned char *rbptr;
        register short *linecodeptr;
        register int bitno;
        register int code;
        register int pixelpos;
        register int i;
        int offset;
        short linecodes[FAX_MAX_PPL];
        struct flock fl;
        int nlines;
```

```
       int ncodes;

offset = pageoffsets[pageno - 1];
       nlines = page_nlines[pageno - 1];

/* Lock the fax file. We need to do this since   */
       /* it is possible that we could have forked      */
       /* a child for printing which shares a file      */
       /* pointer with us. print_fax() also calls this  */
       /* routine.                                      */ fl.l_type   = F_WRLCK;
       fl.l_whence = 0;
       fl.l_start  = 0;
       fl.l_len    = 0;

if (fcntl(xfaxfd, F_SETLKW, &fl) == -1)
           errexit("Lock failed.\n");

if (set_page(xfaxfd,offset) != 0)
           errexit("Error in reading fax page.\n");

/* Clear Raster */ memset(rlbytes,'\0',2 * maxlines * bytesperline1);

/* Convert to a raw raster */ rbptr = rlbytes;
       while (nlines-- > 0) {
           ncodes = read_line(xfaxfd,&linecodes[0]);

/* Make ncodes even */ if ((ncodes & 0x1) != 0)
               linecodes[ncodes++] = 0;

pixelpos = 0;
           linecodeptr = &linecodes[0];
           for (i = 0; i < ncodes; i += 2) { pixelpos += *linecodeptr++;

s = rbptr + (pixelpos >> 3);
               bitno = 7 - (pixelpos & 0x7);
               code = *linecodeptr++;
               pixelpos += code;
               if (bitno != 7) {
                   while (bitno != -1) {
                       *s |= (1 << bitno);
                       if (--code == 0)
                           break;
                       bitno--;
                   }
                   s++;
               } while (code >= 8) {
                   *s++ = 0xff;
                   code -= 8;
               } if (code > 0)
                   *s |= highmask[code];
           }

/* Duplicate line */ memcpy(rbptr + bytesperline1,rbptr,bytesperline1);

rbptr += 2 * bytesperline1;
       }

/* Unlock the file */
```

```c
        fl.l_type = F_UNLCK;
        if (fcntl(xfaxfd, F_SETLKW, &fl) == -1)
            errexit("Unlock failed.\n");

r2flag = FALSE;
        r3flag = FALSE;
        r4flag = FALSE;
        ximageptr = &ximage1;
        darea_height = maxlines * 2;
        darea_width  = linelength;
        if (flip_flag != FALSE)
            flip_page();
        return;

} unsigned char reverse[256] = {
    0x00, 0x80, 0x40, 0xc0, 0x20, 0xa0, 0x60, 0xe0, 0x10, 0x90, 0x50, 0xd0, 0x30,
    0x08, 0x88, 0x48, 0xc8, 0x28, 0xa8, 0x68, 0xe8, 0x18, 0x98, 0x58, 0xd8, 0x38,
    0x04, 0x84, 0x44, 0xc4, 0x24, 0xa4, 0x64, 0xe4, 0x14, 0x94, 0x54, 0xd4, 0x34,
    0x0c, 0x8c, 0x4c, 0xcc, 0x2c, 0xac, 0x6c, 0xec, 0x1c, 0x9c, 0x5c, 0xdc, 0x3c, 0
    0x02, 0x82, 0x42, 0xc2, 0x22, 0xa2, 0x62, 0xe2, 0x12, 0x92, 0x52, 0xd2, 0x32,
    0x0a, 0x8a, 0x4a, 0xca, 0x2a, 0xaa, 0x6a, 0xea, 0x1a, 0x9a, 0x5a, 0xda, 0x3a,
    0x06, 0x86, 0x46, 0xc6, 0x26, 0xa6, 0x66, 0xe6, 0x16, 0x96, 0x56, 0xd6, 0x36,
    0x0e, 0x8e, 0x4e, 0xce, 0x2e, 0xae, 0x6e, 0xee, 0x1e, 0x9e, 0x5e, 0xde, 0x3e, 0
    0x01, 0x81, 0x41, 0xc1, 0x21, 0xa1, 0x61, 0xe1, 0x11, 0x91, 0x51, 0xd1, 0x31, 0
    0x09, 0x89, 0x49, 0xc9, 0x29, 0xa9, 0x69, 0xe9, 0x19, 0x99, 0x59, 0xd9, 0x39,
    0x05, 0x85, 0x45, 0xc5, 0x25, 0xa5, 0x65, 0xe5, 0x15, 0x95, 0x55, 0xd5, 0x35, 0
    0x0d, 0x8d, 0x4d, 0xcd, 0x2d, 0xad, 0x6d, 0xed, 0x1d, 0x9d, 0x5d, 0xdd, 0x3d, 0
    0x03, 0x83, 0x43, 0xc3, 0x23, 0xa3, 0x63, 0xe3, 0x13, 0x93, 0x53, 0xd3, 0x33, 0
    0x0b, 0x8b, 0x4b, 0xcb, 0x2b, 0xab, 0x6b, 0xeb, 0x1b, 0x9b, 0x5b, 0xdb, 0x3b, 0
    0x07, 0x87, 0x47, 0xc7, 0x27, 0xa7, 0x67, 0xe7, 0x17, 0x97, 0x57, 0xd7, 0x37, 0
    0x0f, 0x8f, 0x4f, 0xcf, 0x2f, 0xaf, 0x6f, 0xef, 0x1f, 0x9f, 0x5f, 0xdf, 0x3f, 0
};

void
flip_page()
{
    register unsigned char *s1;
    register unsigned char *s2;
    register int i;
    register int nlines;
    register int holdch;

s1 = rlbytes;
    s2 = s1 + (2 * maxlines * bytesperline1) - 1;
    nlines = (maxlines + 1) / 2;
    while (nlines-- > 0) { i = bytesperline1;
        while (i-- > 0) {
            holdch = *s1;
            *s1++ = reverse[*s2];
            *s2-- = reverse[holdch];
        } if (s1 != s2 + 1) {
            memcpy(s1,s1 - bytesperline1,bytesperline1);
            memcpy(s2 - (bytesperline1 - 1),s2 + 1,bytesperline1);

s1 += bytesperline1;
            s2 -= bytesperline1;
        }
    } r2flag = FALSE;
    r3flag = FALSE;
    r4flag = FALSE;
    ximageptr = &ximage1;
    darea_height = maxlines * 2;
    darea_width  = linelength;
    return;
}
```

```
unsigned char compress[256] = {
    0x0, 0x1, 0x1, 0x1, 0x2, 0x3, 0x3, 0x3, 0x2, 0x3, 0x3, 0x3, 0x2, 0x3, 0x3, 0x3,
    0x4, 0x5, 0x5, 0x5, 0x6, 0x7, 0x7, 0x7, 0x6, 0x7, 0x7, 0x7, 0x6, 0x7, 0x7, 0x7,
    0x4, 0x5, 0x5, 0x5, 0x6, 0x7, 0x7, 0x7, 0x6, 0x7, 0x7, 0x7, 0x6, 0x7, 0x7, 0x7,
    0x4, 0x5, 0x5, 0x5, 0x6, 0x7, 0x7, 0x7, 0x6, 0x7, 0x7, 0x7, 0x6, 0x7, 0x7, 0x7,
    0x8, 0x9, 0x9, 0x9, 0xa, 0xb, 0xb, 0xb, 0xa, 0xb, 0xb, 0xb, 0xa, 0xb, 0xb, 0xb,
    0xc, 0xd, 0xd, 0xd, 0xe, 0xf, 0xf, 0xf, 0xe, 0xf, 0xf, 0xf, 0xe, 0xf, 0xf, 0xf,
    0xc, 0xd, 0xd, 0xd, 0xe, 0xf, 0xf, 0xf, 0xe, 0xf, 0xf, 0xf, 0xe, 0xf, 0xf, 0xf,
    0xc, 0xd, 0xd, 0xd, 0xe, 0xf, 0xf, 0xf, 0xe, 0xf, 0xf, 0xf, 0xe, 0xf, 0xf, 0xf,
    0x8, 0x9, 0x9, 0x9, 0xa, 0xb, 0xb, 0xb, 0xa, 0xb, 0xb, 0xb, 0xa, 0xb, 0xb, 0xb,
    0xc, 0xd, 0xd, 0xd, 0xe, 0xf, 0xf, 0xf, 0xe, 0xf, 0xf, 0xf, 0xe, 0xf, 0xf, 0xf,
    0xc, 0xd, 0xd, 0xd, 0xe, 0xf, 0xf, 0xf, 0xe, 0xf, 0xf, 0xf, 0xe, 0xf, 0xf, 0xf,
    0xc, 0xd, 0xd, 0xd, 0xe, 0xf, 0xf, 0xf, 0xe, 0xf, 0xf, 0xf, 0xe, 0xf, 0xf, 0xf,
    0x8, 0x9, 0x9, 0x9, 0xa, 0xb, 0xb, 0xb, 0xa, 0xb, 0xb, 0xb, 0xa, 0xb, 0xb, 0xb,
    0xc, 0xd, 0xd, 0xd, 0xe, 0xf, 0xf, 0xf, 0xe, 0xf, 0xf, 0xf, 0xe, 0xf, 0xf, 0xf,
    0xc, 0xd, 0xd, 0xd, 0xe, 0xf, 0xf, 0xf, 0xe, 0xf, 0xf, 0xf, 0xe, 0xf, 0xf, 0xf,
    0xc, 0xd, 0xd, 0xd, 0xe, 0xf, 0xf, 0xf, 0xe, 0xf, 0xf, 0xf, 0xe, 0xf, 0xf, 0xf
};

void
x50_page()
{
    register unsigned char *r1bptr;
    register unsigned char *r2bptr;
    register int i,j;

/* Clear Raster */ memset(r2bytes,'\0',maxlines * bytesperline2);

r1bptr = r1bytes;
    r2bptr = r2bytes;

for (i = 0; i < maxlines; i++) {
        j = bytesperline2;
        while (j-- > 0) {
            *r2bptr++ = (compress[*r1bptr] << 4) | compress[*(r1bptr + 1)];
            r1bptr += 2;
        }
        r1bptr += bytesperline1;
    } return;
} static int numbits45[32] = {
    0, 1, 4, 5, 4, 5, 8, 9,
    0, 2, 4, 6, 3, 5, 7, 9,
    0, 3, 4, 7, 2, 5, 6, 9,
    0, 4, 4, 8, 1, 5, 5, 9
};

define BTHRESH45 19 void
x45_page()
{
    register unsigned char *r1bptr;
    register unsigned char *r2bptr;
    register unsigned char *r3bptr;
    register unsigned char *rdstptr;
    register int j;
    register int bits1, bits2, bits3;
    register int obits;
    register int k2;
    register int k1;
    register int i;

/* Clear Raster */ i = 8 * maxlines / 9;
    memset(r3bytes,'\0',i * bytesperline3);
```

```
1910        r1bptr = r1bytes;
1911        r2bptr = r1bptr + bytesperline1;
1912        r3bptr = r2bptr + bytesperline1;
1913        rdstptr = r3bytes;
1914
1915        k1 = 1;
1916        while (i-- > 0) {
1917            j = bytesperline3;
1918            k2 = 0;
1919            while (j-- > 0) {
1920
1921                switch (k2) {
1922
1923                case 0:
1924                    bits1  = *r1bptr++ << 10;
1925                    bits1 |= *r1bptr++ << 2;
1926                    bits1 |= (*r1bptr >> 6) & 0x3;
1927                    bits2  = *r2bptr++ << 10;
1928                    bits2 |= *r2bptr++ << 2;
1929                    bits2 |= (*r2bptr >> 6) & 0x3;
1930                    bits3  = *r3bptr++ << 10;
1931                    bits3 |= *r3bptr++ << 2;
1932                    bits3 |= (*r3bptr >> 6) & 0x3;
1933                    k2 = 1;
1934                    break;
1935
1936                case 1:
1937                    bits1  = (*r1bptr++ & 0x3f) << 12;
1938                    bits1 |= *r1bptr++ << 4;
1939                    bits1 |= (*r1bptr >> 4) & 0xf;
1940                    bits2  = (*r2bptr++ & 0x3f) << 12;
1941                    bits2 |= *r2bptr++ << 4;
1942                    bits2 |= (*r2bptr >> 4) & 0xf;
1943                    bits3  = (*r3bptr++ & 0x3f) << 12;
1944                    bits3 |= *r3bptr++ << 4;
1945                    bits3 |= (*r3bptr >> 4) & 0xf;
1946                    k2 = 2;
1947                    break;
1948
1949                case 2:
1950                    bits1  = (*r1bptr++ & 0xf) << 14;
1951                    bits1 |= *r1bptr++ << 6;
1952                    bits1 |= (*r1bptr >> 2) & 0x3f;
1953                    bits2  = (*r2bptr++ & 0xf) << 14;
1954                    bits2 |= *r2bptr++ << 6;
1955                    bits2 |= (*r2bptr >> 2) & 0x3f;
1956                    bits3  = (*r3bptr++ & 0xf) << 14;
1957                    bits3 |= *r3bptr++ << 6;
1958                    bits3 |= (*r3bptr >> 2) & 0x3f;
1959                    k2 = 3;
1960                    break;
1961
1962                case 3:
1963                    bits1  = (*r1bptr++ & 0x3) << 16;
1964                    bits1 |= *r1bptr++ << 8;
1965                    bits1 |= *r1bptr++;
1966                    bits2  = (*r2bptr++ & 0x3) << 16;
1967                    bits2 |= *r2bptr++ << 8;
1968                    bits2 |= *r2bptr++;
1969                    bits3  = (*r3bptr++ & 0x3) << 16;
1970                    bits3 |= *r3bptr++ << 8;
1971                    bits3 |= *r3bptr++;
1972                    k2 = 0;
1973                    break;
1974                }
1975
1976                /* bit 7 */
1977
1978                if (( (5 - k1) * numbits45[(bits1 >> 15)]
1979                      +       4 * numbits45[(bits2 >> 15)]
1980                      +      k1 * numbits45[(bits3 >> 15)]) > BTHRESH45) {
1981
1982                    obits = 0x80;
1983                }
```

```
                else
                    obits = 0;

/* bit 6 */ if ((   (5 - k1) * numbits45[8 + ((bits1 >> 13) & 0x7)]
                    +        4 * numbits45[8 + ((bits2 >> 13) & 0x7)]
                    +       k1 * numbits45[8 + ((bits3 >> 13) & 0x7)] ) > BTHRESH45)

obits |= 0x40;
                }

/* bit 5 */ if ((   (5 - k1) * numbits45[16 + ((bits1 >> 11) & 0x7)]
                    +        4 * numbits45[16 + ((bits2 >> 11) & 0x7)]
                    +       k1 * numbits45[16 + ((bits3 >> 11) & 0x7)] ) > BTHRESH45)

obits |= 0x20;
                }

/* bit 4 */ if ((   (5 - k1) * numbits45[24 + ((bits1 >> 9) & 0x7)]
                    +        4 * numbits45[24 + ((bits2 >> 9) & 0x7)]
                    +       k1 * numbits45[24 + ((bits3 >> 9) & 0x7)] ) > BTHRESH45)

obits |= 0x10;
                }

/* bit 3 */ if ((   (5 - k1) * numbits45[(bits1 >> 6) & 0x7]
                    +        4 * numbits45[(bits2 >> 6) & 0x7]
                    +       k1 * numbits45[(bits3 >> 6) & 0x7] ) > BTHRESH45) { obits |= 0x08;
                }

/* bit 2 */ if ((   (5 - k1) * numbits45[8 + ((bits1 >> 4) & 0x7)]
                    +        4 * numbits45[8 + ((bits2 >> 4) & 0x7)]
                    +       k1 * numbits45[8 + ((bits3 >> 4) & 0x7)] ) > BTHRESH45) { obits |= 0x04;
                }

/* bit 1 */ if ((   (5 - k1) * numbits45[16 + ((bits1 >> 2) & 0x7)]
                    +        4 * numbits45[16 + ((bits2 >> 2) & 0x7)]
                    +       k1 * numbits45[16 + ((bits3 >> 2) & 0x7)] ) > BTHRESH45)

obits |= 0x02;
                }

/* bit 0 */ if ((   (5 - k1) * numbits45[24 + (bits1 & 0x7)]
                    +        4 * numbits45[24 + (bits2 & 0x7)]
                    +       k1 * numbits45[24 + (bits3 & 0x7)] ) > BTHRESH45) { obits |= 0x01;
                }

*rdstptr++ = obits;
            } if (k1++ == 4) {
                r1bptr = r3bptr;
                r2bptr = r1bptr + bytesperline1;
                r3bptr = r2bptr + bytesperline1;
                k1 = 1;
```

```
2058                }
2059            else {
2060                r1bptr = r2bptr;
2061                r2bptr = r1bptr + bytesperline1;
2062                r3bptr = r2bptr + bytesperline1;
2063            }
2064        }
2065
2066        return;
2067    }
2068
2069    static int numbits33[8] = { 0, 1, 1, 2, 1, 2, 2, 3 };
2070
2071    #define BTHRESH33 1
2072
2073    void
2074    x33_page()
2075    {
2076        register unsigned char *r1bptr;
2077        register unsigned char *r2bptr;
2078        register unsigned char *r3bptr;
2079        register unsigned char *rdstptr;
2080        register int j;
2081        register int bits1, bits2, bits3;
2082        register int obits;
2083        register int i;
2084
2085        /* Clear Raster */
2086
2087        i = 2 * maxlines / 3;
2088        memset(r4bytes,'\0',i.* bytesperline4);
2089
2090        r1bptr = r1bytes;
2091        r2bptr = r1bptr + bytesperline1;
2092        r3bptr = r2bptr + bytesperline1;
2093        rdstptr = r4bytes;
2094
2095        while (i-- > 0) {
2096            j = bytesperline4;
2097            while (j-- > 0) {
2098
2099                bits1  = *r1bptr++ << 16;
2100                bits1 |= *r1bptr++ << 8;
2101                bits1 |= *r1bptr++;
2102                bits2  = *r2bptr++ << 16;
2103                bits2 |= *r2bptr++ << 8;
2104                bits2 |= *r2bptr++;
2105                bits3  = *r3bptr++ << 16;
2106                bits3 |= *r3bptr++ << 8;
2107                bits3 |= *r3bptr++;
2108
2109                /* bit 7 */
2110
2111                if ((  numbits33[(bits1 >> 21)]
2112                     + numbits33[(bits2 >> 21)]
2113                     + numbits33[(bits3 >> 21)]) > BTHRESH33) {
2114
2115                    obits = 0x80;
2116                }
2117                else
2118                    obits = 0;
2119
2120                /* bit 6 */
2121
2122                if ((  numbits33[(bits1 >> 18) & 0x7]
2123                     + numbits33[(bits2 >> 18) & 0x7]
2124                     + numbits33[(bits3 >> 18) & 0x7] ) > BTHRESH33) {
2125
2126                    obits |= 0x40;
2127                }
2128
```

```
        /* bit 5 */ if ((  numbits33[(bits1 >> 15) & 0x7]
              + numbits33[(bits2 >> 15) & 0x7]
              + numbits33[(bits3 >> 15) & 0x7] ) > BTHRESH33) { obits |= 0x20;
        }

/* bit 4 */ if ((  numbits33[(bits1 >> 12) & 0x7]
              + numbits33[(bits2 >> 12) & 0x7]
              + numbits33[(bits3 >> 12) & 0x7] ) > BTHRESH33) { obits |= 0x10;
        }

/* bit 3 */ if ((  numbits33[(bits1 >> 9) & 0x7]
              + numbits33[(bits2 >> 9) & 0x7]
              + numbits33[(bits3 >> 9) & 0x7] ) > BTHRESH33) { obits |= 0x08;
        }

/* bit 2 */ if ((  numbits33[(bits1 >> 6) & 0x7]
              + numbits33[(bits2 >> 6) & 0x7]
              + numbits33[(bits3 >> 6) & 0x7] ) > BTHRESH33) { obits |= 0x04;
        }

/* bit 1 */ if ((  numbits33[(bits1 >> 3) & 0x7]
              + numbits33[(bits2 >> 3) & 0x7]
              + numbits33[(bits3 >> 3) & 0x7] ) > BTHRESH33) { obits |= 0x02;
        }

/* bit 0 */ if ((  numbits33[bits1 & 0x7]
              + numbits33[bits2 & 0x7]
              + numbits33[bits3 & 0x7] ) > BTHRESH33) { obits |= 0x01;
        }

*rdstptr++ = obits;
    } r1bptr = r3bptr;
    r2bptr = r1bptr + bytesperline1;
    r3bptr = r2bptr + bytesperline1;
    } return;
}
/* The routines in this file are shared by more than one program */

/* Forward Declarations */ void fax_code_init();
int set_page(), read_line();
static int read_code(), getbyte(), getbit();
static void code_insert();
static struct codetree *cell_alloc();
```

```
2203      /* The following variables are used by various routines that */
2204      /* decode fax format and are initialized by fax_code_init(). */
2205
2206      struct codetree *black_tree;
2207      struct codetree *white_tree;
2208
2209      /* File Global variables */
2210
2211      /* the following variable is used by getbyte(), and */
2212      /* initialized by set_page().                       */
2213
2214      static int nbytes_left;
2215
2216      /* the following variables are used by getbit(), and  */
2217      /* initialized by read_line().                        */
2218
2219      static unsigned char *bufptr;
2220      static int bitno;
2221
2222      /* The following variable is used by read_code(),  */
2223      /* and initialized by read_line().                 */
2224
2225      static struct codetree *current_tree;
2226
2227      set_page(faxfd,pageoffset)
2228          int faxfd;
2229          unsigned long pageoffset;
2230      {
2231
2232          /* Seek to beginning of page */
2233
2234          if (lseek(faxfd,pageoffset,SEEK_SET) != pageoffset)
2235              return(-1);
2236
2237          nbytes_left = 0;
2238
2239          return(0);
2240      }
2241
2242      int
2243      read_line(faxfd,linecodeptr)
2244          register int faxfd;
2245          register short *linecodeptr;
2246      {
2247          register int i;
2248          register int j;
2249          register int ncodes;
2250          register unsigned char *s;
2251          unsigned char inline[2048];
2252          int nbytes;
2253
2254          ncodes = 0;
2255          if ((i = getbyte(faxfd)) == -1)
2256              return(ncodes);
2257
2258          nbytes = i * 256;
2259
2260          if ((i = getbyte(faxfd)) == -1)
2261              return(ncodes);
2262
2263          nbytes += i;
2264
2265          s = inline;
2266          j = nbytes;
2267          while (j-- > 0) {
2268              if ((i = getbyte(faxfd)) == -1)
2269                  return(ncodes);
2270
2271              *s++ = i;
2272          }
2273
2274          /* put an EOL on end */
2275
2276          *s++ = 0x00;
2277          *s++ = 0x01;
```

```
2278
2279
2280        /* set globals that are used by getbit() */
2281
2282        bitno  = -1;
2283        bufptr = inline;
2284
2285        /* set current_tree (used by read_code()) */
2286
2287        current_tree = white_tree;
2288
2289        while ((i = read_code()) != -1) {
2290            *linecodeptr++ = i;
2291            ncodes++;
2292        }
2293
2294        return(ncodes);
2295    }
2296
2297    static int
2298    read_code()
2299    {
2300        register struct codetree *treeptr;
2301        register int i;
2302        int code;
2303
2304        code = 0;
2305        treeptr = current_tree;
2306
2307        while (treeptr->type == CT_BRANCH) {
2308            if (getbit() == 0)
2309                treeptr = treeptr->branch_0;
2310            else
2311                treeptr = treeptr->branch_1;
2312        }
2313
2314        if (treeptr->type == CT_ERROR)
2315            return(-1);
2316
2317        code = treeptr->info;
2318        if (treeptr->type != CT_TERM) {
2319            i = read_code(); /* Recursive Call */
2320            if (i == -1)
2321                return(-1);
2322
2323            code += i;
2324        }
2325        else {
2326
2327            /* toggle tree */
2328
2329            if (current_tree == white_tree)
2330                current_tree = black_tree;
2331            else
2332                current_tree = white_tree;
2333        }
2334        return(code);
2335    }
2336
2337    static int
2338    getbyte(faxfd)
2339        register int faxfd;
2340    {
2341        register int i;
2342        static unsigned char inbuf[8192];
2343        static unsigned char *curbyteptr;
2344
2345        if (nbytes_left == 0) {
2346            nbytes_left = read(faxfd,inbuf,8192);
2347            if (nbytes_left <= 0)
2348                return(-1);
2349
2350            curbyteptr = inbuf;
2351        }
2352
```

```
2353          i = *curbyteptr++;
2354          nbytes_left--;
2355          return(i);
2356      }
2357
2358      static int
2359      getbit()
2360      {
2361          static int curbyte;
2362
2363          if (bitno == -1) {
2364              curbyte = (int)*bufptr++;
2365              bitno = 7;
2366          }
2367
2368      #ifdef GBDEBUG
2369.         log(EL5,"get bit return %d\n",(curbyte >> bitno) & 0x1);
2370      #endif
2371          return( (curbyte >> bitno--) & 0x01 );
2372      }
2373
2374      /* Code Types */
2375
2376      #define BLACKTERM 1
2377      #define WHITETERM 2
2378      #define BLACKMKUP 3
2379      #define WHITEMKUP 4
2380      #define BOTHTERM  5
2381      #define BOTHMKUP  6
2382
2383      static struct codeinfo {
2384          char *code;
2385          int  info;
2386          int  codetype;
2387      } codeinit[] = {
2388          {  "00110101",            0,  WHITETERM },
2389          {  "000111",               1,  WHITETERM },
2390          {  "0111",                 2,  WHITETERM },
2391          {  "1000",                 3,  WHITETERM },
2392          {  "1011",                 4,  WHITETERM },
2393          {  "1100",                 5,  WHITETERM },
2394          {  "1110",                 6,  WHITETERM },
2395          {  "1111",                 7,  WHITETERM },
2396          {  "10011",                8,  WHITETERM },
2397          {  "10100",                9,  WHITETERM },
2398          {  "00111",               10,  WHITETERM },
2399          {  "01000",               11,  WHITETERM },
2400          {  "001000",              12,  WHITETERM },
2401          {  "000011",              13,  WHITETERM },
2402          {  "110100",              14,  WHITETERM },
2403          {  "110101",              15,  WHITETERM },
2404          {  "101010",              16,  WHITETERM },
2405          {  "101011",              17,  WHITETERM },
2406          {  "0100111",             18,  WHITETERM },
2407          {  "0001100",             19,  WHITETERM },
2408          {  "0001000",             20,  WHITETERM },
2409          {  "0010111",             21,  WHITETERM },
2410          {  "0000011",             22,  WHITETERM },
2411          {  "0000100",             23,  WHITETERM },
2412          {  "0101000",             24,  WHITETERM },
2413          {  "0101011",             25,  WHITETERM },
2414          {  "0010011",             26,  WHITETERM },
2415          {  "0100100",             27,  WHITETERM },
2416          {  "0011000",             28,  WHITETERM },
2417          {  "00000010",            29,  WHITETERM },
2418          {  "00000011",            30,  WHITETERM },
2419          {  "00011010",            31,  WHITETERM },
2420          {  "00011011",            32,  WHITETERM },
2421          {  "00010010",            33,  WHITETERM },
2422          {  "00010011",            34,  WHITETERM },
2423          {  "00010100",            35,  WHITETERM },
2424          {  "00010101",            36,  WHITETERM },
2425          {  "00010110",            37,  WHITETERM },
2426          {  "00010111",            38,  WHITETERM },
```

| | | | | |
|---|---|---|---|---|
| 2427 | { | "00101000", | 39, | WHITETERM }, |
| 2428 | { | "00101001", | 40, | WHITETERM }, |
| 2429 | { | "00101010", | 41, | WHITETERM }, |
| 2430 | { | "00101011", | 42, | WHITETERM }, |
| 2431 | { | "00101100", | 43, | WHITETERM }, |
| 2432 | { | "00101101", | 44, | WHITETERM }, |
| 2433 | { | "00000100", | 45, | WHITETERM }, |
| 2434 | { | "00000101", | 46, | WHITETERM }, |
| 2435 | { | "00001010", | 47, | WHITETERM }, |
| 2436 | { | "00001011", | 48, | WHITETERM }, |
| 2437 | { | "01010010", | 49, | WHITETERM }, |
| 2438 | { | "01010011", | 50, | WHITETERM }, |
| 2439 | { | "01010100", | 51, | WHITETERM }, |
| 2440 | { | "01010101", | 52, | WHITETERM }, |
| 2441 | { | "00100100", | 53, | WHITETERM }, |
| 2442 | { | "00100101", | 54, | WHITETERM }, |
| 2443 | { | "01011000", | 55, | WHITETERM }, |
| 2444 | { | "01011001", | 56, | WHITETERM }, |
| 2445 | { | "01011010", | 57, | WHITETERM }, |
| 2446 | { | "01011011", | 58, | WHITETERM }, |
| 2447 | { | "01001010", | 59, | WHITETERM }, |
| 2448 | { | "01001011", | 60, | WHITETERM }, |
| 2449 | { | "00110010", | 61, | WHITETERM }, |
| 2450 | { | "00110011", | 62, | WHITETERM }, |
| 2451 | { | "00110100", | 63, | WHITETERM }, |
| 2452 | { | "11011", | 64, | WHITEMKUP }, |
| 2453 | { | "10010", | 128, | WHITEMKUP }, |
| 2454 | { | "010111", | 192, | WHITEMKUP }, |
| 2455 | { | "0110111", | 256, | WHITEMKUP }, |
| 2456 | { | "00110110", | 320, | WHITEMKUP }, |
| 2457 | { | "00110111", | 384, | WHITEMKUP }, |
| 2458 | { | "01100100", | 448, | WHITEMKUP }, |
| 2459 | { | "01100101", | 512, | WHITEMKUP }, |
| 2460 | { | "01101000", | 576, | WHITEMKUP }, |
| 2461 | { | "01100111", | 640, | WHITEMKUP }, |
| 2462 | { | "011001100", | 704, | WHITEMKUP }, |
| 2463 | { | "011001101", | 768, | WHITEMKUP }, |
| 2464 | { | "011010010", | 832, | WHITEMKUP }, |
| 2465 | { | "011010011", | 896, | WHITEMKUP }, |
| 2466 | { | "011010100", | 960, | WHITEMKUP }, |
| 2467 | { | "011010101", | 1024, | WHITEMKUP }, |
| 2468 | { | "011010110", | 1088, | WHITEMKUP }, |
| 2469 | { | "011010111", | 1152, | WHITEMKUP }, |
| 2470 | { | "011011000", | 1216, | WHITEMKUP }, |
| 2471 | { | "011011001", | 1280, | WHITEMKUP }, |
| 2472 | { | "011011010", | 1344, | WHITEMKUP }, |
| 2473 | { | "011011011", | 1408, | WHITEMKUP }, |
| 2474 | { | "010011000", | 1472, | WHITEMKUP }, |
| 2475 | { | "010011001", | 1536, | WHITEMKUP }, |
| 2476 | { | "010011010", | 1600, | WHITEMKUP }, |
| 2477 | { | "011000", | 1664, | WHITEMKUP }, |
| 2478 | { | "010011011", | 1728, | WHITEMKUP }, |
| 2479 | { | "0000110111", | 0, | BLACKTERM }, |
| 2480 | { | "010", | 1, | BLACKTERM }, |
| 2481 | { | "11", | 2, | BLACKTERM }, |
| 2482 | { | "10", | 3, | BLACKTERM }, |
| 2483 | { | "011", | 4, | BLACKTERM }, |
| 2484 | { | "0011", | 5, | BLACKTERM }, |
| 2485 | { | "0010", | 6, | BLACKTERM }, |
| 2486 | { | "00011", | 7, | BLACKTERM }, |
| 2487 | { | "000101", | 8, | BLACKTERM }, |
| 2488 | { | "000100", | 9, | BLACKTERM }, |
| 2489 | { | "0000100", | 10, | BLACKTERM }, |
| 2490 | { | "0000101", | 11, | BLACKTERM }, |
| 2491 | { | "0000111", | 12, | BLACKTERM }, |
| 2492 | { | "00000100", | 13, | BLACKTERM }, |
| 2493 | { | "00000111", | 14, | BLACKTERM }, |
| 2494 | { | "000011000", | 15, | BLACKTERM }, |
| 2495 | { | "0000010111", | 16, | BLACKTERM }, |
| 2496 | { | "0000011000", | 17, | BLACKTERM }, |
| 2497 | { | "0000001000", | 18, | BLACKTERM }, |
| 2498 | { | "00001100111", | 19, | BLACKTERM }, |
| 2499 | { | "00001101000", | 20, | BLACKTERM }, |
| 2500 | { | "00001101100", | 21, | BLACKTERM }, |

```
2501        {    "00000110111",      22,  BLACKTERM },
2502        {    "00000101000",      23,  BLACKTERM },
2503        {    "00000010111",      24,  BLACKTERM },
2504        {    "00000011000",      25,  BLACKTERM },
2505        {    "000011001010",     26,  BLACKTERM },
2506        {    "000011001011",     27,  BLACKTERM },
2507        {    "000011001100",     28,  BLACKTERM },
2508        {    "000011001101",     29,  BLACKTERM },
2509        {    "000001101000",     30,  BLACKTERM },
2510        {    "000001101001",     31,  BLACKTERM },
2511        {    "000001101010",     32,  BLACKTERM },
2512        {    "000001101011",     33,  BLACKTERM },
2513        {    "000011010010",     34,  BLACKTERM },
2514        {    "000011010011",     35,  BLACKTERM },
2515        {    "000011010100",     36,  BLACKTERM },
2516        {    "000011010101",     37,  BLACKTERM },
2517        {    "000011010110",     38,  BLACKTERM },
2518        {    "000011010111",     39,  BLACKTERM },
2519        {    "000001101100",     40,  BLACKTERM },
2520        {    "000001101101",     41,  BLACKTERM },
2521        {    "000011011010",     42,  BLACKTERM },
2522        {    "000011011011",     43,  BLACKTERM },
2523        {    "000001010100",     44,  BLACKTERM },
2524        {    "000001010101",     45,  BLACKTERM },
2525        {    "000001010110",     46,  BLACKTERM },
2526        {    "000001010111",     47,  BLACKTERM },
2527        {    "000001100100",     48,  BLACKTERM },
2528        {    "000001100101",     49,  BLACKTERM },
2529        {    "000001010010",     50,  BLACKTERM },
2530        {    "000001010011",     51,  BLACKTERM },
2531        {    "000000100100",     52,  BLACKTERM },
2532        {    "000000110111",     53,  BLACKTERM },
2533        {    "000000111000",     54,  BLACKTERM },
2534        {    "000000100111",     55,  BLACKTERM },
2535        {    "000000101000",     56,  BLACKTERM },
2536        {    "000001011000",     57,  BLACKTERM },
2537        {    "000001011001",     58,  BLACKTERM },
2538        {    "000000101011",     59,  BLACKTERM },
2539        {    "000000101100",     60,  BLACKTERM },
2540        {    "000001011010",     61,  BLACKTERM },
2541        {    "000001100110",     62,  BLACKTERM },
2542        {    "000001100111",     63,  BLACKTERM },
2543        {    "0000001111",       64,  BLACKMKUP },
2544        {    "000011001000",    128,  BLACKMKUP },
2545        {    "000011001001",    192,  BLACKMKUP },
2546        {    "000001011011",    256,  BLACKMKUP },
2547        {    "000000110011",    320,  BLACKMKUP },
2548        {    "000000110100",    384,  BLACKMKUP },
2549        {    "000000110101",    448,  BLACKMKUP },
2550        {    "0000001101100",   512,  BLACKMKUP },
2551        {    "0000001101101",   576,  BLACKMKUP },
2552        {    "0000001001010",   640,  BLACKMKUP },
2553        {    "0000001001011",   704,  BLACKMKUP },
2554        {    "0000001001100",   768,  BLACKMKUP },
2555        {    "0000001001101",   832,  BLACKMKUP },
2556        {    "0000001110010",   896,  BLACKMKUP },
2557        {    "0000001110011",   960,  BLACKMKUP },
2558        {    "0000001110100",  1024,  BLACKMKUP },
2559        {    "0000001110101",  1088,  BLACKMKUP },
2560        {    "0000001110110",  1152,  BLACKMKUP },
2561        {    "0000001110111",  1216,  BLACKMKUP },
2562        {    "0000001010010",  1280,  BLACKMKUP },
2563        {    "0000001010011",  1344,  BLACKMKUP },
2564        {    "0000001010100",  1408,  BLACKMKUP },
2565        {    "0000001010101",  1472,  BLACKMKUP },
2566        {    "0000001011010",  1536,  BLACKMKUP },
2567        {    "0000001011011",  1600,  BLACKMKUP },
2568        {    "0000001100100",  1664,  BLACKMKUP },
2569        {    "0000001100101",  1728,  BLACKMKUP },
2570        {    "00000001000",    1792,  BOTHMKUP  },
2571        {    "00000001100",    1856,  BOTHMKUP  },
2572        {    "00000001101",    1920,  BOTHMKUP  },
2573        {    "000000010010",   1984,  BOTHMKUP  },
2574        {    "000000010011",   2048,  BOTHMKUP  },
```

```
        {   "000000010100",   2112,   BOTHMKUP },
        {   "000000010101",   2176,   BOTHMKUP },
        {   "000000010110",   2240,   BOTHMKUP },
        {   "000000010111",   2304,   BOTHMKUP },
        {   "000000011100",   2368,   BOTHMKUP },
        {   "000000011101",   2432,   BOTHMKUP },
        {   "000000011110",   2496,   BOTHMKUP },
        {   "000000011111",   2560,   BOTHMKUP },
        {   "000000000001",     -1,   BOTHTERM },
        {       (char *)0,      0,           0 }
};

void
fax_code_init()
{
    register struct codeinfo *ciptr;
    register int codetype;

white_tree = cell_alloc();
    black_tree = cell_alloc();

ciptr = &codeinit[0];
    while (ciptr->code != (char *)0) { codetype = ciptr->codetype;
        if (codetype != BLACKTERM && codetype != BLACKMKUP)
            code_insert(white_tree,ciptr);

if (codetype != WHITETERM && codetype != WHITEMKUP)
            code_insert(black_tree,ciptr);

ciptr++;
    } return;
} static struct codetree *
cell_alloc(parentptr)
    register struct codetree *parentptr;
{
    register struct codetree *cellptr;

cellptr = (struct codetree *)malloc(sizeof(struct codetree));
    if (cellptr == (struct codetree *)0)
        errexit("Malloc Failure.\n");

cellptr->type = CT_ERROR;
    cellptr->info = 0;
    cellptr->branch_0 = parentptr; /* non CT_BRANCH packets point */
    cellptr->branch_1 = parentptr; /* to their parent.            */ return(cellptr);
} static void
code_insert(treeptr,ciptr)
    register struct codetree *treeptr;
    register struct codeinfo *ciptr;
{
    register int i;
    register char *s;

s = ciptr->code;
    i = strlen(s);
    while (i-- > 0) { if (treeptr->type == CT_ERROR) {
            treeptr->type = CT_BRANCH;
            treeptr->branch_0 = cell_alloc(treeptr);
            treeptr->branch_1 = cell_alloc(treeptr);
        } if (treeptr->type != CT_BRANCH)
            errexit("Code Tree Inconsistancy(not branch).\n");
```

```
            if (*s++ == '0')
                treeptr = treeptr->branch_0;
            else
                treeptr = treeptr->branch_1;
        } if (treeptr->type != CT_ERROR) {
            log(EL0,"Code Tree Inconsistancy(not error).\n");
            errexit("Type=%d,Info=%d,New Code Type=%d, New Info=%d\n",
                    treeptr->type,treeptr->info,ciptr->codetype,ciptr->info);
        } i = ciptr->codetype;
        if (i == WHITETERM || i == BLACKTERM || i == BOTHTERM)
            treeptr->type = CT_TERM;
        else
            treeptr->type = CT_MAKEUP;

treeptr->info = ciptr->info;

if (ciptr->info == -1) {

/* Special case to handle FILL. Point branch_0 ptr of parent */
            /* back at itself.                                           */ free((char *)treeptr->branch_0->branch_0);
            treeptr->branch_0->branch_0 = treeptr->branch_0;
        } return;
}

/* External Declarations */ extern void get_page();
extern int pageno;
extern int npages;
extern int maxlines;
extern int bytesperline1;
extern unsigned char *r1bytes;

/* Forward Declarations */ static char *emptyline = (char *)0;
void fax_print();
static void print_page();

#define DEFAULT_PRINTFAX "lp -s -oraw";

void
fax_print(Xfd,fp_flag,draft_flag)
    int Xfd;
    int fp_flag;
    int draft_flag;
{
    register int i;
    int pipefds[2];
    int childpid;
    FILE *writefptr;
    char *print_cmd;
    extern char *getenv();

/* allocate empty lines array if not already allocated */ if (emptyline == (char *)0) {
        if ((emptyline = (char *)malloc(maxlines * sizeof(char))) == (char *)0)
            errexit("Malloc Failure.\n");
    } if ((childpid = fork()) == -1) {
        fprintf(stderr,"fork failed.\n");
        return;
    }
```

```
    if (childpid != 0)
        return;

/* Child */ signal(SIGCHLD, SIG_DFL);
    signal(SIGHUP,  SIG_IGN);
    signal(SIGINT,  SIG_IGN);
    signal(SIGQUIT, SIG_IGN);
    signal(SIGTSTP, SIG_IGN);

if (Xfd != -1)
        (void) close(Xfd); /* Close the connection so that the window will */
                           /* go away if user exits before we finish       */ if (pipe(pipefds) != 0) {
        fprintf(stderr,"pipe failed.\n");
        _exit(1);
    } if ((childpid = fork()) == -1) {
        fprintf(stderr,"fork failed.\n");
        _exit(1);
    } if (childpid != 0) {

/* Parent will exec print command */

(void) close(pipefds[1]);
        (void) close(0);
        if (dup(pipefds[0]) != 0) {
            fprintf(stderr,"dup failed.\n");
            _exit(1);
        } if ((print_cmd = getenv("PRINTFAX")) == (char *)0)
            print_cmd = DEFAULT_PRINTFAX;

(void) execl("/bin/sh","sh","-c",print_cmd,0);
        fprintf(stderr,"exec of print command \"%s\" failed.\n",print_cmd);
        _exit(1);
    }

/* Child - feed print command raw data */

(void) close(pipefds[0]);

if ((writefptr = fdopen(pipefds[1],"w")) == (FILE *)0) {
        fprintf(stderr,"fdopen failed.\n");
        _exit(1);
    } fputs("\033E\033&l0E",writefptr);

if (fp_flag == FP_CURPAGE) {
        print_page(writefptr,draft_flag);
        _exit(0);
    } for (i = 1; i <= npages; i++) { if (i != 1 || pageno != 1) {
            pageno = i;
            get_page();
        } print_page(writefptr,draft_flag);
    }

_exit(0);
} static char red2to1[256] = {
```

```
        0x0, 0x1, 0x1, 0x1, 0x2, 0x3, 0x3, 0x3, 0x2, 0x3, 0x3, 0x3, 0x2, 0x3, 0x3, 0x3,
        0x4, 0x5, 0x5, 0x5, 0x6, 0x7, 0x7, 0x7, 0x6, 0x7, 0x7, 0x7, 0x6, 0x7, 0x7, 0x7,
        0x4, 0x5, 0x5, 0x5, 0x6, 0x7, 0x7, 0x7, 0x6, 0x7, 0x7, 0x7, 0x6, 0x7, 0x7, 0x7,
        0x4, 0x5, 0x5, 0x5, 0x6, 0x7, 0x7, 0x7, 0x6, 0x7, 0x7, 0x7, 0x6, 0x7, 0x7, 0x7,
        0x8, 0x9, 0x9, 0x9, 0xa, 0xb, 0xb, 0xb, 0xa, 0xb, 0xb, 0xb, 0xa, 0xb, 0xb, 0xb,
        0xc, 0xd, 0xd, 0xd, 0xe, 0xf, 0xf, 0xf, 0xe, 0xf, 0xf, 0xf, 0xe, 0xf, 0xf, 0xf,
        0xc, 0xd, 0xd, 0xd, 0xe, 0xf, 0xf, 0xf, 0xe, 0xf, 0xf, 0xf, 0xe, 0xf, 0xf, 0xf,
        0xc, 0xd, 0xd, 0xd, 0xe, 0xf, 0xf, 0xf, 0xe, 0xf, 0xf, 0xf, 0xe, 0xf, 0xf, 0xf,
        0x8, 0x9, 0x9, 0x9, 0xa, 0xb, 0xb, 0xb, 0xa, 0xb, 0xb, 0xb, 0xa, 0xb, 0xb, 0xb,
        0xc, 0xd, 0xd, 0xd, 0xe, 0xf, 0xf, 0xf, 0xe, 0xf, 0xf, 0xf, 0xe, 0xf, 0xf, 0xf,
        0xc, 0xd, 0xd, 0xd, 0xe, 0xf, 0xf, 0xf, 0xe, 0xf, 0xf, 0xf, 0xe, 0xf, 0xf, 0xf,
        0xc, 0xd, 0xd, 0xd, 0xe, 0xf, 0xf, 0xf, 0xe, 0xf, 0xf, 0xf, 0xe, 0xf, 0xf, 0xf,
        0x8, 0x9, 0x9, 0x9, 0xa, 0xb, 0xb, 0xb, 0xa, 0xb, 0xb, 0xb, 0xa, 0xb, 0xb, 0xb,
        0xc, 0xd, 0xd, 0xd, 0xe, 0xf, 0xf, 0xf, 0xe, 0xf, 0xf, 0xf, 0xe, 0xf, 0xf, 0xf,
        0xc, 0xd, 0xd, 0xd, 0xe, 0xf, 0xf, 0xf, 0xe, 0xf, 0xf, 0xf, 0xe, 0xf, 0xf, 0xf,
        0xc, 0xd, 0xd, 0xd, 0xe, 0xf, 0xf, 0xf, 0xe, 0xf, 0xf, 0xf, 0xe, 0xf, 0xf, 0xf
};

static short exp2to3[256] = {
    0x000, 0x001, 0x004, 0x007, 0x008, 0x009, 0x00c, 0x00f,
    0x020, 0x021, 0x024, 0x027, 0x038, 0x039, 0x03c, 0x03f,
    0x040, 0x041, 0x044, 0x047, 0x048, 0x049, 0x04c, 0x04f,
    0x060, 0x061, 0x064, 0x067, 0x078, 0x079, 0x07c, 0x07f,
    0x100, 0x101, 0x104, 0x107, 0x108, 0x109, 0x10c, 0x10f,
    0x120, 0x121, 0x124, 0x127, 0x138, 0x139, 0x13c, 0x13f,
    0x1c0, 0x1c1, 0x1c4, 0x1c7, 0x1c8, 0x1c9, 0x1cc, 0x1cf,
    0x1e0, 0x1e1, 0x1e4, 0x1e7, 0x1f8, 0x1f9, 0x1fc, 0x1ff,
    0x200, 0x201, 0x204, 0x207, 0x208, 0x209, 0x20c, 0x20f,
    0x220, 0x221, 0x224, 0x227, 0x238, 0x239, 0x23c, 0x23f,
    0x240, 0x241, 0x244, 0x247, 0x248, 0x249, 0x24c, 0x24f,
    0x260, 0x261, 0x264, 0x267, 0x278, 0x279, 0x27c, 0x27f,
    0x300, 0x301, 0x304, 0x307, 0x308, 0x309, 0x30c, 0x30f,
    0x320, 0x321, 0x324, 0x327, 0x338, 0x339, 0x33c, 0x33f,
    0x3c0, 0x3c1, 0x3c4, 0x3c7, 0x3c8, 0x3c9, 0x3cc, 0x3cf,
    0x3e0, 0x3e1, 0x3e4, 0x3e7, 0x3f8, 0x3f9, 0x3fc, 0x3ff,
    0x800, 0x801, 0x804, 0x807, 0x808, 0x809, 0x80c, 0x80f,
    0x820, 0x821, 0x824, 0x827, 0x838, 0x839, 0x83c, 0x83f,
    0x840, 0x841, 0x844, 0x847, 0x848, 0x849, 0x84c, 0x84f,
    0x860, 0x861, 0x864, 0x867, 0x878, 0x879, 0x87c, 0x87f,
    0x900, 0x901, 0x904, 0x907, 0x908, 0x909, 0x90c, 0x90f,
    0x920, 0x921, 0x924, 0x927, 0x938, 0x939, 0x93c, 0x93f,
    0x9c0, 0x9c1, 0x9c4, 0x9c7, 0x9c8, 0x9c9, 0x9cc, 0x9cf,
    0x9e0, 0x9e1, 0x9e4, 0x9e7, 0x9f8, 0x9f9, 0x9fc, 0x9ff,
    0xe00, 0xe01, 0xe04, 0xe07, 0xe08, 0xe09, 0xe0c, 0xe0f,
    0xe20, 0xe21, 0xe24, 0xe27, 0xe38, 0xe39, 0xe3c, 0xe3f,
    0xe40, 0xe41, 0xe44, 0xe47, 0xe48, 0xe49, 0xe4c, 0xe4f,
    0xe60, 0xe61, 0xe64, 0xe67, 0xe78, 0xe79, 0xe7c, 0xe7f,
    0xf00, 0xf01, 0xf04, 0xf07, 0xf08, 0xf09, 0xf0c, 0xf0f,
    0xf20, 0xf21, 0xf24, 0xf27, 0xf38, 0xf39, 0xf3c, 0xf3f,
    0xfc0, 0xfc1, 0xfc4, 0xfc7, 0xfc8, 0xfc9, 0xfcc, 0xfcf,
    0xfe0, 0xfe1, 0xfe4, 0xfe7, 0xff8, 0xff9, 0xffc, 0xfff
};

static void
print_page(writefptr,draft_flag)
    FILE *writefptr;
    int draft_flag;
{
    register unsigned char *s1;
    register unsigned char *s2;
    register unsigned char *rline;
    register int i;
    register int j;
    register int k;
    register int bits1;
    register int bits2;
    int nbytes;
    int emptyflag;
    int ncolumns;
    int start_x;
    static unsigned char outline[456]; /* 2432 (max pels CCITT) * 1.5 / 8 */
    static unsigned char orline[304];  /* 2432 / 8 */
    static short start_column[152];    /* 2432 / 16 */
    static short end_column[152];      /* 2432 / 16 */
    static char rpcl[32];
```

```
         /* Clear orline */ s1 = orline;
         for (i = 0; i < 304; i++)
             *s1++ = 0;

/* Make a pass through raster data finding empty lines and columns */ rline = r1bytes;
         for (i = 0; i < maxlines; i++) { s1 = rline;
             s2 = orline;
             j  = bytesperline1;
             emptyflag = TRUE;
             while (j-- > 0) { if (*s1 != 0)
                     emptyflag = FALSE;

*s2++ |= *s1++;
             }
             rline += (2 * bytesperline1);

emptyline[i] = emptyflag;
         }

/* Find empty columns */ s1 = orline;
         ncolumns = 0;
         emptyflag = TRUE;
         start_column[0] = -1;
         for (i = 0; i < 152; i++) { if (*s1 == 0 && *(s1 + 1) == 0) {
                 if (emptyflag == FALSE) {
                     end_column[ncolumns++] = i - 1;
                     start_column[ncolumns] = -1;
                     emptyflag = TRUE;
                 }
             }
             else {
                 if (emptyflag != FALSE) {
                     start_column[ncolumns] = i;
                     emptyflag = FALSE;
                 }
             }
             s1 += 2;
         } if (start_column[ncolumns] != -1)
             end_column[ncolumns++] = i - 1;

if (ncolumns == 0) {

/* Blank Page */ putc('\014',writefptr);
             fflush(writefptr);
             return;
         }

/* Determine whether or not we are going to */
         /* clip on the left side at all.            */ i = start_column[0];
         j = end_column[ncolumns - 1];
         if (i < 3 && (end_column[0] - i) > 2 && (j - i) > 104) { i = start_column[0] = 3;
         }
```

```
           /* determine start X coordinate */ nbytes = bytesperline1 / 2;

if (draft_flag == FALSE) {
               fputs("\033*t300R\033*r0A",writefptr);
               sprintf(rpcl,"\033*b%dW",nbytes * 3);
           }
           else {
               fputs("\033*t100R\033*r0A",writefptr);
               sprintf(rpcl,"\033*b%dW",nbytes);
           } rline = rlbytes;
           for (i = 0; i < maxlines; i++) { s2 = outline;
               s1 = rline;
               j = nbytes;
               if (draft_flag == FALSE) {
                   while (j-- > 0) {
                       bits1 = exp2to3[*s1++];
                       bits2 = exp2to3[*s1++];
                       *s2++ = (bits1 >> 4) & 0xff;
                       *s2++ = ((bits1 << 4) & 0xf0) | ((bits2 >> 8) & 0xf);
                       *s2++ = bits2 & 0xff;
                   }
               }
               else {
                   while (j-- > 0) {
                       bits1 = red2to1[*s1++];
                       bits2 = red2to1[*s1++];
                       *s2++ = ((bits1 << 4) & 0xf0) | bits2;
                   }
               } if (draft_flag == FALSE) {
                   fputs(rpcl,writefptr);
                   fwrite(outline,1,nbytes * 3,writefptr);
                   fputs(rpcl,writefptr);
                   fwrite(outline,1,nbytes * 3,writefptr);
                   fputs(rpcl,writefptr);
                   fwrite(outline,1,nbytes * 3,writefptr);
               }
               else {
                   fputs(rpcl,writefptr);
                   fwrite(outline,1,nbytes,writefptr);
               } rline += (2 * bytesperline1);
           } fputs("\033*rB\014",writefptr);
           fflush(writefptr);

return;
       }
```

We claim:

1. A method of routing the digitally encoded facsimile representation of a document to a destination on a network, the method comprising the steps of:
   scanning in opposing directions a selected page of the document for bar code;
   detecting the presence of a selected bar code cipher in a selected location within the scanned bar code, the selected cipher being asymmetrical when scanned from opposing directions;
   converting a remaining portion of the scanned bar code into an address suitable for use in addressing a destination location on the network;
   erecting the pages of a document that is upside down in response to the detecting step being successful upon a bar code scanned in a selected direction; and
   sending the document to the destination location on the network.

2. A method of addressing a document to be transmitted to an addressable destination on a network, the method comprising the steps of:
   expressing the address of a destination on a network as a visual bar coded image upon a page of a document to be transmitted by facsimile;
   encoding the document according to a format for the digital transmission by facsimile;
   sending the encoded document to a fax server connected to a network upon which the destination address is located;

scanning a selected page of the document for bar code;

detecting the presence of a selected bar code cipher in a selected location within the scanned bar code;

converting a remaining portion of the scanned bar code into an address suitable for use in addressing a destination location on the network; and sending the document to the destination location on the network.

3. A method as in claim 2 wherein the selected cipher is asymmetrical when scanned from opposing directions, wherein the scanning step is performed in opposing directions, and further comprising the step of erecting the pages of a document that is upside down in response to the detecting step being successful upon a bar code scanned in a selected direction.

4. A method comprising the steps of:

storing a digital representation of a document within a computer system at a destination;

transmitting from a sending entity a bar coded request by facsimile to the computer system at the destination;

reading the bar code to determine an action to perform in response to the transmitting of the bar coded request; and sending by facsimile the digital representation of the document to the sending entity.

5. A method as in claim 4 wherein the transmitting step includes a bar coded return address, and the sending step uses the bar coded return address in sending the digital representation of the document.

6. A method comprising the steps of:

storing digital representations of a plurality of documents within a computer system at a destination;

transmitting by facsimile from a sending entity a form including a bar coded request for the return transmission of information, indicia corresponding to at least one of the documents in the plurality thereof, and a bar coded return address accessible by facsimile;

reading the bar code request for the return transmission of information;

determining from the indicia at least one digital representation to be sent to the return address; and sending by facsimile to the return address each digital representation determined in the determining step.

7. A method as in claim 6 wherein the indicia are formed by the application, prior to the transmitting step, of marks within predefined fields indicated upon the form.

8. A method as in claim 7 wherein the predefined fields indicated upon the form are associated with human readable labels each specifying a document in the plurality thereof.

9. A method comprising the steps of:

transmitting from a sending entity a bar coded request by facsimile to a computer system at a destination;

reading the bar code to determine an action to perform in response to the transmitting of the bar coded request;

subsequent to the reading step, generating in the computer at the destination a digital representation of a document relating to the action to be performed; and sending by facsimile the digital representation of the document to the sending entity.

* * * * *